United States Patent [19]

Shoulders

[11] Patent Number: 5,018,180
[45] Date of Patent: May 21, 1991

[54] ENERGY CONVERSION USING HIGH CHARGE DENSITY

[75] Inventor: Kenneth R. Shoulders, Austin, Tex.

[73] Assignee: Jupiter Toy Company, Austin, Tex.

[21] Appl. No.: 347,262

[22] Filed: May 3, 1989

Related U.S. Application Data

[63] Continuation-in-part of Ser. No. 183,506, May 3, 1988, abandoned, which is a continuation-in-part of Ser. No. 137,244, Jan. 6, 1988, abandoned.

[51] Int. Cl.$^5$ .................................... H01J 23/34
[52] U.S. Cl. .................................... 378/119; 328/233; 343/739
[58] Field of Search ............ 343/731, 739; 333/99 R, 333/236; 378/119; 328/233

[56] References Cited

U.S. PATENT DOCUMENTS

| | | |
|---|---|---|
| 2,376,439 | 5/1945 | Machlett et al. |
| 3,526,575 | 9/1970 | Bennett . |
| 3,864,640 | 2/1975 | Bennett . |
| 4,088,919 | 5/1978 | Clampitt et al. |
| 4,459,594 | 7/1984 | Hall et al. ..................... 343/731 |
| 4,488,181 | 12/1984 | Haferl . |
| 4,688,241 | 8/1987 | Peugoet . |
| 4,736,250 | 4/1988 | Blazo . |
| 4,746,934 | 5/1988 | Shoening . |

FOREIGN PATENT DOCUMENTS

| | | |
|---|---|---|
| WO86/06572 | 11/1986 | PCT Int'l Appl. |
| 374889 | 6/1932 | United Kingdom . |
| 503211 | 6/1937 | United Kingdom . |
| 730862 | 6/1955 | United Kingdom . |
| 730920 | 6/1955 | United Kingdom . |
| 888955 | 2/1962 | United Kingdom . |
| 895131 | 5/1962 | United Kingdom . |
| 1034118 | 6/1966 | United Kingdom . |
| 1136144 | 12/1968 | United Kingdom . |
| 1345893 | 2/1974 | United Kingdom . |
| 1358571 | 7/1974 | United Kingdom . |
| 1394125 | 5/1975 | United Kingdom . |
| 1485273 | 9/1977 | United Kingdom . |
| 1513413 | 6/1978 | United Kingdom . |
| 2195046A | 3/1985 | United Kingdom . |
| 2153140A | 8/1985 | United Kingdom . |
| 2190786A | 11/1987 | United Kingdom . |

OTHER PUBLICATIONS

Boyer, T. H., "The Classical Vacuum", *Scientific American*, Aug. 1985, pp. 70–78.

Morrow, D. L., Phillips, J. D., Stringfield, R. M. Jr., Doggett, W. O. and Bennett, W. H., "Concentration and Guidance of Intense Relativistic Electron Beams", *Applied Physics Letters*, vol. 19, No. 10, Nov. 15, 1971, pp. 441–443.

Bennett, W. H., "Self-Focusing Streams", *Physical Review*, vol. 98, No. 6, Jun. 15, 1955, pp. 1584–1593.

Bennett, Willard H., "A More General Theory of Magnetic Self-Focusing", Abstract of presented paper, 1954.

"Bulgarian Sensation in Physics?", report from Sofia BTA, Bulgaria, Nov. 28, 1988, 2 pages.

Bergstrom, Arne, "Electromagnetic Theory of Strong Interaction", *Physical Review D*, vol. 8, No. 12, Dec. 15, 1973, pp. 4394–4402.

Boyer, T. H., "A Brief Survey of Stochastic Electrodynamics", from *Foundations of Radiation Theory and Quantum Electrodynamics*, Barut, A. O., editor, Plenum Press, 1980, pp. 49–63.

(List continued on next page.)

*Primary Examiner*—Carolyn E. Fields
*Assistant Examiner*—David P. Porta
*Attorney, Agent, or Firm*—Lowe, Price, LeBlanc, Becker & Shur

[57] ABSTRACT

Disclosed are apparatus and method for obtaining energy from high electrical charge density entities. The energy may be received by the conductor of a traveling wave device positioned along the path which the propagating entities follow. Multiple traveling wave devices may be combined. Energy output from a traveling wave device may also be directed to the generation of a subsequent such entity. Thermal energy may also be obtained from an EV.

42 Claims, 38 Drawing Sheets

OTHER PUBLICATIONS

Boyer, T. H., "Quantum Zero-Point Energy and Long-Range Forces", *Annals of Physics*, vol. 56, 1970, pp. 474–503.

Boyle, W. S., Kisliuk, P. and Germer, L. H., "Electrical Breakdown in High Vacuum", *Journal of Applied Physics*, vol. 26, No. 6, Jun. 1955, pp. 720–725.

Forward, R. L., "Extracting Electrical Energy from the Vacuum by Cohesion of Charged Foliated Conductors", *Physical Review B*, vol. 30, No. 4, Aug. 15, 1984, pp. 1700–1702.

Kahles, J. E., "Electrical Discharge Machining (EDM)", from *Metals Handbook*, 8th Ed., vol. 3, *Machining*, Lyman, T., editor, American Society for Metals, pp. 227–233.

Kisliuk, P. P., "Arcing at Telephone Relay Contacts", *Bell Laboratories Record*, vol. 34, Jun. 1956, pp. 218–222.

*Vacuum Arcs Theory and Application*, Lafferty, J. M., Editor, John Wiley & Sons, 1980.

Malmberg, J. H., and O'Neil, T. M. "Pure Electron Plasma, Liquid and Crystal", *Physical Review Letters*, vol. 39, No. 21, Nov. 21, 1977, pp. 1333–1336.

Mesyats, G. A., "Fast Processes on the Cathode in a Vacuum Discharge", *IEEE Proceedings, Xth Int'l Symposium on Discharge and Electrical Insulation in Vacuum*, Oct. 25–28, 1982, Columbia, S.C., pp. 37–42.

Mesyats, G. A., "Explosive Processes on the Cathode in a Vacuum Discharge", *IEEE Transactions on Electrical Insulation*, vol. EI–18, No. 3, Jun. 1983, pp. 218–225.

Nardi, V., Bostick, W. H., Feugeas, J., and Prior, W., "Internal Structure of Electron-Beam Filaments", *Physical Review A*, vol. 22, No. 5, Nov. 1980, pp. 2211–2217.

Puthoff, H. E., "Ground State of Hydrogen as a Zero-Point-Fluctuation-Determined State", *Physical Reivew D*, vol. 35, No. 10, May 15, 1987, pp. 3266–3269; Summary attached.

Schwirzke, F., "Laser Induced Unipolar Arcing", from *Laser Interaction and Related Plasma Phenomena*, vol. 6, Hara, H. and Miley, G. H., editors, Plenum Publishing, 1984, pp. 335–352.

Schwirzke, F., "Unipolar Arc Model", *Journal of Nuclear Materials*, vol. 128 and 129, 1984, 609–612.

Shoulders, K. R., "Microelectronics Using Electron-Beam-Activated Machining Techniques", from *Advances in Computers*, vol. 2, Alt, F. L., editor, Academic Press, 1961, pp. 135–293.

Shoulders, K. R., "Toward Complex Systems", from *Symposium on Microelectronics and Large Systems*, Nov. 17 and 18, 1964, Washington, D.C., Mathis, S. J., Wiley, R. E. and Spandorfer, L. M., editors, Spartan Books and MacMillan, 1965, pp. 97–128.

*Thin Film Processes*, Vossen, J. L. and Kern, W., Editors, Academic Press, 1978.

*Flat-Panel Displays and CRTs*, Tannas, L. E., Jr., Editor, Van Norstrand Reinhold, 1985.

"Eye of the Storm", from The Sharper Image, May 1988, catalog, p. 45 (though not indicated on the page).

"Blue Lightning", one page literature from The Sharper Image (but not noted as such as on the page).

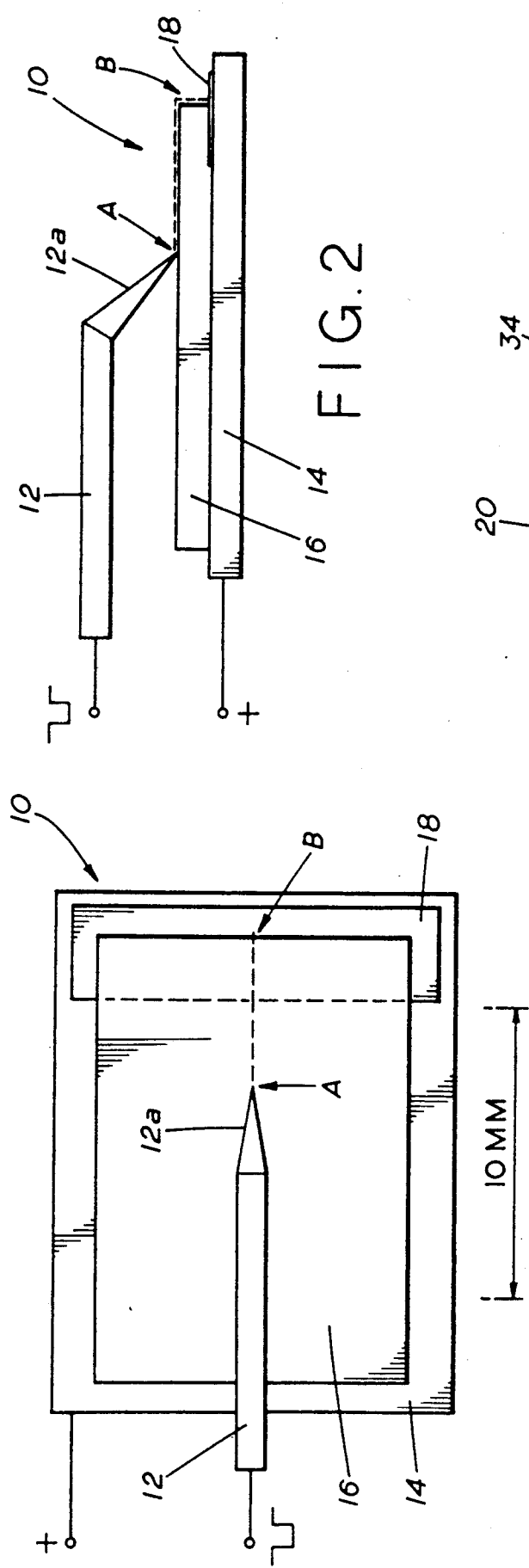
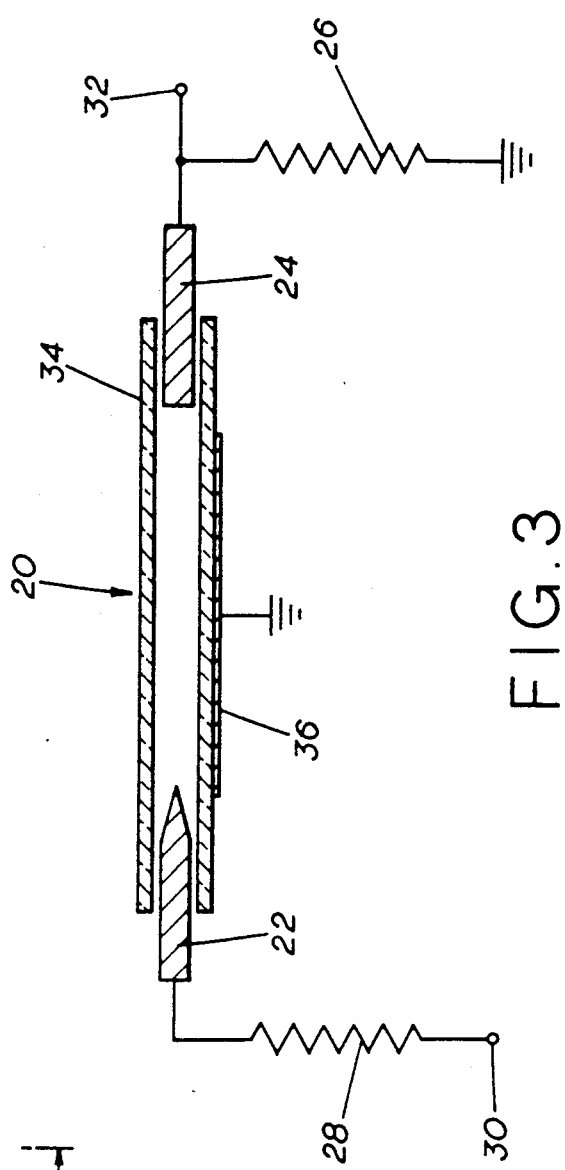
FIG. 1
FIG. 2
FIG. 3

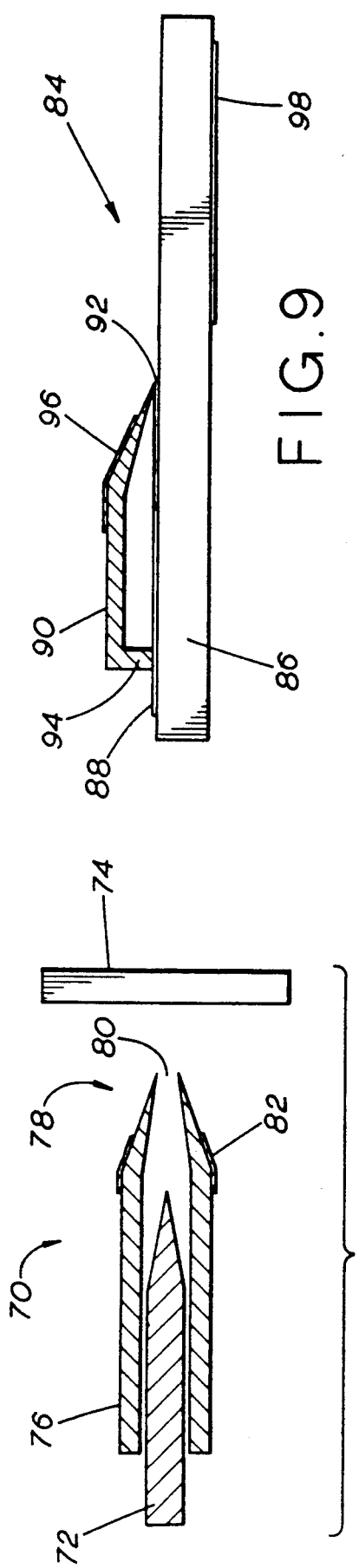
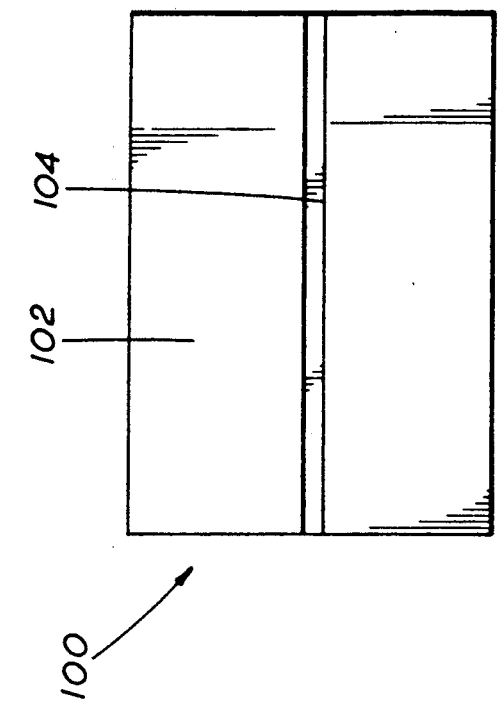
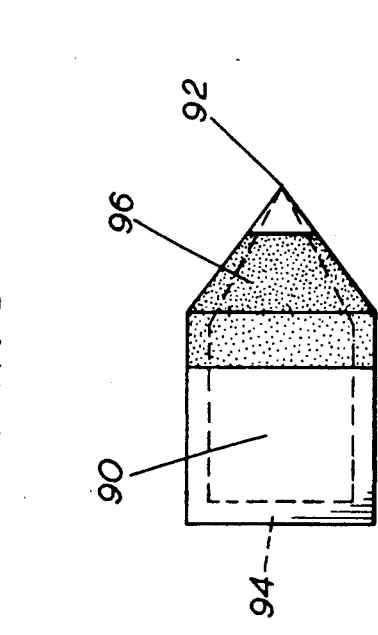

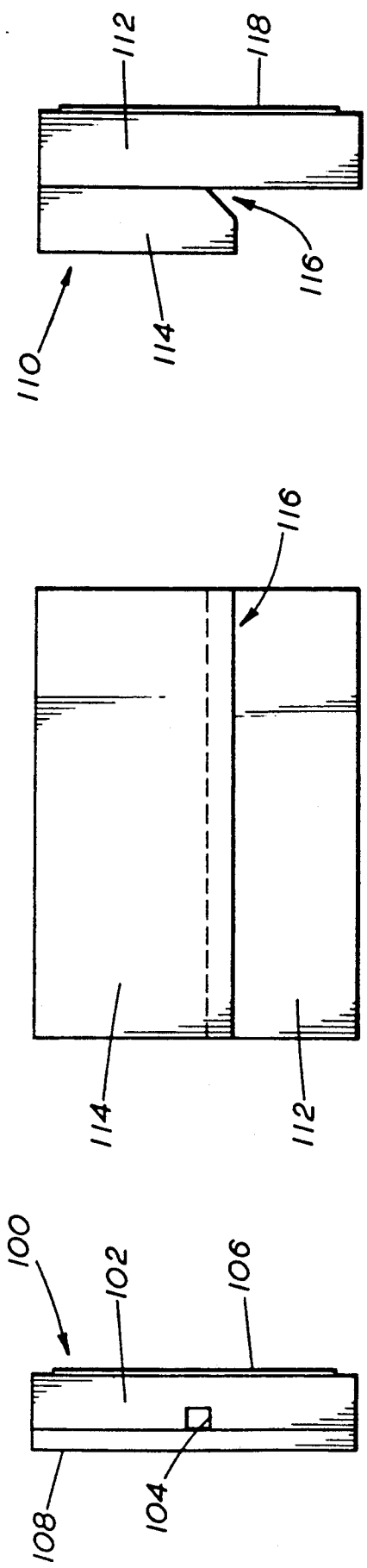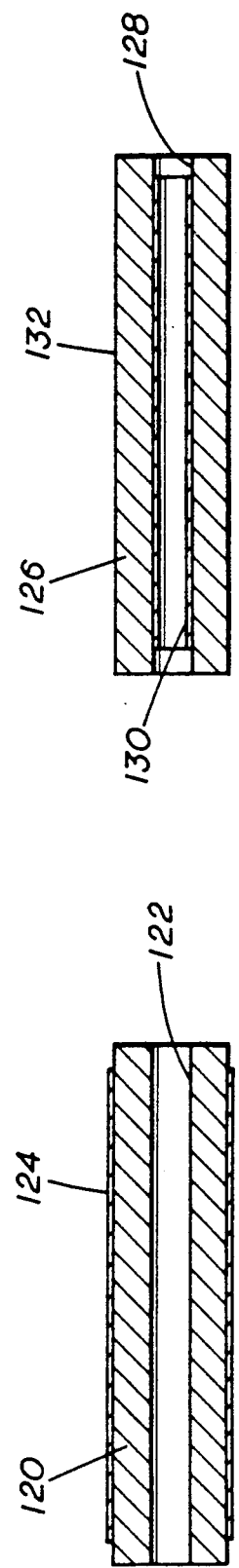

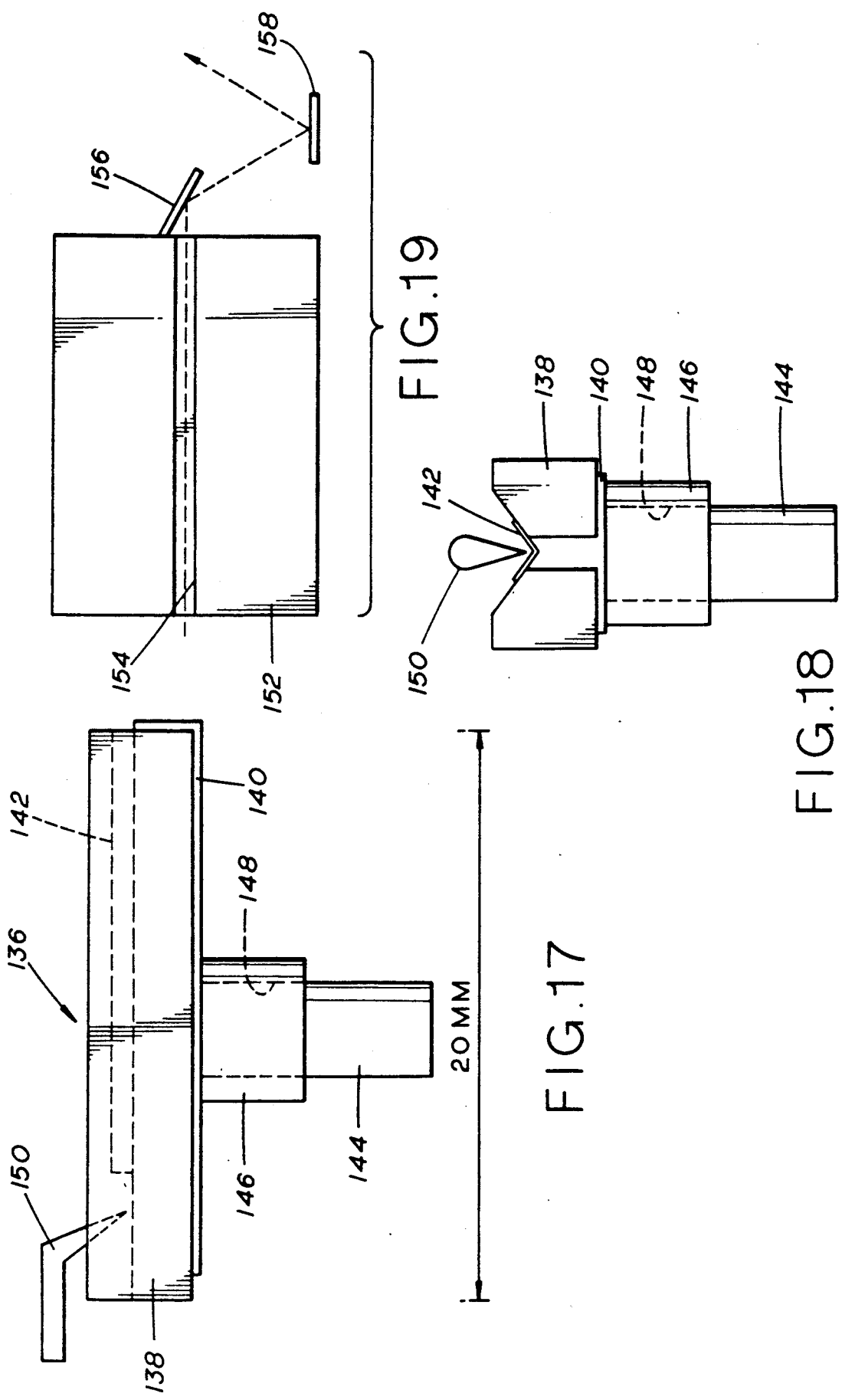

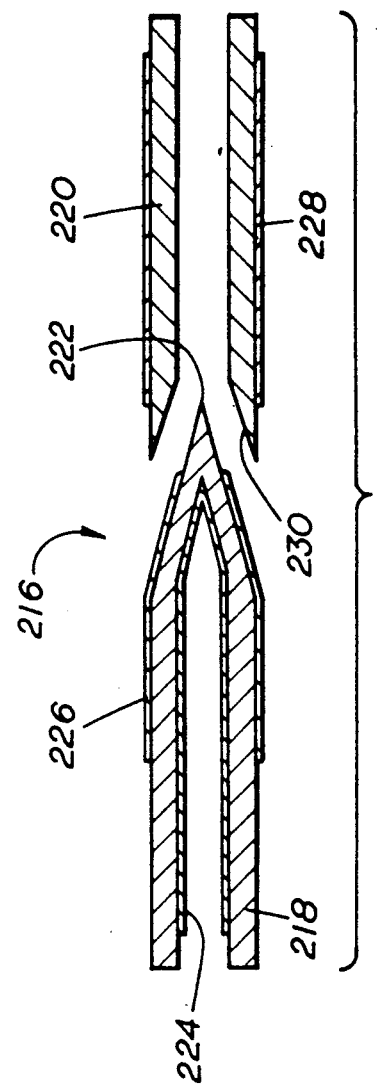
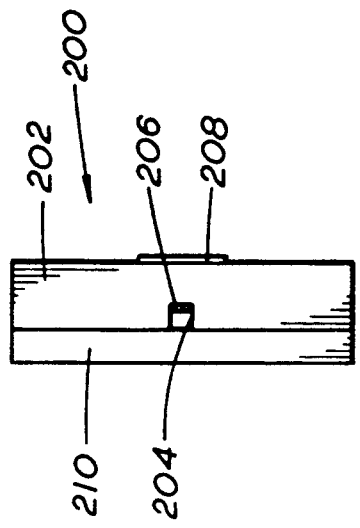
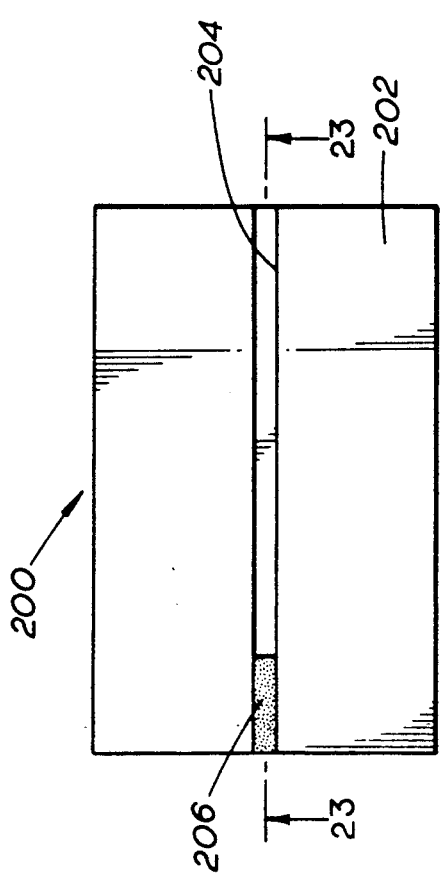
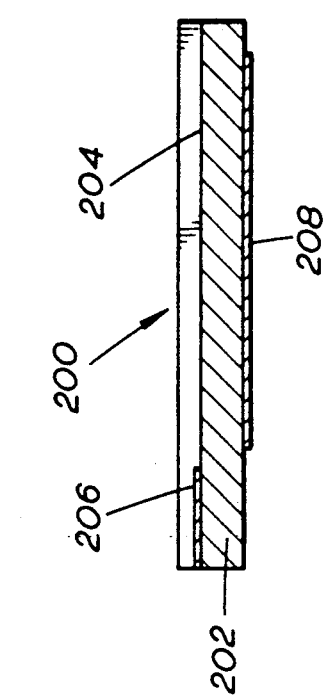

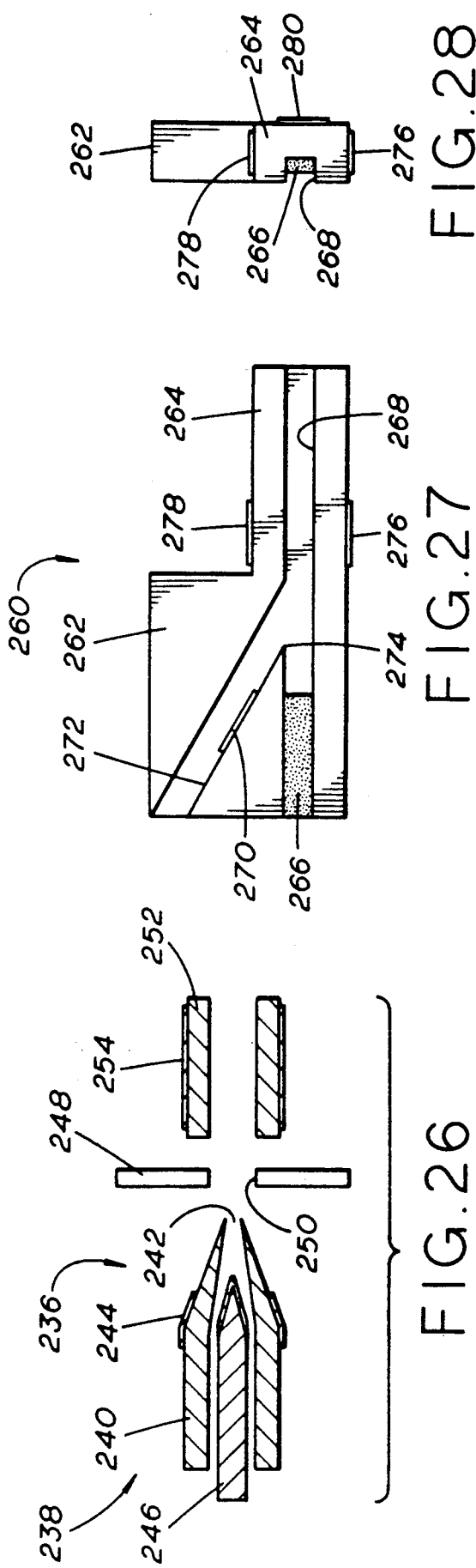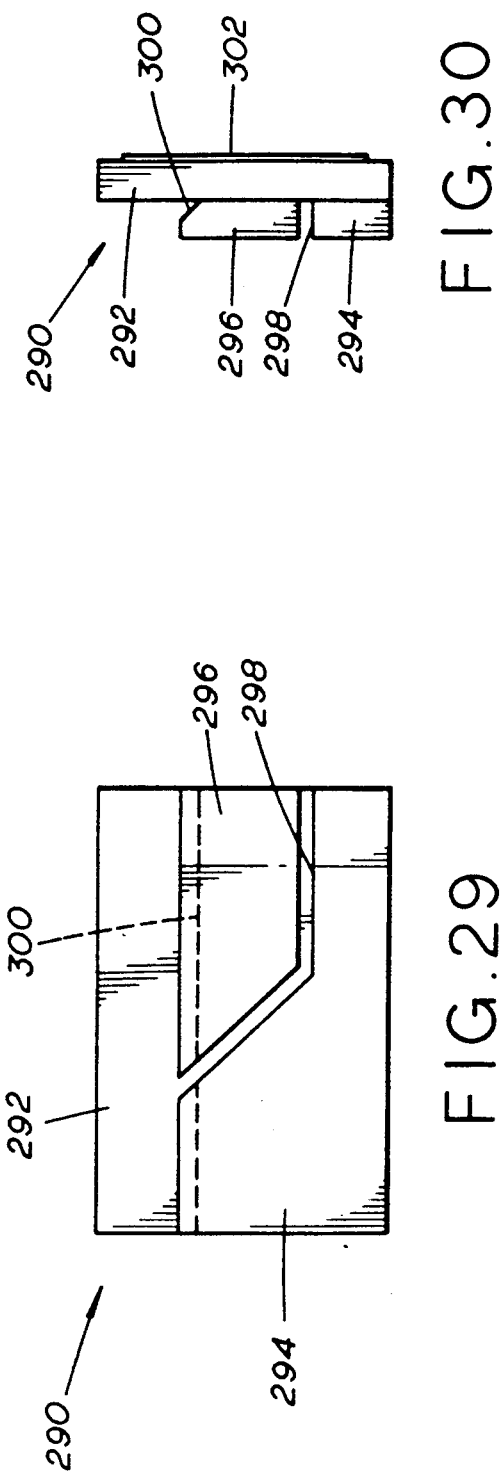

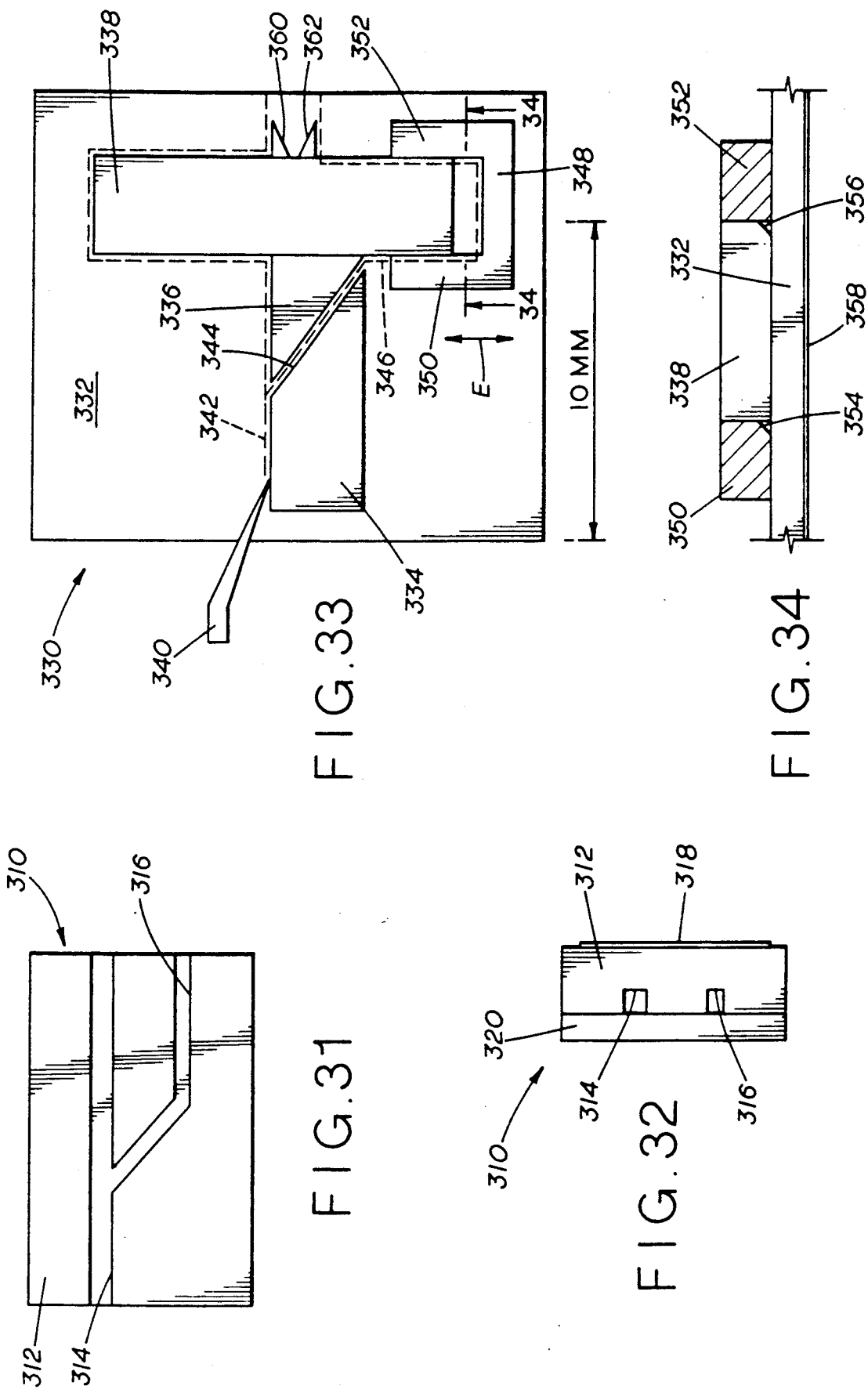

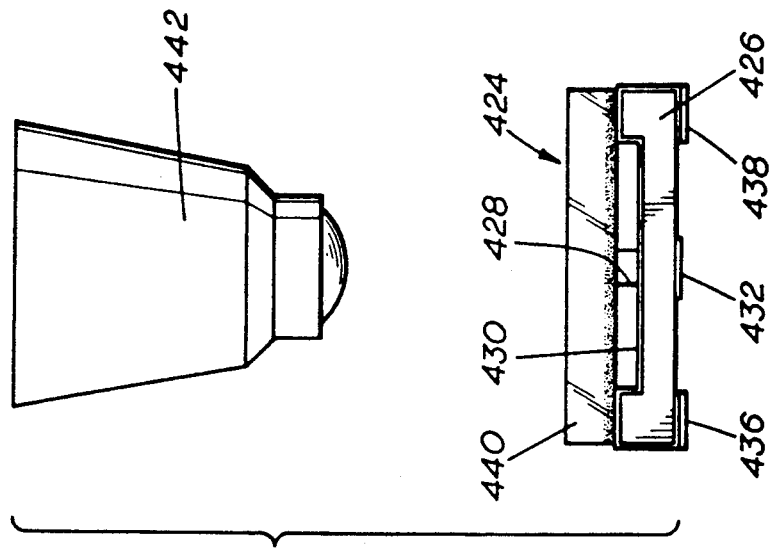
FIG. 40
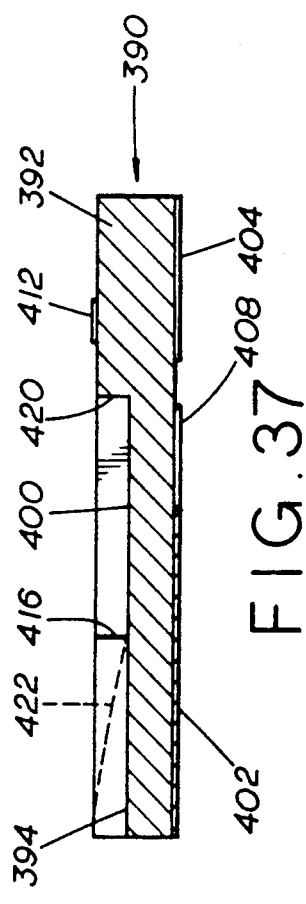
FIG. 37
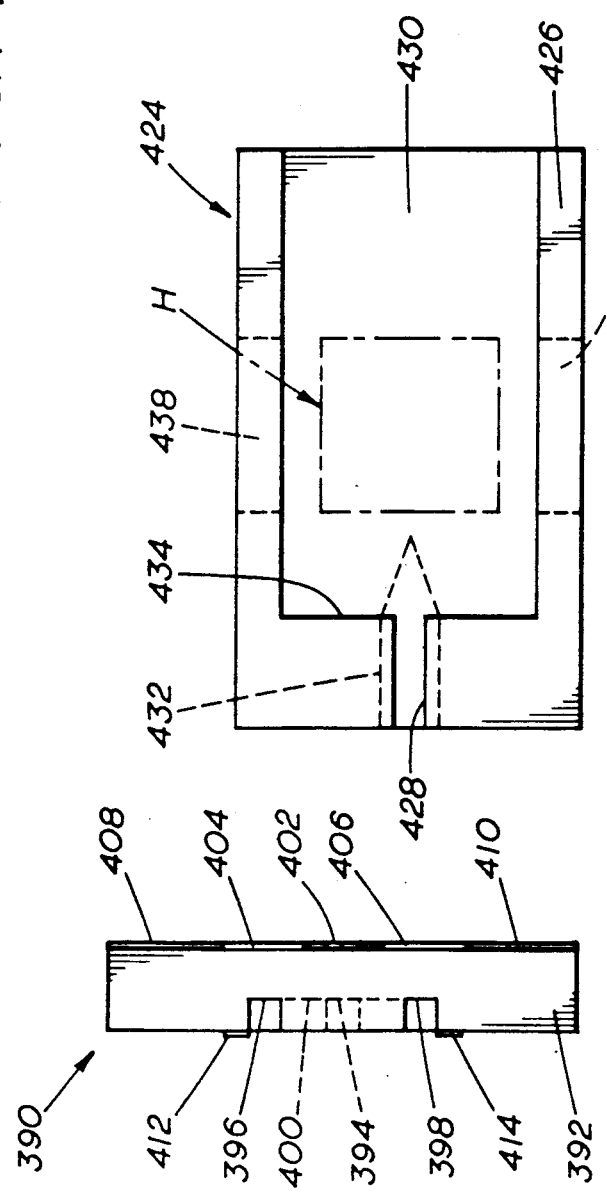
FIG. 39
FIG. 38

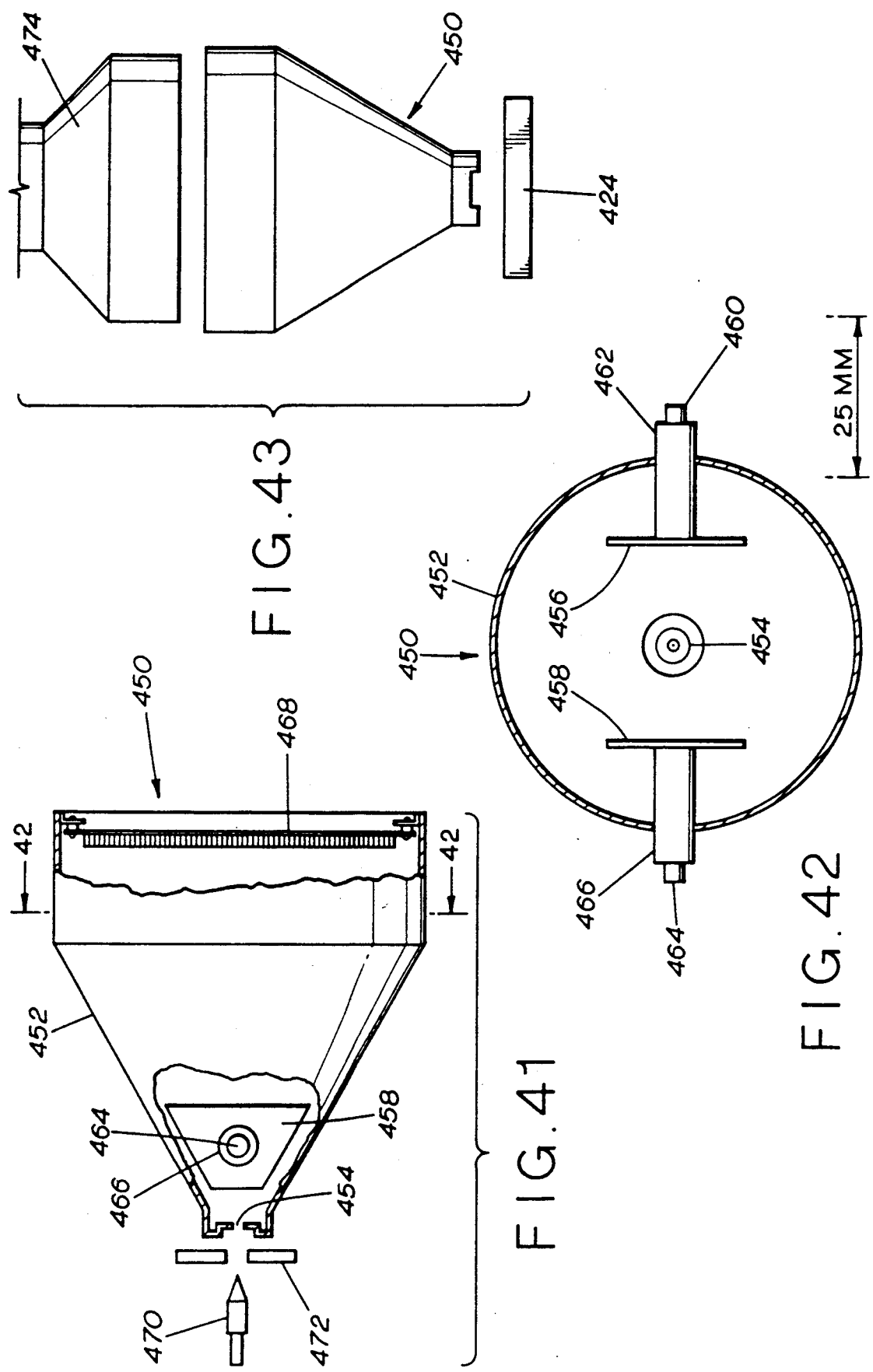

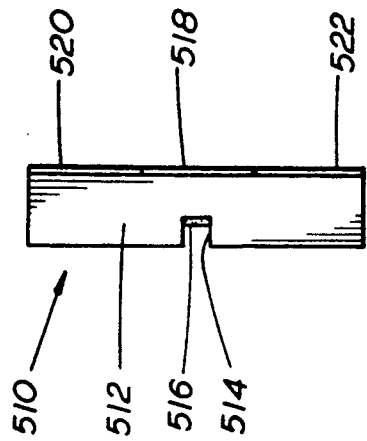
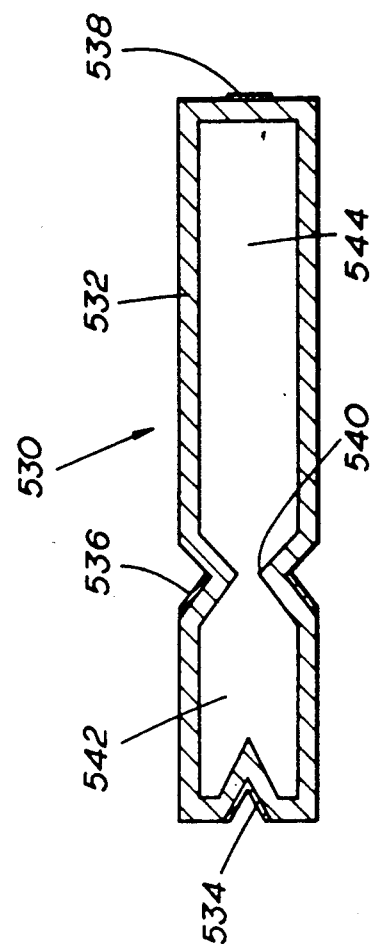
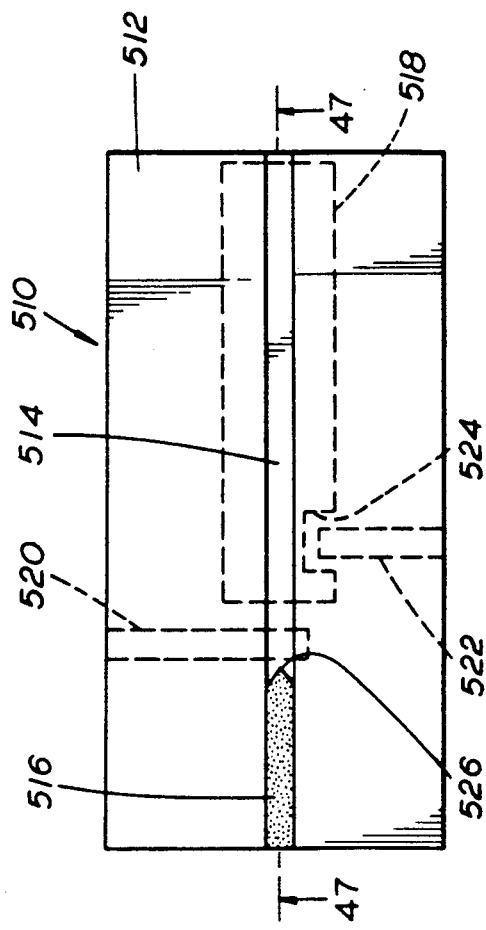
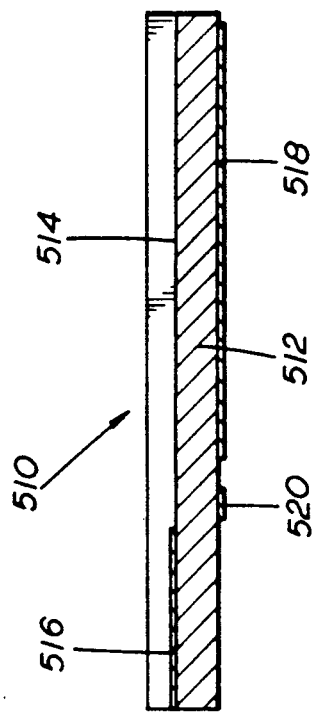

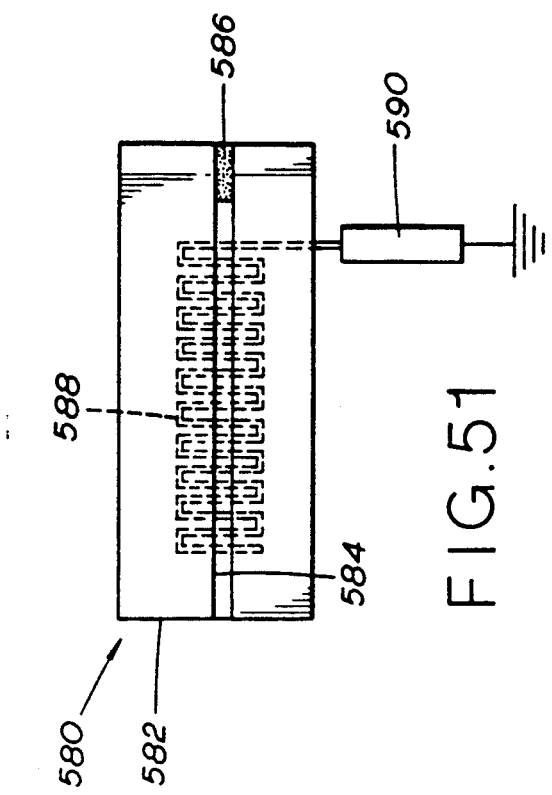
FIG.51
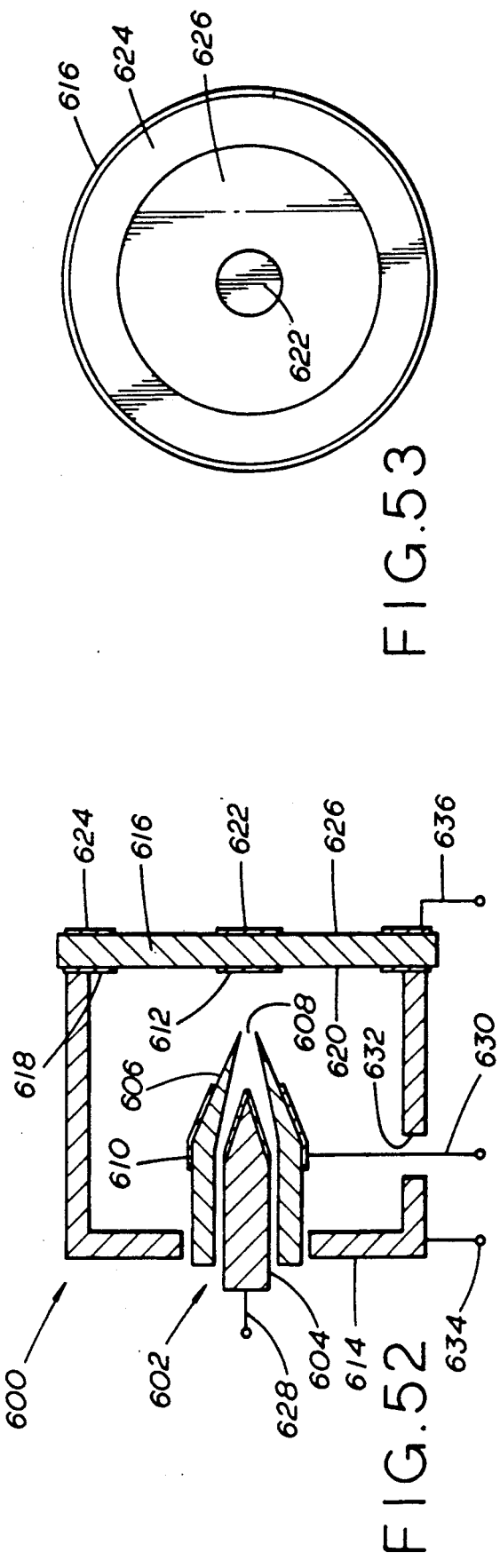
FIG.53
FIG.52
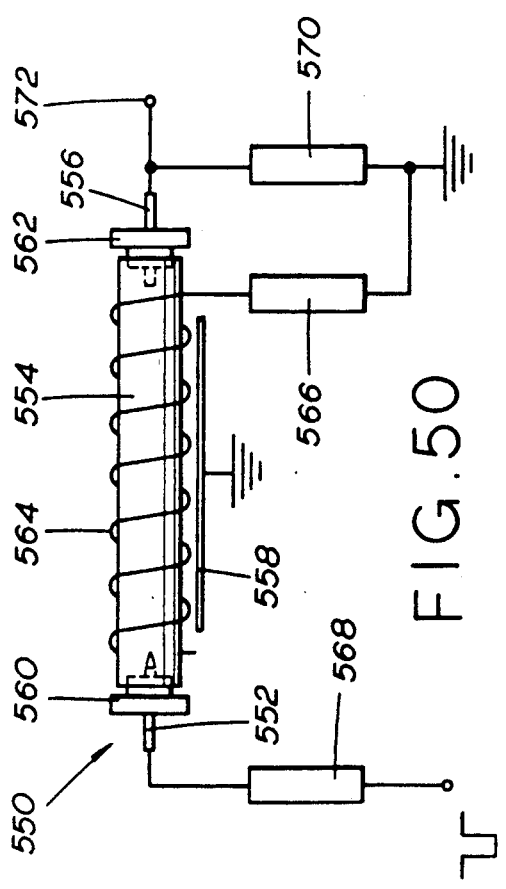
FIG.50

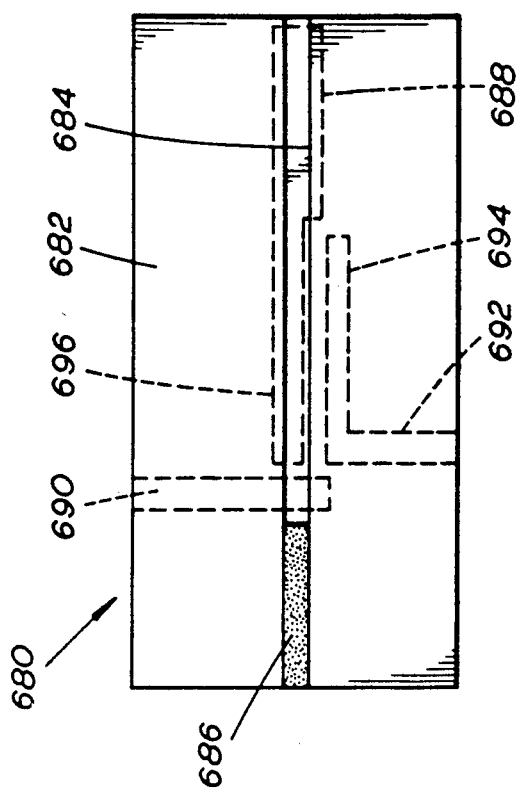
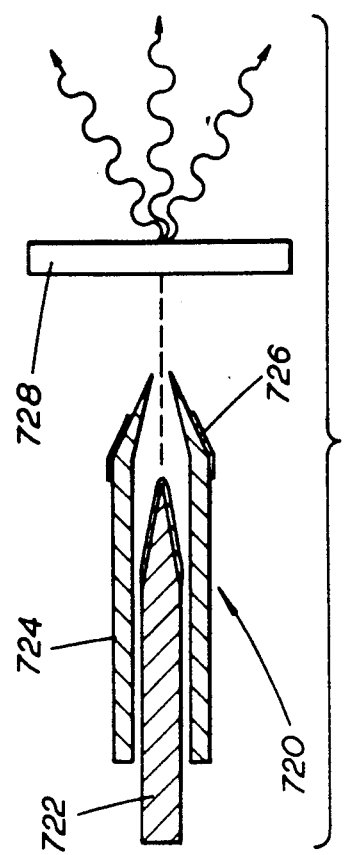
FIG.55
FIG.57
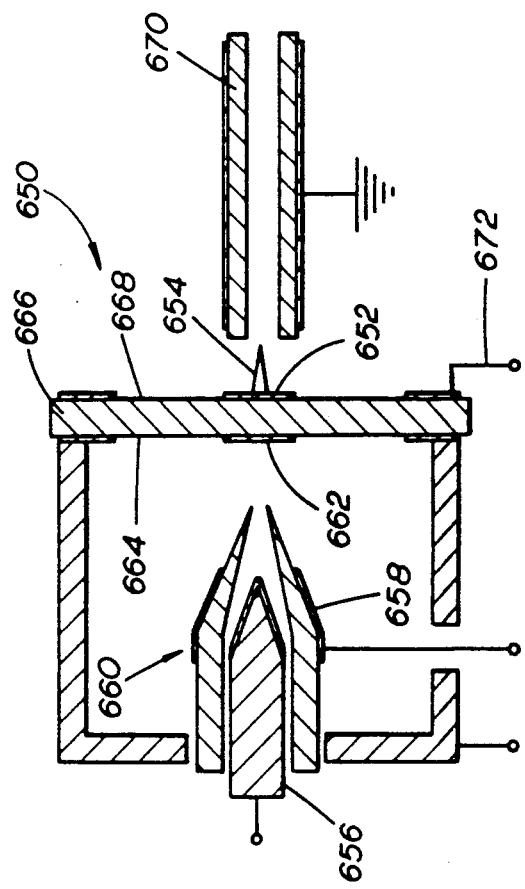
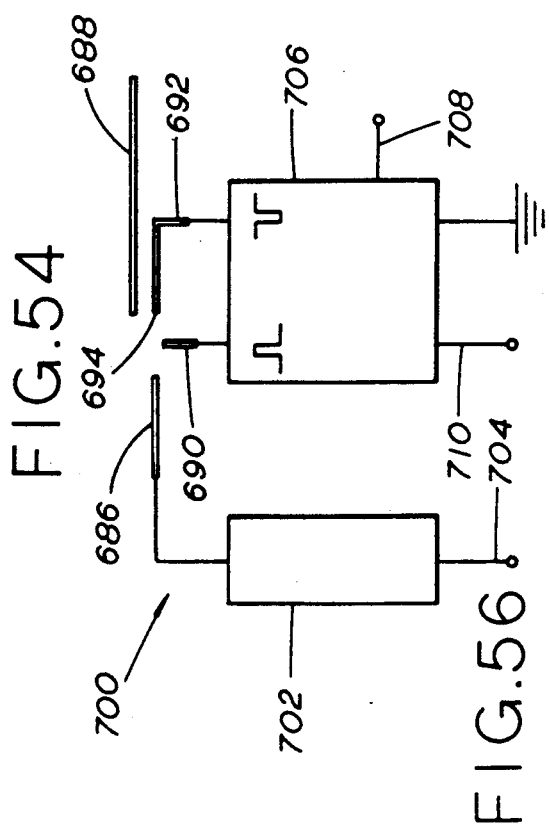
FIG.54
FIG.56

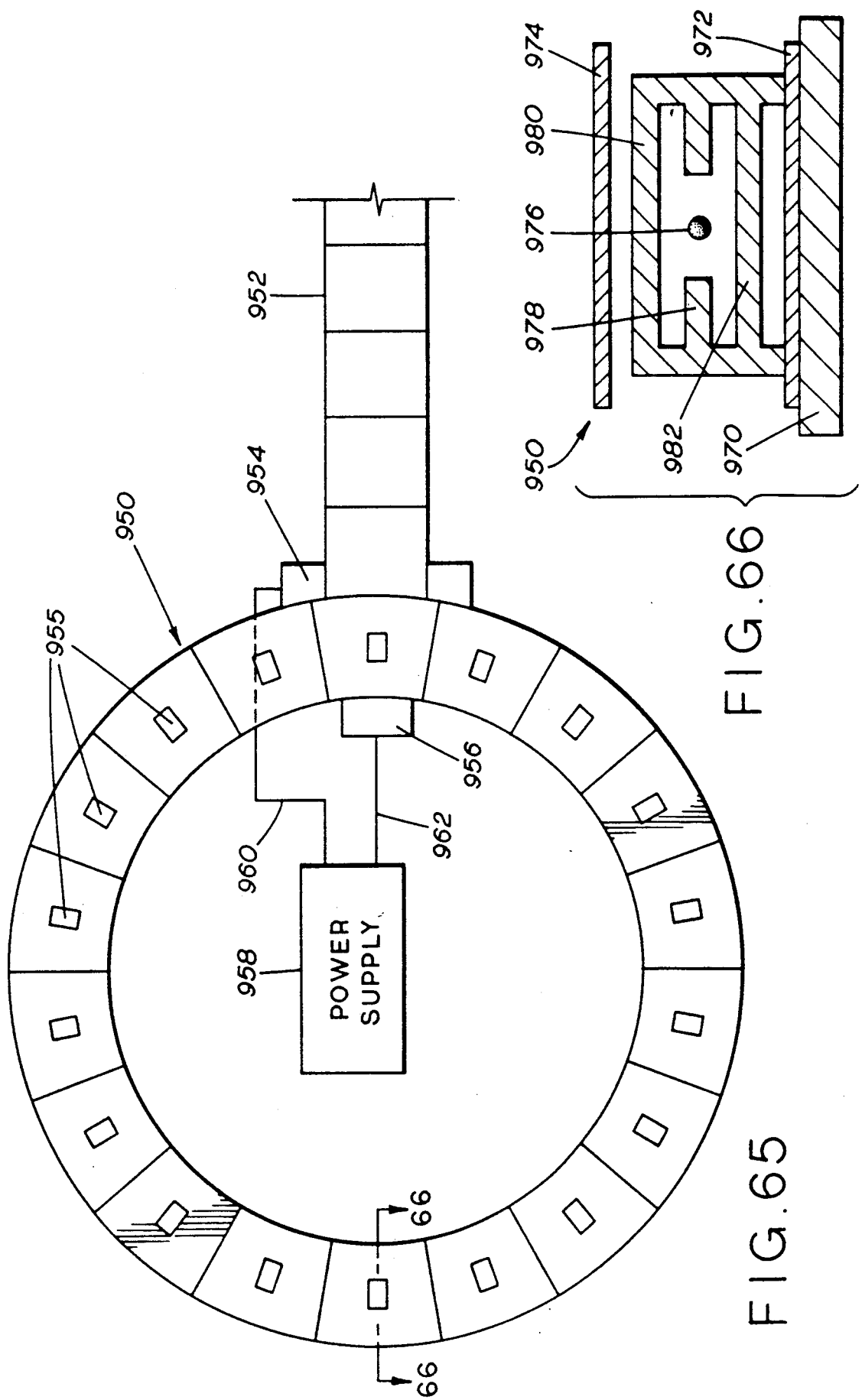

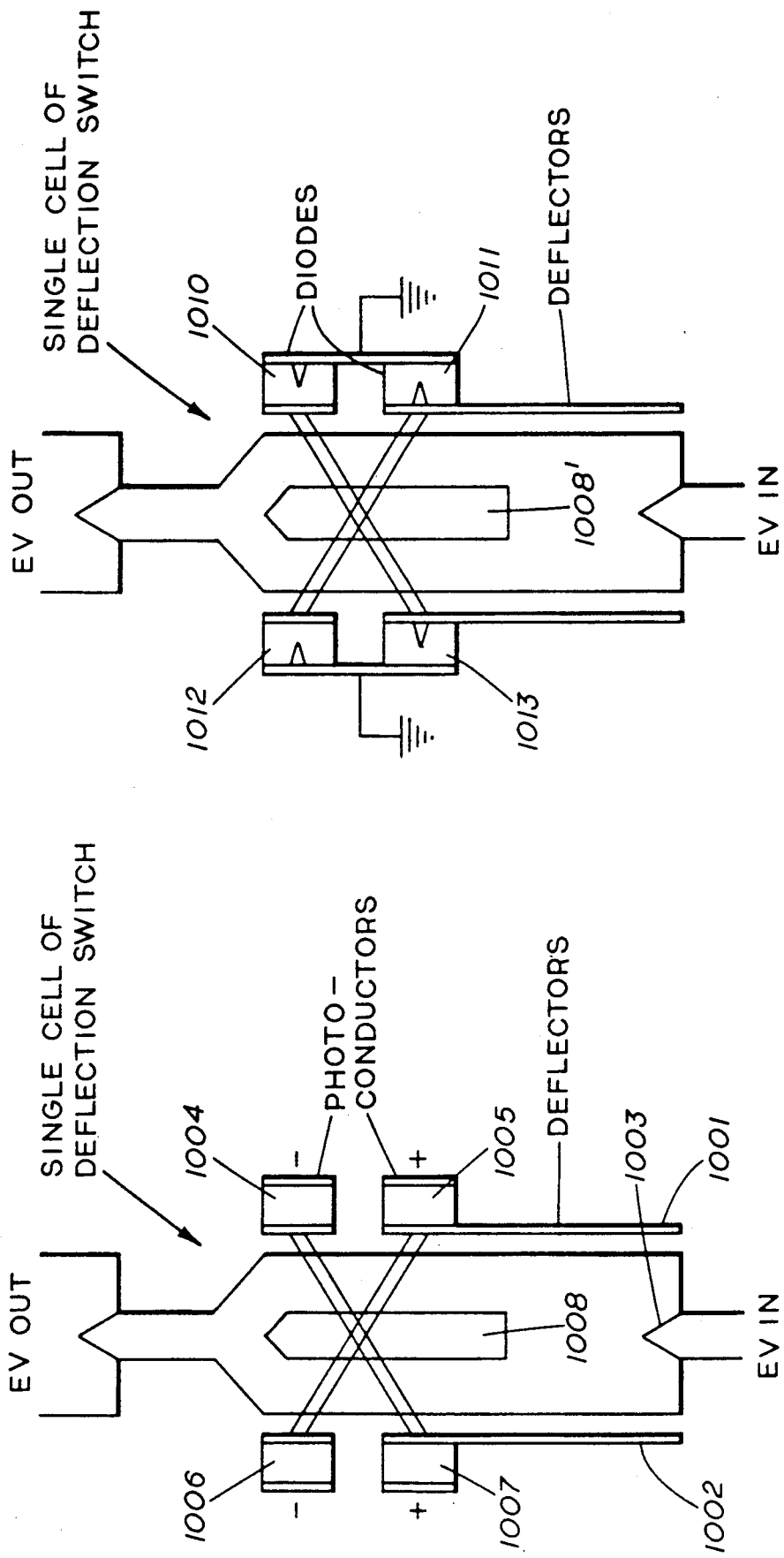

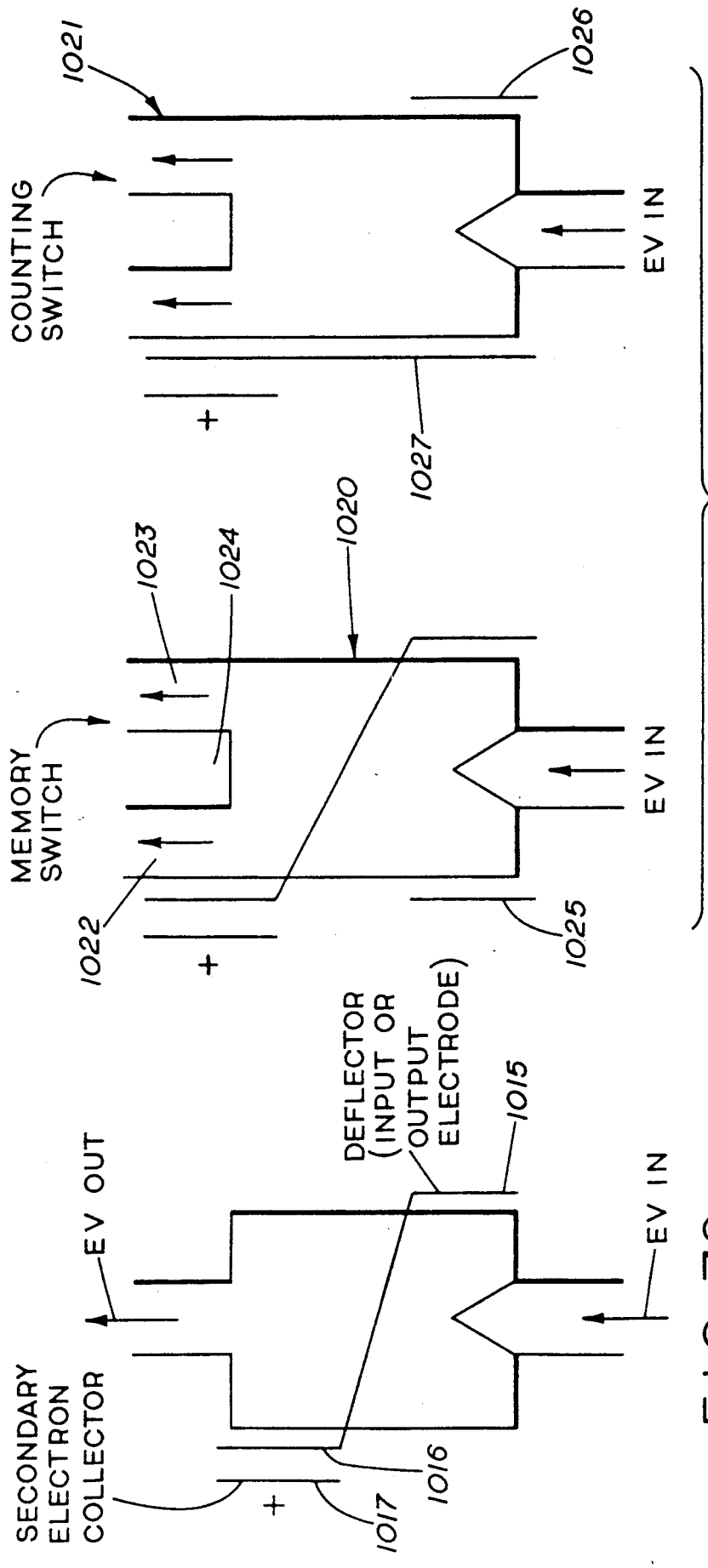

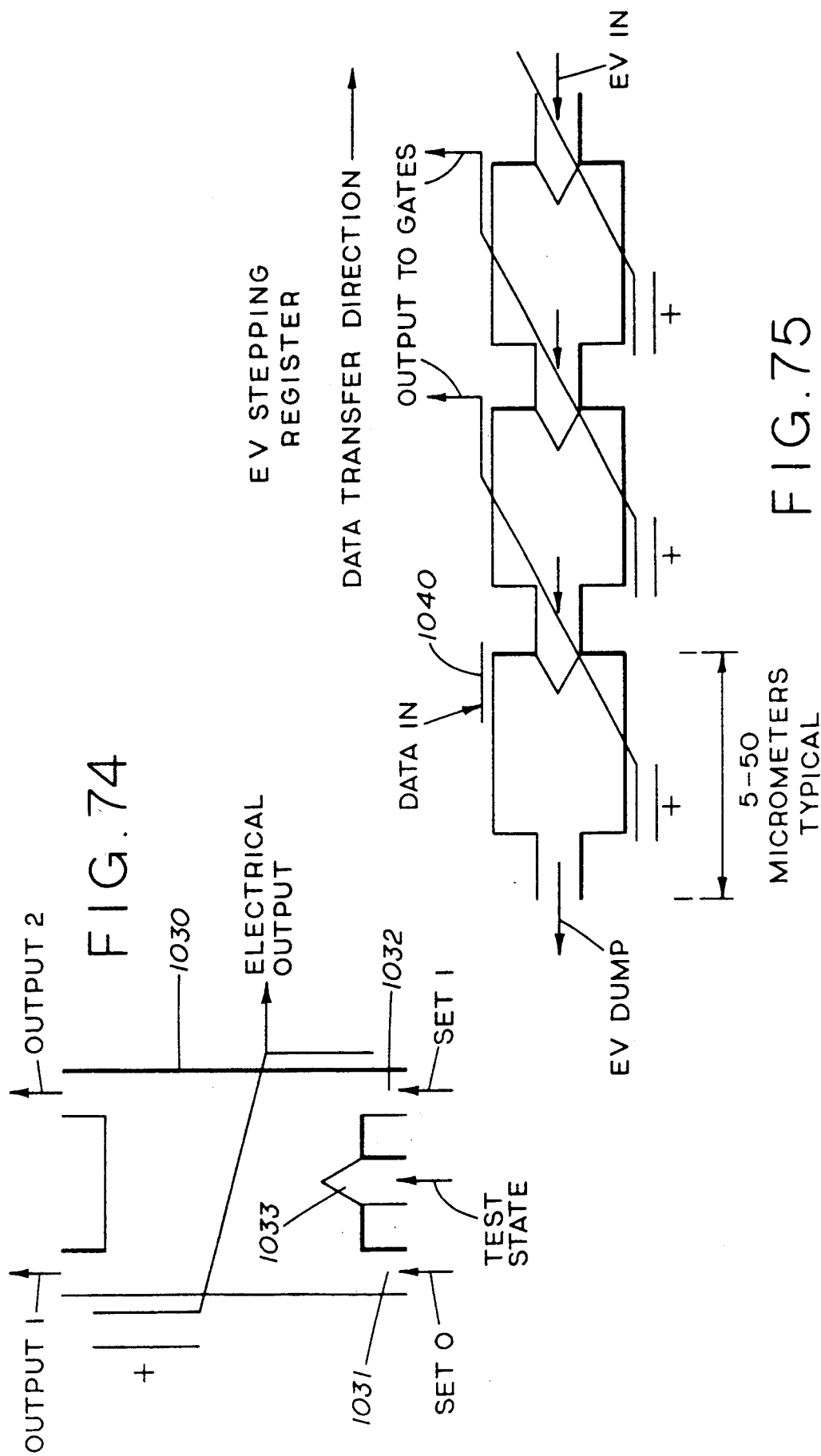

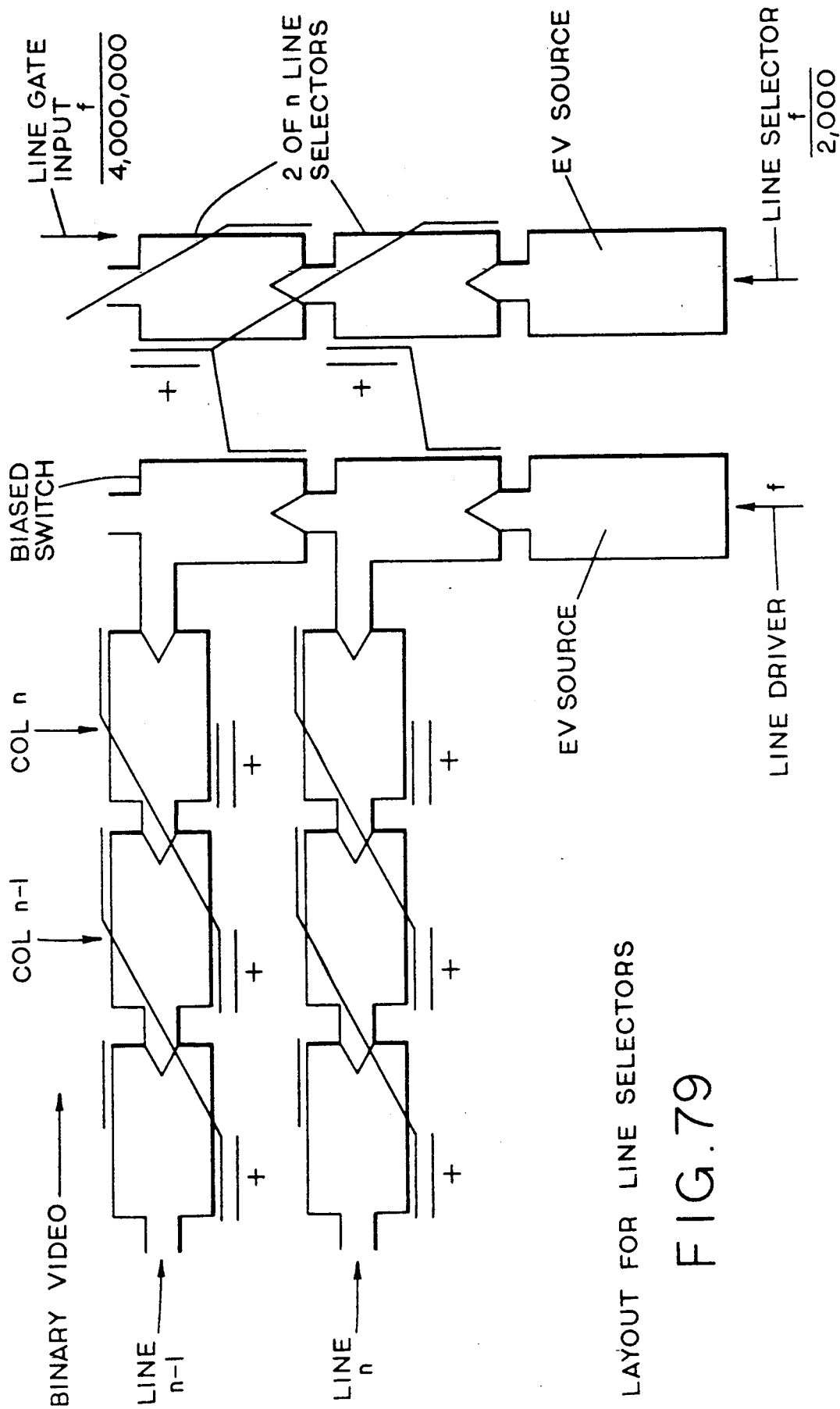
FIG. 79 LAYOUT FOR LINE SELECTORS

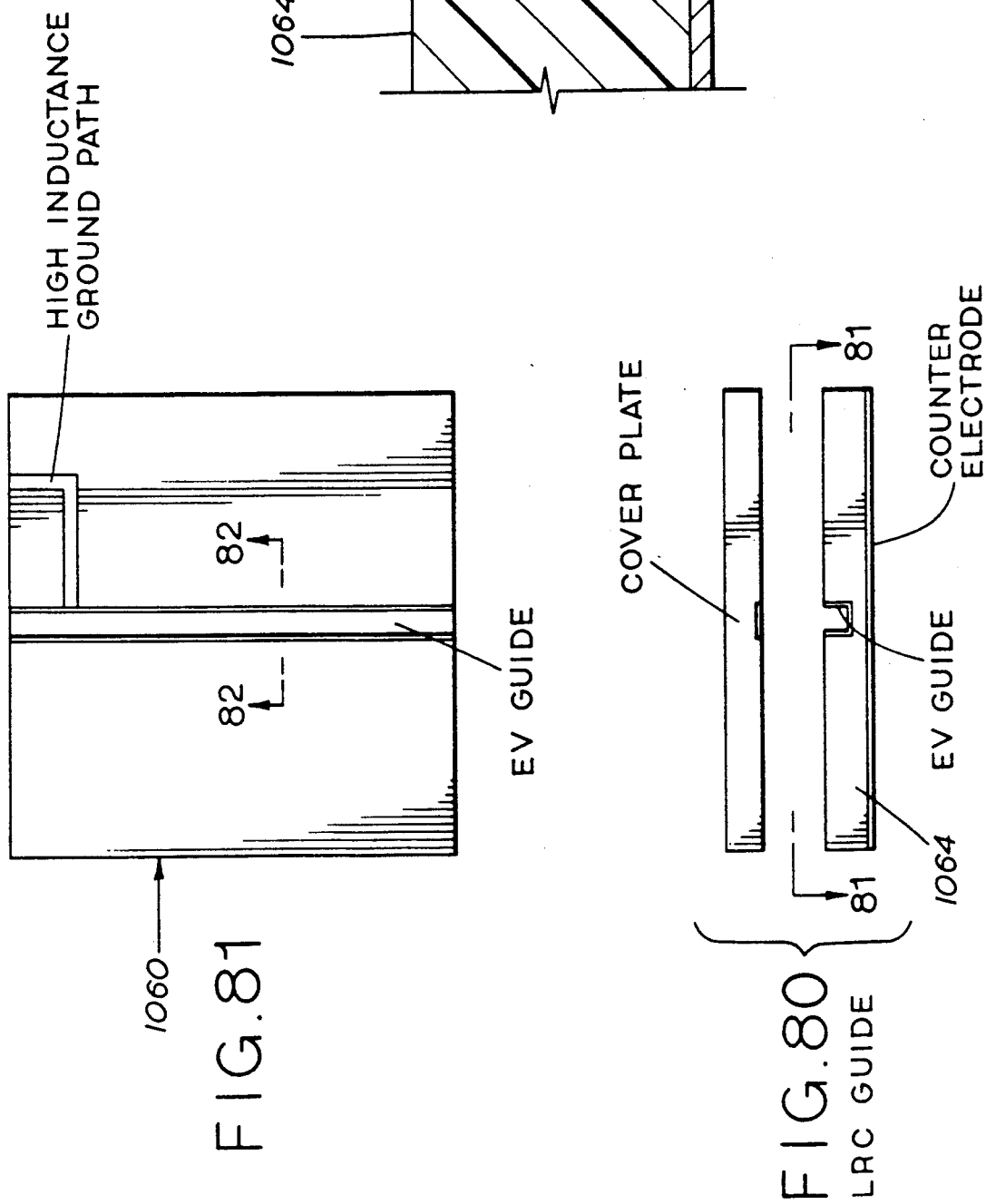

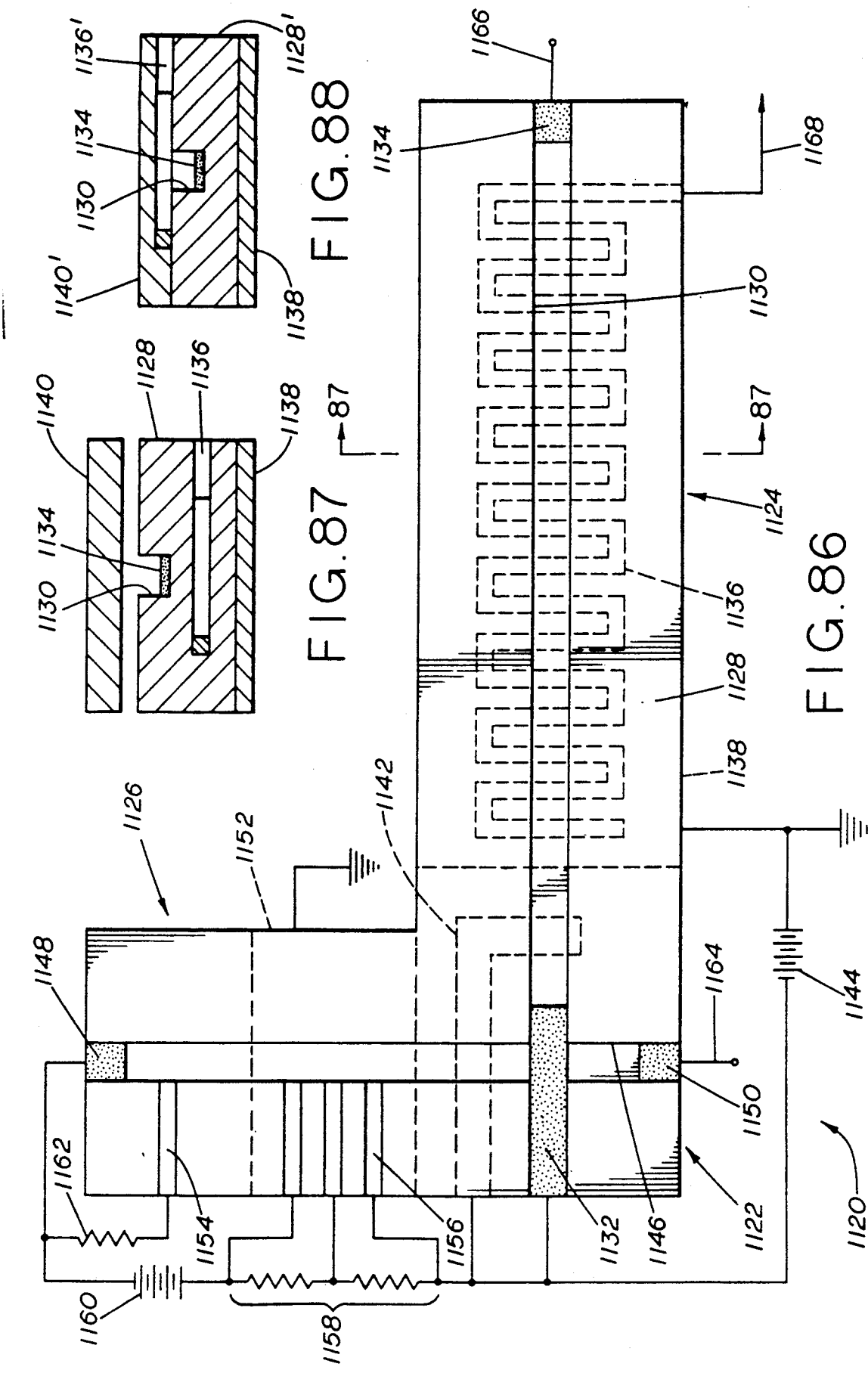

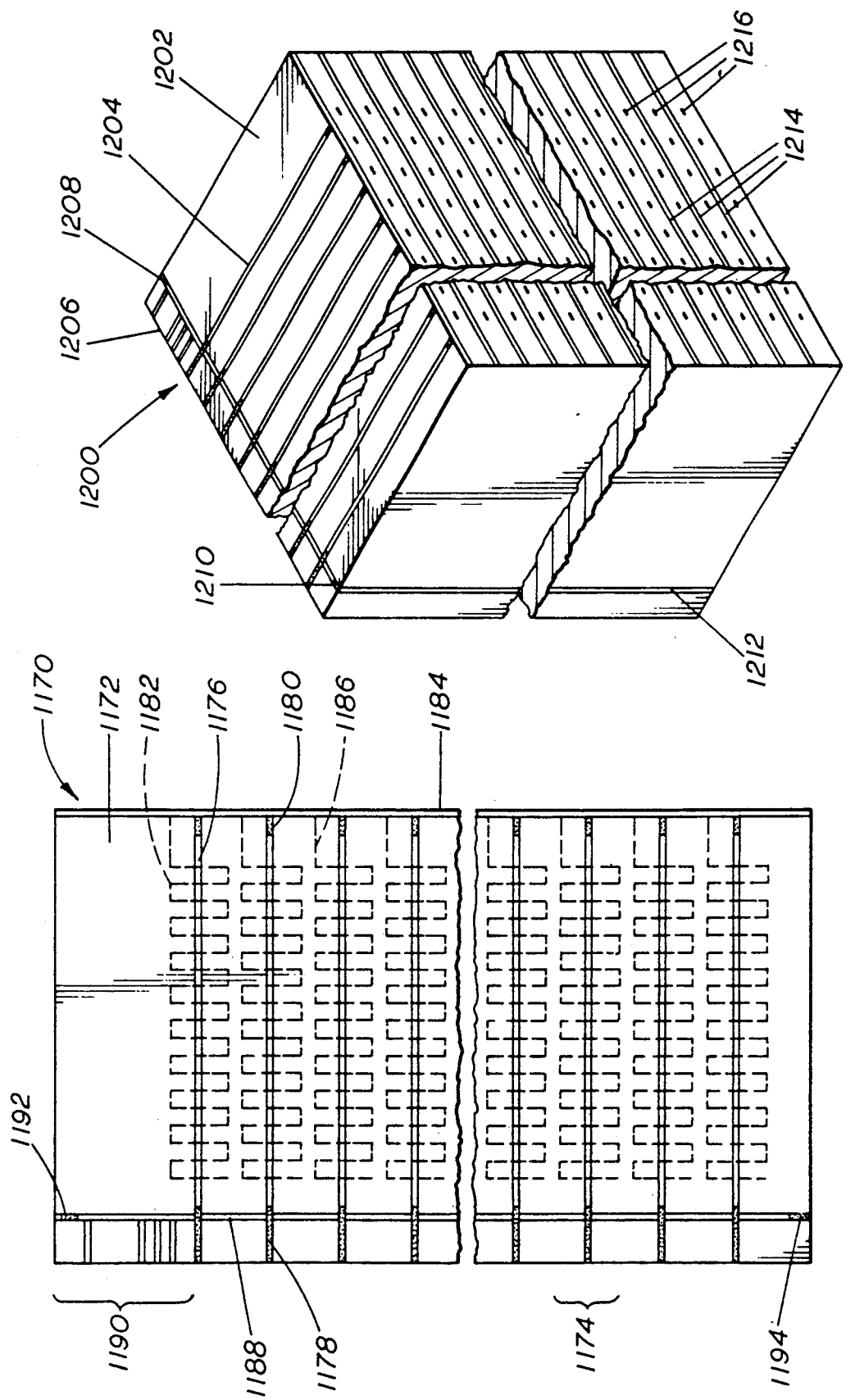

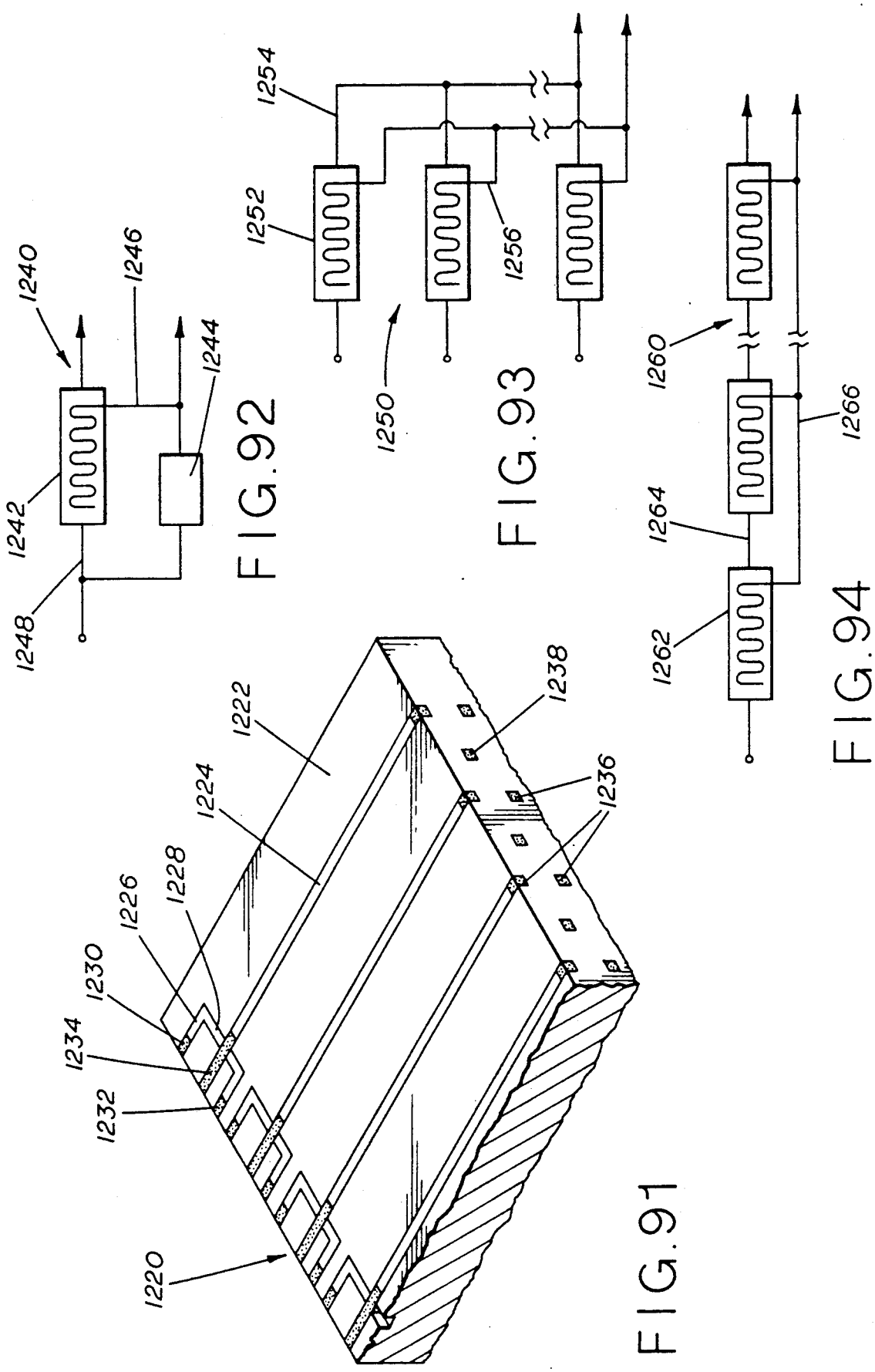

ENERGY CONVERSION USING HIGH CHARGE DENSITY

CROSS REFERENCE TO RELATED APPLICATIONS

This application is a continuation-in-part of co-pending U.S. patent application Ser. No. 07/183,506 filed May 3, 1988, now abandoned, which is a continuation-in-part of co-pending U.S. patent application Ser. No. 07/137,244, filed Jan. 6, 1988, now abandoned.

BACKGROUND OF THE INVENTION

1. Field of the Invention

The present invention pertains to the production, manipulation and exploitation of high electrical charge density entities. More particularly, the present invention relates to high negative electrical charge density entities, generated by electrical discharge production, and which may be utilized in the transfer of electrical energy.

2. Brief Description of Prior Art

Intense plasma discharges, high intensity electron beams and like phenomena have been the subjects of various studies. *Vacuum Arcs Theory and Application*, Edited by J. M. Lafferty, John Wiley & Sons, 1980, includes a brief history of the study of vacuum discharges, as well as detailed analyses of various features of vacuum arcs in general. Attention has been focused on cathode spots and the erosion of cathodes used in producing discharges, as well as anode spots and structure of the discharges. The structure of electron beams has been described in terms of vortex filaments. Various investigators have obtained evidence for discharge structures from target damage studies of witness plate records formed by the incidence of the discharge upon a plane plate interposed in the electrical path of the discharge between the source and the anode. Pinhole camera apparatus has also disclosed geometric structure indicative of localized dense sources of other radiation, such as X-rays and neutrons, attendant to plasma focus and related discharge phenomena. Examples of anomalous structure in the context of a plasma environment are varied, including lightning, in particular ball lightning, and sparks of any kind, including sparks resulting from the opening or closing of relays under high voltage, or under low voltage with high current flow.

The use of a dielectric member to constrain or guide a high current discharge is known from studies of charged particle beams propagating in close proximity to a dielectric body. In such investigations, the entire particle flux extracted from the source was directed along the dielectric guide. Consequently, the behavior of the particle flux was dominated by characteristics of the gross discharge. As used herein, "gross discharge" means, in part, the electrons, positive ions, negative ions, neutral particles and photons typically included in an electrical discharge. Properties of particular discrete structure present in the discharge are not clearly differentiated from average properties of the gross discharge. In such studies utilizing a dielectric guide, the guide is employed wholly for path constraint purposes. Dielectric guides are utilized in the context of the present invention for the manipulation of high charge density entities as opposed to the gross discharge.

The structure in plasma discharges which has been noted by prior investigators may not reflect the same causal circumstances, nor even the same physical phenomena, pertinent to the present invention. Whereas the high charge density entities of the present invention may be present, if unknown, in various discharges, the present invention discloses an identification of the entities, techniques for generating them, isolating them and manipulating them, and applications for their use. The technology of the present invention defines, at least in part, a new technology with varied applications, including, but not limited to, execution of very fast processes, transfer of energy utilizing miniaturized components, time analysis of other phenomena and spot production of X-rays.

An explanation and a discussion of the historical treatment of zero-point energy of the vacuum are given by Timothy H. Boyer in "The Classical Vacuum," in *Scientific American*, p. 70 (August, 1985). R. L. Forward, "Extracting Electrical Energy from the Vacuum by Cohesion of Charged Foliated Conductors," *Phys. Rev. B* 30, 1700 (1984) discusses the possibility of obtaining electrical energy from the zero-point energy.

SUMMARY OF THE INVENTION

The present invention involves a high charge density entity which I believe is a relatively discrete, self-contained, negatively charged, high density state of matter that appears to be produced by the application of a high electrical field between a cathode and an anode. I have named this entity ELECTRUM VALIDUM, abbreviated "EV," from the Greek "elektron" for electronic charge, and from the Latin "valere" meaning to have power, to be strong, and having the ability to unite. As will be explained in more detail hereinafter, EV's are also found to exist in a gross electrical discharge. In the present invention there are derived discrete EV's comprising individual EV's as well as EV "chains" identified hereinbelow. Regardless of the nature of the phenomena, charged particles are produced such that plural discrete optical energy pulses are derived in a channel or slot of a dielectric in response to a single voltage pulse being applied to the cathode. For ease of reference the charged particles which produce these pulses are reference to herein as EV's.

It is an object of the present invention to obtain electrical energy from an EV propagating, for example, by an electrical conductor arrayed in periodic form, or by a conducting body having one or more openings through which electromagnetic radiation may pass. Thermal energy may also be obtained upon the collection or dissipation of an EV.

It is yet another object of the invention to propagate an EV by a traveling wave conductor, or a conductor with radiation emission ports, and to extract energy converted from the vacuum by means the EV.

Multiple traveling wave devices may be joined together in a single circuit. An EV used to extract electrical energy may be so used again in a circulator; dc electrical energy from such an EV may be used to generate another EV used to obtain electrical energy. Further, energy from the traveling wave conductor of a traveling wave device may be used to generate another EV. A bank or a stack of traveling wave devices may be formed to obtain electrical energy.

BRIEF DESCRIPTION OF THE DRAWINGS

FIG. 1 is a top, plan view of an EV generator including a witness plate for detecting the production of EV's;

FIG. 2 is a side elevation of the EV generator of FIG. 1;

FIG. 3 is a side elevation in cross section, partly schematic, of another form of EV generator;

FIG. 8 is a side elevation in partial section of a cylindrically-symmetric EV generator utilizing a separator;

FIG. 9 is a side elevation in partial section of a planar EV generator with a separator;

FIG. 10 is a top plan view of the separator cover shown in FIG. 9;

FIG. 11 is a top plan view of a planar RC EV guide;

FIG. 12 is an end elevation of the EV guide of FIG. 11, equipped with a cover;

FIG. 13 is a top plan view of another form of planar RC EV guide;

FIG. 14 is an end elevation of the EV guide of FIG. 13;

FIG. 15 is a side elevation in cross section of a cylindrically-symmetric RC EV guide;

FIG. 16 is a side elevation in cross section of another form of cylindrically-symmetric RC EV guide;

FIG. 17 is a side elevation of an EV generator in conjunction with an EV guide utilizing a gas environment;

FIG. 18 is an end elevation of the generator and guide of FIG. 17;

FIG. 19 is a top plan view of an EV guide system using optical reflectors;

FIG. 22 is a top plan view of still another form of EV generator in which the cathode is integral with a propagating surface for the EV's within a guide channel;

FIG. 23 is a vertical cross section of the EV generator of FIG. 22 taken along section lines 23—23 of FIG. 22;

FIG. 24 is an end elevation of the EV generator shown in FIGS. 22 and 23, equipped with a cover;

FIG. 25 is a side elevation in cross section of a cylindrically-symmetric EV generator-launcher;

FIG. 26 is a side elevation in partial section of a cylindrically symmetric EV selector and a guide;

FIG. 27 is a top plan view of a planar EV selector;

FIG. 28 is an end elevation of the EV selector of FIG. 27;

FIG. 29 is a top plan view of an EV splitter;

FIG. 30 is an end elevation of the EV splitter of FIG. 29;

FIG. 31 is a top plan view of another EV splitter;

FIG. 32 is an end elevation of the EV splitter of FIG. 31, equipped with a cover;

FIG. 33 is a top plan view of a variable time delay EV splitter;

FIG. 34 is a fragmentary vertical cross section of a portion of the splitter of FIG. 33, taken along line 34—34 of FIG. 33;

FIG. 37 is a vertical cross section of the EV deflection switch of FIG. 36, taken along line 37—37 of FIG. 36;

FIG. 38 is an end elevation of the deflection switch of FIGS. 36 and 37;

FIG. 39 is a top plan view of an EV oscilloscope;

FIG. 40 is an end elevation of the EV oscilloscope of FIG. 39, equipped with a cover and illustrating the use of an optical magnification device with the oscilloscope;

FIG. 41 is a side elevation, partially cut away, of a electron camera showing an EV source positioned in front thereof;

FIG. 42 is a vertical cross section of the electron camera of FIG. 41, taken along line 42—42 of FIG. 41;

FIG. 43 is a side elevation of a camera as shown in FIGS. 41 and 42, mounted to view an EV oscilloscope, and showing the lens system of a television camera mounted to view the output of the electron camera;

FIG. 46 is a top plan view of another planar multielectrode generator;

FIG. 47 is a vertical cross section of the multielectrode EV generator of FIG. 46, taken along line 47—47 of FIG. 46;

FIG. 48 is an end view of the multielectrode generator of FIGS. 46 and 47;

FIG. 49 is a side elevation in cross section of an "electrodeless" EV source;

FIG. 50 is a side elevation, partly schematic, of a traveling wave tube utilizing EV's;

FIG. 51 is a top plan view, partly schematic, of a planar traveling wave circuit utilizing EV's;

FIG. 52 is a vertical cross section of a pulse generator utilizing EV's;

FIG. 53 is an end view of the pulse generator of FIG. 52;

FIG. 54 is a side elevation in partial section of a field emission EV generator utilizing the principles of the pulse generator of FIGS. 52 and 53;

FIG. 55 is a top plan view of a planar field emission EV generator;

FIG. 56 is a circuit diagram for operating the field emission EV generator of FIG. 55;

FIG. 57 is a side elevation in partial section of an X-ray generator utilizing EV's;

FIG. 65 is a plan view, schematically illustrating a circulator device for circulating EV's;

FIG. 66 is a cross-sectional view of the circulator according to FIG. 65, taken along the section lines 66—66 of FIG. 65;

FIG. 70 is a schematic illustration of a photo activated storage device for use with EV's;

FIG. 71 is a schematic illustration of a diode activated storage device for use with EV's;

FIG. 72 is a schematic illustration of a charge activated storage device for use with EV's;

FIG. 73 illustrates, schematically, a pair of EV switching devices;

FIG. 74 is a schematic illustration of a storage device which uses EV's to set the device;

FIG. 75 is a schematic illustration of an EV stepping register;

FIG. 79 illustrates schematically, in block diagram, a layout of the line selector responsible for selecting and feeding EV's into the appropriate line of stepping registers;

FIG. 80 is an end view of an LRC guide for use with EV's;

FIG. 81 is a plan view of the LRC guide illustrated in FIG. 80;

FIG. 82 is an expanded view, in elevation, of the guide channel used in the LRC guide illustrated in FIGS. 80 and 81;

FIG. 86 is a top plan view, partly schematic, of a planar traveling wave circuit including a driver generator for providing EV's for use in the traveling wave device, and a triggering source used in operating the driver generator;

FIG. 87 is a vertical cross section taken along line 87—87 of FIG. 86 and further showing the use of a counterelectrode and the positioning of the serpentine conductor;

FIG. 88 is a view similar to FIG. 87, but illustrating the positioning of a serpentine conductor above the EV channel;

FIG. 89 is a top plan view of a bank of planar traveling wave circuits, arranged to be sequentially triggered by the same EV;

FIG. 90 is a perspective view of a stack of planar traveling wave circuits, with the circuits in each horizontal layer, or bank, arranged to be sequentially triggered by the same EV;

FIG. 91 is an enlarged, fragmentary view of a stack of planar traveling wave circuits, similar to FIG. 90, but wherein each of the circuits is individually triggered;

FIG. 92 is a circuit diagram including a traveling wave device and a feedback loop;

FIG. 93 is a circuit diagram in which the outputs of multiple traveling wave devices are arranged in parallel;

FIG. 94 is a circuit diagram in which multiple traveling wave devices are arranged in series, but with their traveling wave outputs connected in parallel;

DESCRIPTION OF PREFERRED EMBODIMENTS

1. Definition and Some EV Properties

What is referred to herein as an EV is a discrete, contained, bundle of charged particles which are predominantly electrons. While not yet fully understanding the configuration of an EV, I believe the containment to be due to electromagnetic fields set up between the electrons within the bundle, based upon my many observations of EV behavior. This, of course, is in sharp contrast to a conventional electron beam in which the containment of electrons is due either to an external electrostatic field or an external magnetic field. As is well known in the art, electrons, each being negatively charged, tend to repel each other.

It should also be appreciated that even though the EV is a contained bundle of electrons, it does prefer to communicate with other objects or entities, such as other EV's, dielectrics and electrodes, for example, as contrasted with going off on its own, and tends to come apart after some period of time if there is nothing with which to communicate.

Primary characteristics of an EV include its relatively small size (for example on the order of one micrometer in lateral dimension, but can be larger or as small as 0.1 micrometer), and high, uncompensated electron charge (that is, without positive ions, or at least with an upper limit of one ion per 100,000 electron charges), typically on the order of $10^{11}$ electron charges. The minimum charge observed for a one micrometer EV is $10^8$ electron charges. The velocity attained by an EV under applied fields (on the order of one tenth the speed of light) indicates that the EV charge-to-mass ratio is similar to that of an electron, and deflection of EV's by fields of known polarity shows that EV's respond as electrons, that is, as negatively charged entities.

Figure 61:
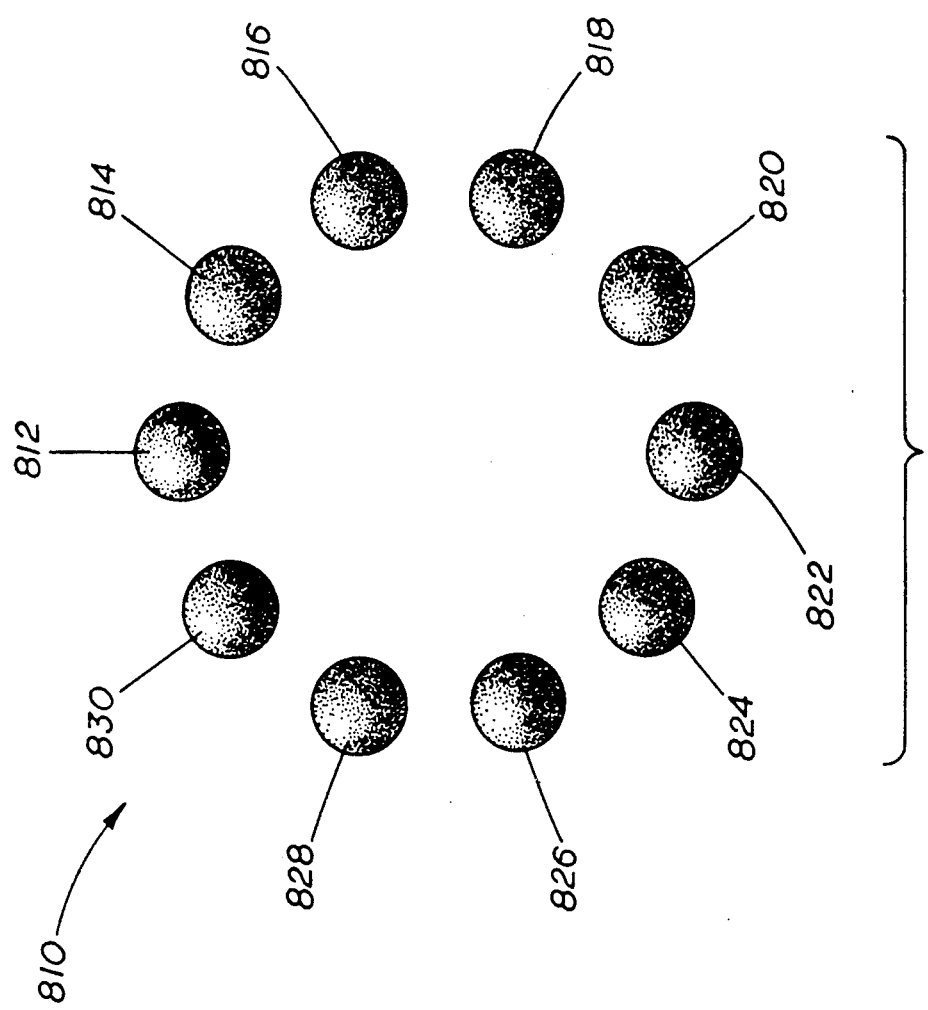
FIG. 61 is a schematic, pictorial view of a chain of EV's.
Figure 60:
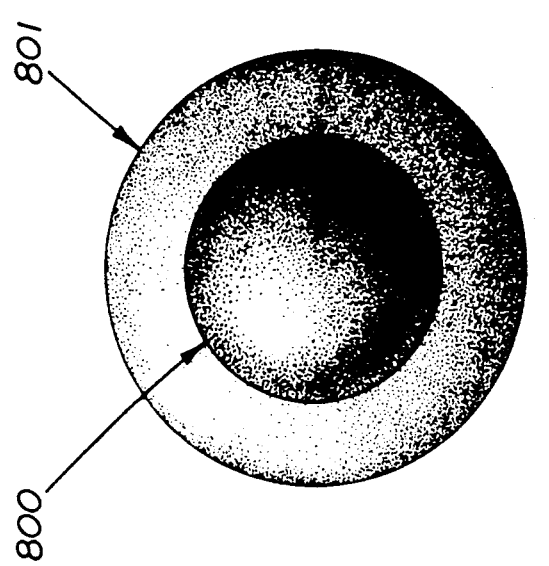
FIG. 60 is a schematic, pictorial view of an EV.

As best as can be determined at present, the shape of an EV is most likely generally spherical, but may be toric, and could have fine structure. As schematically illustrated in FIG. 60, an EV is illustrated as having a central sphere 800 of contained electrons, surrounded by an electromagnetic field 801. Coupling between EV's produces quasi stable structures. However, lone EV's are rarely observed EV's exhibit a tendency to link up like beads in a chain, for example, as schematically illustrated in FIG. 61, wherein the EV beads in the chain may be somewhat free to rotate or twist about each other under the influence of external forces or internal forces. The chains, which are closed, may be observed to form ring-like structures as large as 20 micrometers in diameter, and multiple chains may also unite and mutually align in relatively orderly fashion. In the chain 810 of FIG. 61, the ten EV's 812, 814, 816, 818, 820, 822, 824, 826, 828 and 830 are shown generally in a circular pattern. Spacing of EV beads in a chain is normally approximately equal to the diameter of the individual beads. Spacing of one chain ring from another is on the order of one ring diameter. A one micrometer wide ring of ten EV beads, which is the typical number of beads in a chain, may include $10^{12}$ electron charges. Individual EV beads may be observed within a chain ring. An EV entity, which is in the nature of a non-neutral electron plasma, is most strongly bound, with the binding force between EV beads in a chain being weaker, and finally the binding between chains of beads being the weakest. However, all of the binding energies appear to be greater than chemical binding energy of materials. Additional EV properties are discussed hereinafter.

2. Generators

An EV may be generated at the end of an electrode that has a sufficiently large negative voltage applied to it. FIGS. 1 and 2 illustrate an EV generator, shown generally at 10, including a cathode 12 generally in the form of an elongate rod having a neck portion 12a ending in a point and directed generally downwardly toward an anode plate 14 separated from the cathode by an intervening dielectric plate 16. As indicated in the drawing, the anode, or collector electrode, 14 is maintained at a relatively positive voltage value, which may be ground, and a negative pulse on the order of 10 kv is applied to the cathode 12 to generate an intense electric field at the point of the cathode. With the resulting field emission at the cathode tip. One or more EV's are formed, generally in the vicinity of where the point of the cathode approaches or contacts the dielectric at A. The EV's are attracted to the anode 14, and travel across the surface of the dielectric 16 toward the anode, generally along a path indicated by the dashed line B, for example, as long as the dielectric surface is uncharged. Propagation of one, or several EV's, along the dielectric surface appears to leave the surface locally charged. A subsequent EV will follow an erratic path on the surface unless the surface charge is first dispersed, as discussed in detail hereinafter. The insulating dielectric plate 16, which is preferably of a high quality dielectric, such as quartz, prevents a direct discharge between the cathode 12 and the anode 14, and provides a surface along which the EV's may travel.

If desired, a witness plate 18 may be positioned adjacent the anode 14 to intercept the EV's from the cathode 12. The witness plate 18 may be in the form of a conducting foil which will sustain visible damage upon impact by an EV. Thus, the witness plate 18 may be utilized to detect the generation of EV's as well as to locate their points of impact at the anode 14. Additionally, an EV propagating across the dielectric surface will make an optically visible streak on the surface. As discussed in further detail hereinafter, other components may be utilized in conjunction with the generator 10 to further manipulate and/or exploit the EV's thus generated.

The generator 10 may be located within an appropriate enclosure (not shown) and thus operated in vacuum or in a controlled gaseous atmosphere as desired. In general, all of the components disclosed herein may be so positioned within appropriate enclosures to permit selection of the atmosphere in which the components are operated. Terminals or the like, and gas transmission lines may be utilized to communicate electrical signals and selected gas at desired pressure through the enclosure walls.

The scale indication of 10 mm included in FIG. 1 is a typical dimension for EV generating components. Generally, when EV's are generated and manipulated in small numbers, they can be made and guided by small structures. Even when large structures are used, an EV seeks the smallest details of the gross structures and is guided by them and interacts most actively with them, leaving the larger details unattended. To a first approximation, generation and manipulation of individual EV beads may be accomplished with structures having overall dimensions of as little as ten micrometers.

Generally, very stable materials are desired for use in the construction of structures to generate, manipulate and exploit EV's, including refractory metals and dielectrics chosen to approach as closely as possible the binding energy of an EV, so as to preserve the life of the structures. Some dielectric materials, such as low melting point plastic, are not as preferable as other materials, for example, such as ceramic.

With any type of EV generator, and whether dc or a pulse signal is applied to the cathode, it is necessary to complete the current flow path around a loop by using an electrode of some type to collect the EV (except in the case of "electrodeless" sources as discussed hereinafter).

Another form of EV generator is shown generally at 20 in FIG. 3, and includes a cylindrically symmetric cathode 22 having a conical end facing but displaced from an anode/collector electrode 24 which is also cylindrically symmetric. An operating circuit includes a load resistor 26 connecting the anode 24 to ground, while a current limiting input resistor 28 is interposed between the cathode 22 and an input terminal 30. The anode 24 is equipped with an output terminal 32 to which may be connected ancillary equipment. For example, detection equipment (not shown), such as an oscilloscope, may be joined to the system by terminal 32 whereby the impact of EV's on the anode may be noted.

An enclosure, such as within a cylindrical glass tube 34, may be provided whereby the environment in the gap between the cathode 22 and the anode 24 may be controlled, and maintained either in vacuum or at a selected gas pressure. The tubing 34 may be appropriately sealed and fitted with communication lines (not shown) to a vacuum pump and/or gas supply to control the environment within the tube.

The cathode 22 may be driven by a negative-going pulse, or a direct current, of approximately 2 kv relative to the anode. The length of the negative pulse may be varied from a few nanoseconds to dc without greatly influencing the production of EV's. Under long pulse length conditions, the input resistor 28 must be chosen to prevent a sustained glow discharge within the glass tube. Under high vacuum conditions, or low pressure such as $10^{-3}$ torr, the discharge is easily quenched and the resistor 28 may be eliminated, but for a gaseous environment of higher pressure, a value of the resistor must be chosen that is consistent with the gas pressure used so as to quench the discharge. For operation in both a vacuum and gaseous regime using a pulse length of 0.1 microsecond, for example, a typical resistor value of 500 to 1500 ohms can be used.

In high vacuum operation of the generator 20, the spacing between the cathode 22 and the anode 24 should preferably be less than 1 mm for a 2 kv signal applied to the cathode. For operation in gases at pressures of a few torr, the distance between the cathode 22 and the anode 24 may be increased to over 60 cm provided a ground plane 36 is used adjacent the glass tubing as shown. The ground plane 36 may extend partly around the tubing 34, or even circumscribe the tube. For particular applications, the glass tube 34 can be replaced by other structures to guide EV's, as discussed hereinafter, and various circuits can be devised to take advantage of various EV properties.

3. Cathodes

Figure 4:
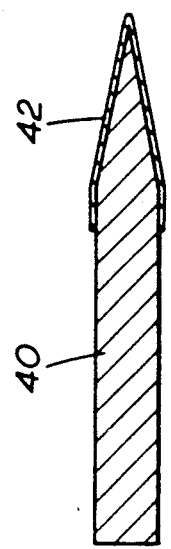
FIG. 4 is an enlarged side elevation in cross section of a wetted metal cathode for use in the EV generator of FIG. 3, for example.

The cathodes, such as 12 and 22 discussed hereinbefore, may be pointed by any appropriate technique, such as grinding and polishing, and even chemical etching, to achieve a sufficiently sharp point to allow the concentration of a very high field at the end of the cathode. Under normal conditions, as EV's are generated at the tip of such a metallic electrode, the electrode material is dispersed and the cathode point or other configuration is destroyed by the energy dissipated in it, and the voltage required to produce EV's increases. However, the cathode may be coupled to a source of liquid conductor, and the tip of the electrode regenerated in a very short time. FIG. 4 shows a metallic electrode 40 that is wetted with a conductive substance 42 coated onto the cathode whereby the coating material may undergo surface migration to the pointed tip of the electrode. The migrating material renews the tip of the electrode to maintain a sharp point as EV generation by the electrode tends to deteriorate the electrode tip. Surface tension of the coating material 42, its destruction at the tip, and the electric field generated at the cathode combine to propel the migration of the coating substance toward the tip.

Figure 5:
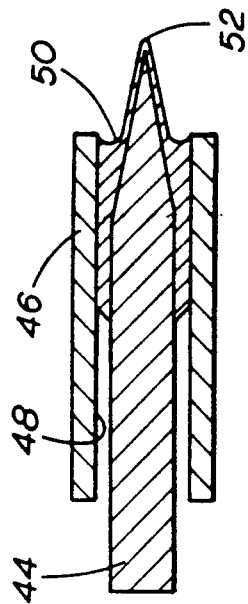
FIG. 5 is a view similar to FIG. 4 of another form of wetted metal cathode.

In FIG. 5 an electrode 44 is surrounded by a tube 46 whereby an annular spacing 48 is defined between the outer surface of the electrode and the inner surface of the tube. The spacing 48 serves to maintain a reservoir of coating material 50 which is held within the spacing by surface tension, but wets the cathode and migrates to the tip of the cathode in forming a coating 52 thereon to maintain an appropriately sharpened cathode point. The reservoir tube 46 is preferably a non-conductor, such as aluminum oxide ceramic, to prevent unwanted electron emission from the tube as well as unwanted migration of the wetting material along the tube. Otherwise, a conductor tube may be used as long as it is not too close to the cathode tip, whereupon the tube may emit electrons. The coating material 50 may, in general, be any metallic liquid such as mercury, which may appropriately migrate over an electrode 44 constructed of copper, for example.

Figure 6:
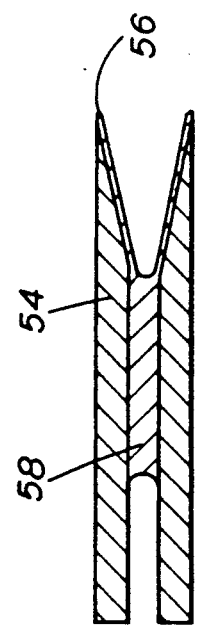
FIG. 6 is a view similar to FIGS. 4 and 5 of still another form of wetted metal cathode.

The cathodes 40 and 44 of FIGS. 4 and 5, respectively, are designed for EV emission from a specific point. In FIG. 6 a tubular cathode 54 features a conically shaped interior at one end forming a sharp, circular edge, or line, 56 at which EV's are generated. The cylindrical portion of the interior of the line cathode 54 defines, by means of surface tension, a reservoir of coating material 58 which wets and migrates along the conical interior surface of the cathode toward the emitting edge 56. Thus, the migrating material 58 renews the circular edge 56 to keep it appropriately sharp for EV generation.

Generally, for a source that can be fired repeatedly to produce EV's, a migratory conductor is needed on a conductive substrate that has a field-enhancing shape. The sharpened point of a cathode, such as shown in FIG. 4 or 5, may become further sharpened by the effect of the metallic coating wetted thereon being drawn into a microscopic cone by the applied field. Similarly, the coating material in a tubular cathode, such as shown in FIG. 6, is drawn to the circular edge due to field effects to provide a particularly sharp edge including microscopic emitting cones.

A wide variety of materials can be used to construct wetted cathodes in general. Typically, for room temperature operation of an EV generator, the cathode may be constructed of pointed copper wire coated with mercury. Alternatively, mercury can be coated onto silver or molybdenum. Similarly, gallium indium alloys or tin lead alloys can be used to coat a variety of substrate metals to form cathodes. Examples of cathode structures for use at high temperatures include aluminum coated titanium carbide for operations at 600° C., and boron oxide glass coated tungsten in operations at approximately 900° C.

Non-metal conductive coatings may also be used. For example, coatings of glycerin doped with potassium iodide or sodium iodide, and nitroglycerin doped with nitric acid, have been successfully used with a variety of metallic substrates such as copper, nickel, tungsten and molybdenum. The glycerin is nitrated by including acid, or doped, to impart some conductivity to the organic material. However, it is not necessary to dope for conductivity if the coating material is kept to a very thin layer. Polarization of such material is sufficient to allow the material to be moved in a field to thus pump the material to a field enhancing tip.

It will be appreciated that operation of a wetted source, particularly in a reduced ambient pressure environment, even a vacuum, is accompanied by the wetting material vaporizing, or yielding gaseous products. Thus, the metal-wetting material forms a vapor. Organic or inorganic gases may be acquired depending on the wetting substance. Field emission is accompanied by current through the cathode which heats the cathode, causing the vaporization of the wetting material. Field emitted electrons impact and ionize the vapor particles. The resulting positive ion cloud further enhances field emission to produce an explosive-like runaway process resulting in a high, local electron density.

Variations of wetted cathodes may enhance migration of wetting material, return evaporated material to the source, keep the field producing structure sharp and/or help reduce ionization time to allow high pulsing frequencies to produce EV's. To take advantage of the regeneration provided by wetting cathodes, the pulse rate of the signal applied to the cathode to generate EV's must be low enough to allow migration of the coating material to restore the point or line between pulses. However, for extended, or line, sources, such as the circular cathode 54 of FIG. 6, the pulse rate may be raised to much higher values than is practical for use with point sources since the complete regeneration of the line between pulses by coating migration is not necessary. Some portion of the line cathode is generally left sharp for subsequent EV production after production of EV's elsewhere along the line.

Figure 7:
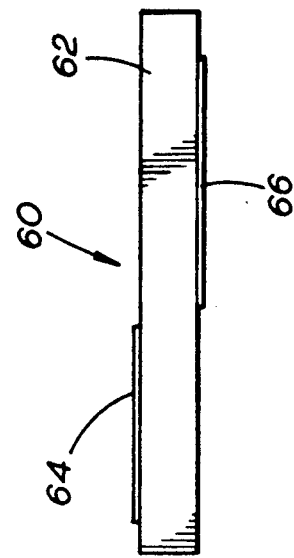
FIG. 7 is a side elevation of a cathode and an anode on a dielectric substrate.

FIG. 7 shows an EV generator 60 including a ceramic base 62 having a planar, or surface, cathode 64 positioned along one surface of the base, and a planar anode, or counterelectrode, 66 positioned along another surface of the base generally opposite to the position of the cathode. The cathode 64, which is effectively another form of extended or line source, may be coated with a metallic hydride, such as zirconium hydride or titanium hydride, to produce EV's. Such a cathode continues effective provided hydrogen is recharged into the hydride. This can be done by operating the generator, or source, in a hydrogen atmosphere so that the cathode is operating in the thyratron mode, which is a known hydride regeneration technique. However, since there is no flow of wetting material onto the cathode base material, after a period of use the coating material disperses and the source fails to fire. Consequently, in general, the surface source 64 has a shorter effective life than cathodes on which migratory material is deposited, such as those shown in FIGS. 4–6. Additional details of the construction and operation of a surface generator such as illustrated in FIG. 7 are provided hereinafter.

4. Separators

In general, the production of EV's is accompanied by the formation of a plasma discharge, including ions and disorganized electrons, generally where the EV's are produced at the cathode, with the plasma charge density being at least $10^6$ electron charges per cubic micrometer, and typically $10^8$ charges per cubic micrometer. In the case of a relatively short distance between cathode and anode of a source, the high plasma density accompanying the formation of the EV's is usually produced in the form of a local spark. As the distance between the cathode and the anode is increased, EV production and transmission is also accompanied by the formation of streamers, that is, excited ions in a gaseous mode along the path of an EV which yield light upon electron transition. As noted hereinbefore, an EV itself comprises an extremely high total charge density. Typically, a chain ring of ten EV beads, with each bead approximately 1 micrometer in width, may contain $10^{12}$ electron charges and, moving at approximately one-tenth the speed of light, may pass a point in $10^{-14}$ seconds, establishing a high current density easily distinguishable from ordinary electron current. Generally, in the case of a pulsed source, an EV may be expected to be formed for each pulse applied to the cathode, in addition to the extraneous charge production that may accompany EV production.

The various components of the plasma discharge present when EV's are formed are considered as contaminants to the EV, and are preferably stripped away from the EV propagation. Such stripping can be accomplished by enclosing the EV source in a separator, positioning an aperture or small guide groove between the source and the extractor electrode, or anode. A counterelectrode is provided on the enclosure for use in the formation of the EV's. The discharge contaminants are contained within the separator while the EV's may exit through the aperture or groove toward an extractor electrode.

An EV generator shown generally at 70 in FIG. 8, includes a cylindrically-symmetric and pointed cathode 72, which may be mercury wetted copper, for example, and a plate anode 74, and is equipped with a cylindrically-symmetric separator 76. The separator 76 includes a generally tubular member, constructed preferably of a dielectric, for example a ceramic such as aluminum oxide, that tapers beyond the point of the cathode 72 in a region 78 including a frustoconical exterior surface and a frustoconical interior surface of smaller angle of taper to form an aperture 80 defined by a relatively sharp circular end of the tubular member. When a dielectric is used for the tunnel 76, a counterelectrode 82 is formed on the exterior of the tunnel and maintained at a positive potential relative to the cathode 72, while the anode 74 is positive relative to the counterelectrode. Typically, the voltage values may be in the range of 4 kv, 2 kv and zero on the extractor anode 74, the counterelectrode 82 and the cathode 72, respectively. The electrode 82 not only provides the relative positive potential for the formation of the EV's but acts as a counterelectrode for propagating the EV's through the nozzle aperture 80, while the displaced anode 74 represents a load, for example, and may be replaced by any other type of exploiting load. Other materials, such as semiconductors, may be used to form the tunnel 76 with appropriate electrical isolation from the cathode 72. In such cases, the tunnel material itself can serve as a counterelectrode.

Since an EV induces an image charge in a dielectric separator 76, the EV tends to be attracted to the dielectric surface. However, the various contaminants of the formation discharge, including electrons and ions, may be repelled by the tunnel separator 76, at the same time the EV's are attracted to the tunnel. Thus, the EV's may emerge through the aperture 80 free of the discharge contaminants, which are retained within the separator 76. The cross section of the aperture 80 must be such as to allow emergence of EV's while at the same time providing a sufficiently narrow channel to retain the discharge contaminants and prevent their passage through the aperture.

The construction of the generator 70 with the tubular separator 76 having a small aperture 80 is relatively convenient for use with various environments between the cathode 72 and the anode 74. For example, the exit side of the nozzle formed by the separator 76 with the aperture 80 may be subject to vacuum or selected gas pressure as desired. The formation side of the nozzle, that is, the interior of the separator 76 in which the cathode 72 is positioned, may be vented to either vacuum or a gaseous region as selected, different from the exit side environment. Appropriate pumping can be utilized to maintain the desired environments.

While the separator 76 illustrated and described hereinabove is shaped like a funnel, I have found that a square box (not shown) having a small aperture, similar to 15, aperture 80, for the EV's to exit, works quite well in separating the EV's from the remainder of the electrical discharge, which as stated before, may include electrons, positive and negative ions, neutral particles and photons.

FIG. 9 shows an EV generator, indicated generally at 84, equipped with a separator designed for use in a planar construction for an EV generator. A dielectric base 86 is fitted with a surface cathode 88. A separator in the form of a dielectric cover 90 extends over and beyond the cathode 88, and terminates in a sloped exterior surface which, coupled with a sloped interior surface of smaller angle of slope, provides a relatively sharp edge suspended a short distance 92 above the surface of the base 86. As illustrated in FIG. 10, the separator 90 is also pointed in the transverse direction at the edge toward the spacing 92, and features walls 94 which cooperate with the sloped interior surface to define the peripheral limits of the region effectively enclosed between the separator cover and the base 86.

The outer flat surface of the cover 90 is partially coated with a counterelectrode 96, which extends downwardly approximately two-thirds the length of the sloped outer surface of the cover to provide a relative positive potential for the formation and propagation of EV's from the cathode 80. A target anode 98 is positioned on the opposite side of the ceramic base 86 to collect propagated EV's, and may be replaced by some other load used in manipulating and/or exploiting the generated EV's.

The separator 90 functions essentially like the separator 76 of FIG. 8 in that the EV's generated by the cathode 88 in FIG. 9 are attracted forward by the counterelectrode 96 of the cover 90 toward the opening 92, while extraneous discharge contaminants are retained within the cover 96. Alternatively, the cathode 88 may be set in a groove (not shown) extending beyond the back of the cover 90, and the cover set down on the base 86. A small groove may be provided on the underside of the cover, or on the base, in the area 92 to allow passage of EV's out of the cover enclosure. The groove of the cathode 88 may continue through the area 92 to allow exit of the EV's from under the cover 90. Additionally, the counterelectrode 96 may be deleted if the anode 98 extends to the left, as seen in FIG. 9, to underlie the area 92.

The base 86 and the separator cover 90 may be constructed from ceramic materials such as aluminum oxide, and the counterelectrode 96 and the anode 98 may be formed from a conductive layer of silver fired onto the ceramic substrate, for example. The cathode 88 may be formed of silver fired onto the dielectric, and wetted with mercury, for example.

Other coating processes for constructing conductor patterns, such as thermal evaporation or sputtering, may be used to form the counterelectrodes of the two separators 76 and 90 shown in FIGS. 8 and 9, respectively. The openings provided by the separators must be sufficiently small to permit emergence of the EV's while stripping away the discharge contaminants. For example, the aperture 80 of the separator 76 in FIG. 8 may be approximately 0.05 mm in diameter for the generator operating at 2 kv, and with a circular lip thickness of approximately 0.0025 cm. The lip and opening sizes provided by the cover separator 90 of FIG. 9 may be comparable. In either case, smaller openings can tolerate smaller voltages and still filter contaminants effectively. Generally, the exact cross-sectional shape of the separator is not of primary importance for the filtering function.

5. RC Guides

In general, an anode cooperates with a cathode in the application of appropriate electrical potential to generate EV's, and may serve as the target or load of the generator, and actually be impacted by EV's. In general, a counterelectrode is not impacted by EV's, but is used in the manipulation and control of EV's, and may be used in the generation of EV's. For example, the counterelectrodes 82 and 96 of FIGS. 8 and 9, respectively, contribute to drawing the EV's forward away from the region of EV generation at the respective cathodes, but the EV's continue on to possibly strike the anodes 74 and 98, respectively, although both counterelectrodes 82 and 96 also provide the EV formation voltage. As discussed more fully hereinafter, an EV may move along or close to the surface of a dielectric material placed in the path of propagation of the EV. If a ground plane, or counterelectrode, at an appropriate positive potential, relative to the generating cathode, is positioned on the opposite side of the dielectric material, the EV propagating on the cathode side of the dielectric material will tend to be attracted to the counterelectrode through the dielectric, and this attraction may be used to influence the path of the EV along the dielectric as discussed more fully hereinafter, particularly in the case of RC (resistance/capacitance) guides for EV's.

If an EV is directed toward a dielectric structure, backed by a counterelectrode or anode at relative positive potential, the EV may move on the surface of the dielectric in an apparent random fashion. However, the path of the EV is determined by local electrical effects, such as the dielectric polarizability, surface charge, surface topography, thickness of the dielectric and the initial potential of the backing electrode along with its conductivity. The major mechanism that affects the movement of EV's on dielectric surfaces is the polarizability of the dielectric producing an image force that attracts the EV to the dielectric, but doesn't move the EV forward. Even in the absence of a counterelectrode at an appropriate potential, the induced image charge tends to attract an EV to the dielectric surface. The EV cannot go into the dielectric. Consequently, an EV will tend to move across the surface of a dielectric and, when an edge or corner of 5 the dielectric material is reached, the EV will, in general, go around that corner. As noted hereinbefore, EV's tend to follow fine structural details, and this is evident from the guiding effect caused by surface scratches and imperfections. Generally, any intersection of two dielectric surfaces or planes having an angle of intersection less than 180° will tend to guide the EV along the line of intersection.

FIGS. 11 and 12 illustrate an EV guide component shown generally at 100, including a dielectric base member 102 featuring a smooth groove 104 providing an enhanced guide effect. A counterelectrode plate 106 covers most of the opposite surface of the base 102 from the groove 104, and may be maintained at relative positive potential with respect to the emitting cathode, which is generally directed toward one end of the groove. The guide component 100 may be utilized, for example, in conjunction with an Ev generator as illustrated in FIGS. 1 and 2, and a separator such as shown in FIGS. 9 and 10. However, such a guide member 100 may be utilized with virtually any EV source and other components as well. An optional top cover 108, of dielectric material as well, is illustrated in FIG. 11 for placing over the groove 104, in contact with the base 102.

The width and depth of the groove 104 need only be a few micrometers for guiding small numbers of EV's. However, as the power to be handled increases and the number of EV's increases, crowding may become a problem and it is necessary to increase the size of the groove. The cross-sectional shape of the groove 104 is not of primary importance in its ability to guide EV's. With EV's generated by a generator such as shown either in FIGS. 1 and 2 or in FIG. 3, and coupled to a guiding component by a separator such as illustrated in FIGS. 8 or 9 and 10, and with the guiding component, such as shown in FIGS. 10 and 11, comprising a fused silica or aluminum oxide dielectric base with an overall thickness of 0.0254 cm and having a groove 104 of 0.05 mm in depth and 0.05 mm in width, the guiding action is demonstrable.

FIGS. 13 and 14 show a variation of a planar guide component, indicated generally at 110 and including a dielectric base 112 with a dielectric tile 114 positioned on and appropriately bonded to the base. The intersection of the surface of the base 112 with the surface of the tile meeting the base at a 90° angle of intersection (that is, one half of a groove such as 104 in FIGS. 11 and 12) would provide a 90° "V" along which EV's could propagate. The guiding effect, however, is enhanced by a beveled edge as shown, set at approximately 45°, along the tile surface intersecting the base to form a groove indicated generally at 116. A counterelectrode plate 118 is positioned along the opposite surface of the base 112 from the tile 114. A collection of tiles such as 114, complete with beveled edges to form grooves such as 116, may be positioned along the base 112 in a mosaic to define an extended guide path. The guide component 110 may be utilized with virtually any other components used to generate, manipulate and/or exploit EV's.

The guiding action on an EV may be enhanced by use of a tubular dielectric guide so that the EV may move along the interior of the tube. FIG. 15 illustrates a tubular dielectric guide member 120 having an interior, smooth passage of circular cross section 122 and coated on the outside with a counterelectrode 124. The cross-sectional area of the interior channel 122 should be slightly larger than the EV bead or bead chain to be guided thereby for best propagation properties.

The glass tube 34 with the ground plane 36 encircling the tube, shown with the generator 20 in FIG. 3, is a guide of the type shown in FIG. 15. For different applications, the glass tube 34 in FIG. 3 may be replaced by a guide of another type.

FIG. 16 illustrates a guide member constructed generally as the reverse of that of FIG. 14, namely, a dielectric tubular member 126 having an interior channel 128 coated with an interior counterelectrode 130, and providing the exterior, generally cylindrical surface 132 as a guide surface in conjunction with the dielectric structure itself and the counterelectrode 130. In this instance, an EV may move along the exterior surface 132, attracted to the guide member by the image charge generated due to the presence of the EV, and also by the effect of the counterelectrode 130 maintained at a relative positive potential.

In general, the dielectric guides of FIGS. 11-16, as well as other dielectric components, can be appropriately doped for limited conductivity to limit or control stray charge, as discussed more fully hereinafter. An EV moving within the guide structure of an RC guide device provides a temporary charge on the guide as noted hereinbefore, and another EV will not enter the immediate high charge region of the guide due to the first EV, but can follow after the charge on the dielectric dissipates after passage of the first EV.

If the groove, or tunnel, used as a guide through or across a dielectric material is too narrow in cross section compared to the size of an EV, the EV passing along the guide may effectively cut into the guide material to widen the path. Once a channel has been bored out by an EV in this manner, no further damage is done to the dielectric material by subsequent EV's propagating along the guide. Typically, a channel of approximately 20 micrometers in lateral dimension will accommodate EV passage without boring by the EV. This is about the lateral dimension of an EV bead chain formed into a ring that can be produced with a given source. The guide groove can be made larger or smaller in cross section to match larger or smaller EV's depending on the circumstances of their production.

6. Gaseous Guides

Any of the guide structures illustrated in FIGS. 11-16 may be utilized either in vacuum or in a selected gaseous environment. However, the use of gas at low pressures in guide members can produce another beneficial effect in the manner of guiding EV's formed into a chain of beads, for example.

In some instances, EV's formed from high powered sources may be composed of beads in a chain configuration. Such a chain group may not propagate well on a particular solid guide surface due to the very tight coupling of the beads in the chain and the disruption that surface irregularities caused in the propagation of the configuration. In a low pressure gas atmosphere, typically in the range starting at about $10^{-3}$ torr and extending through $10^{-2}$ torr, the EV chain is lifted a relatively short distance from the dielectric surface and no longer interacts in a disruptive fashion with the surface, with the result that transmission efficiency is increased. Then, in general, for a given applied voltage, EV's can be formed with greater separation between cathode and generating anode, and can traverse greater distances between electrodes. Evidence from witness plates appears to indicate that, moving relatively free of a solid surface, a bead chain tends to unravel and propagate generally as a circular ring, lying in a plane perpendicular to the direction of propagation. In general, as the gas pressure is increased, the EV may be lifted further from the solid surface. For gas pressures above a few torr, EV's in general move off of the solid surface entirely, and the flat solid surface no longer functions as a guide. However, a guiding effect may still be realized with such higher gas pressure for EV's moving along the interior of a closed guide, such as that illustrated in FIG. 15.

Although a wide variety of gases appear to be useful to produce the lifting effect on EV's and EV configurations, the high atomic number gases such as xenon and mercury perform particularly well. The enhanced guiding action on such EV configurations and single EV's works well on the inside of dielectric guide enclosures such as those illustrated in FIGS. 11-15, and also works well on single FIGS. 17 and 18 illustrate a guide device constructed to utilize a "cushion" of gas to maintain EV's lifted from the guiding surfaces while yet providing a groove, or trough-like guiding structure. The "gas" guide, shown generally at 136, includes a trough formed from a dielectric block 138, which may, for example, be in the form of a glaze coated, porous ceramic. The dielectric block 138 features a counterelectrode 140 on the bottom of the block, and further has coatings of resistor material 142, described hereinafter in the section entitled "Surface Charge Suppression," along the interior lower portions of the trough, or groove, to resist movement of EV's along the so-coated surface out of the trough provided by the block 138. The guide component 136 is connected to a gas communicating line 144 by means of a fitting 146, and which features an internal passage 148 through which gas selectively communicated to the guide may pass to the bottom of the block 138 from a source (not shown). The bottom of the dielectric block 138 is not glazed at the intersection with the fitting passage 148 so that gas may enter the porous interior of the block. The glaze coating and the resistor material coating 142 are scratched, or cut, along the bottom of the V-shaped trough to permit gas to emerge from the interior of the dielectric block 138. The entire arrangement is enclosed for selective control of the environment, and a vacuum pump system is applied to the enclosure to pump away the gas emerging through the block 138. Thus, gas introduced into the porous block 138 through the fitting 146 emerges along the bottom of the trough, and, in dispersing upwardly throughout the trough, provides a gas pressure gradient. The concentration of the gas thus varies from heavy to light going from the bottom of the trough upwardly. A pointed cathode 150, such as a mercury-wetted copper wire, extends downwardly toward the bottom of the trough at a short distance from the beginning of the resistor coating 142, and may be maintained with the cathode terminal point a short distance above the dielectric material of the trough.

In operation, a negative pulse signal of about 2 kv (or higher if the cathode tip is not sufficiently sharp) may be applied to the cathode 150 while the counterelectrode 140 is maintained at ground potential, that is, relatively positive, to generate EV's at the tip of the cathode well within the depth of the trough formed by the dielectric block 138, where the gas pressure is highest. The EV's propagate along the length of the trough as selected gas is introduced into the trough through the communication line 144, and the EV's lift off in the gas layer just above the bottom of the trough, still attracted to the dielectric block 138 by the image charge, or force, of the dielectric material and the potential of the counterelectrode 140. The wedge-shaped gas pressure gradient provided by the trough contains, or "focuses," the gas cushion effect to help keep the EV's within the confines of the trough. However, a sufficient gradient would be provided even if the trough were replaced with a flat surface having a similar cut in the glaze coating and the resistor material coating 142 so that, and further in view of the image force effect and counterelectrode potential, EV's would be guided along the dielectric block, just generally above the cuts in the coatings. Further, from the foregoing discussions concerning the effect of low gas pressure on EV propagation over dielectric surfaces, it will be appreciated that EV's will lift over such a guide surface with no gradient present in the gas pressure.

7. Optical Guides

An EV moving through a purely, low pressure, gaseous phase where no RC guiding structures are present, is accompanied by the formation of a visible streamer. A narrow beam of light appears to precede the streamer, and may be due to ionization of the gas by the streamer. In any event, the EV follows the path defined by the streamer, and the streamer appears to follow the propagation of the light. Such an effect also occurs, for example, when EV's move over a guide surface in a gaseous environment, such as an environment of xenon gas. When an EV is propagated on or along the surface, it travels in a straight line if the surface is very clean. (Surface charge effects dissipate after an EV is propagated in a gas environment.) The forward-looking light from the streamer defines a straight path followed by the streamer and therefore, the EV. If this light path is deflected by objects on the surface, the streamer will deflect, and the EV will follow the new path. Only a small disturbance is needed to start the change in path. Once the path is described, it will remain for future use as long as the streamer persists.

FIG. 19 illustrates an optical guide for use in a gaseous environment. A dielectric plate 152 has a path 154 schematically noted thereon, proceeding from left to right as viewed in FIG. 19. The path 154 may be a scratch on the surface of the plate 152 or an actual guide groove in the plate. A counterelectrode (not visible), at an appropriate potential, may be positioned on the underside of the dielectric material 152 to aid in the propagation of EV's over the dielectric surface. A reflecting surface 156 is positioned to intersect the EV path along the dielectric plate 152, indicated by a dashed line. The surface 156 reflects the light incident thereon, apparently according to the laws of optics, with the result that the EV path is likewise deflected as indicated. A second reflecting surface 158 intersects the new, deflected light path, and deflects the path to a new direction. Consequently, an EV will trace the light path, indicated by the dashed line, guided by both reflectors.

Each of the optically reflecting devices 156 and 158 is preferably a front surface reflector of high dielectric constant material with good reflection in the ultraviolet region. The angle of reflection determines the eventual EV path in each case. The change in direction of the light path effects a change in direction of the streamer, and the EV follows the streamer along the path defined by the light. A gas pressure of several torr can be utilized above the dielectric surface where the EV's propagate and are appropriately guided. The reflectors 156 and 158 need only be a fraction of a millimeter on a side.

The optical guide system illustrated in FIG. 19, or any variation thereof, can be utilized with any of the possible EV generators and other components. Further, optical reflectors such as the reflecting devices 156 and 158 can be utilized with any other component. For example, a guide system using tubular guides such as shown in FIG. 15 can incorporate optical reflectors at the ends of the tubular guides.

8. LC Guides

In general, as an EV approaches any circuit element, the potential upon that element is depressed. The depressed potential makes the element less attractive to the EV so that, if there is a more attractive direction for the EV, a steering action is available. Inductive elements are particularly susceptible to the change in potential in the presence of an EV, and this effect may be utilized in providing an LC (inductance/capacitance) guide for EV's.

Figure 20:
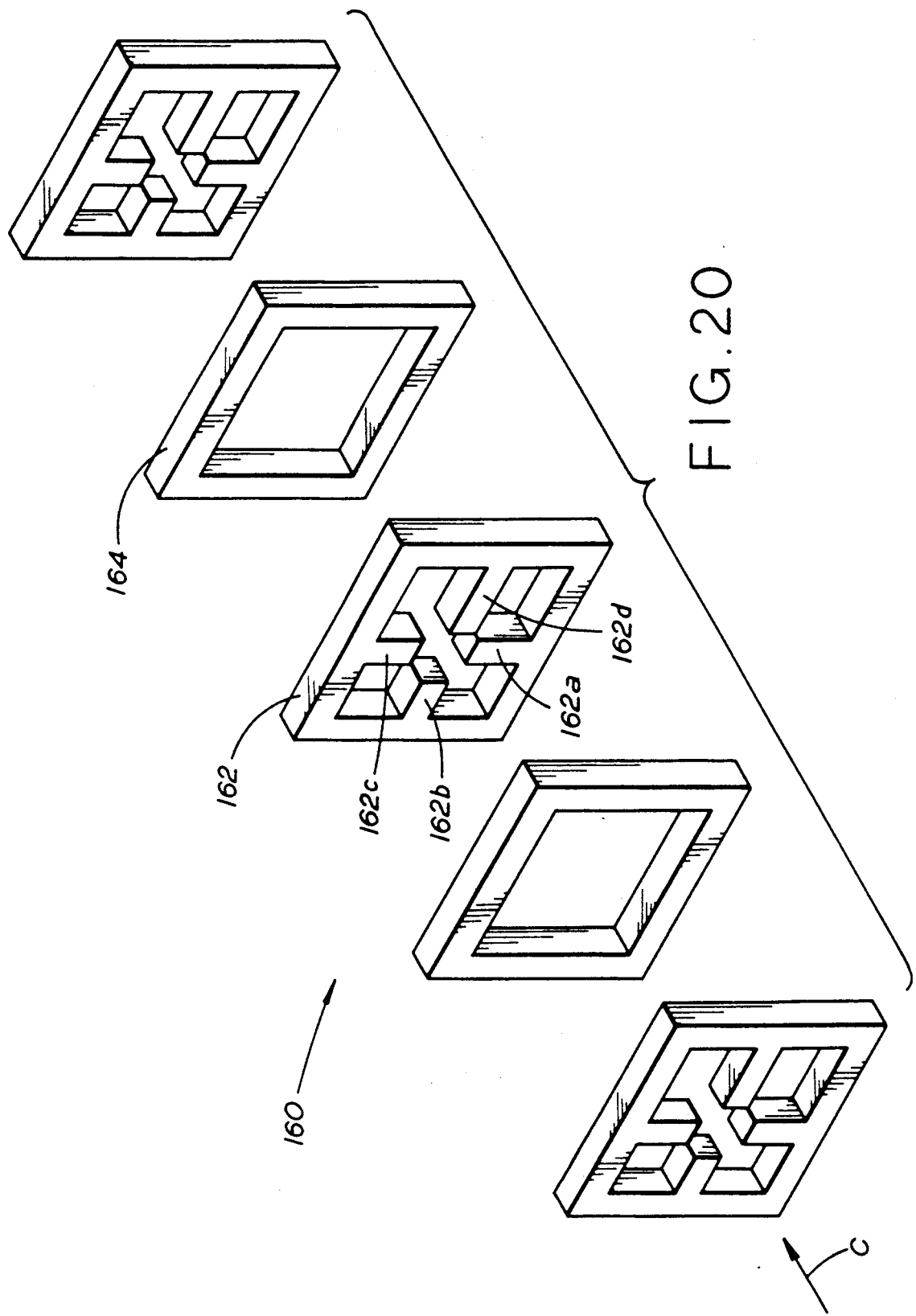
FIG. 20 is an exploded view in perspective of an LC EV guide.

FIG. 20 shows an exploded view of a three-stage quadrupole EV structure, indicated generally at 160 and including three guide elements 162 mutually separated by two spacers 164. Each of the guide elements 162 includes an outer frame and four pole elements 162a, 162b, 162c and 162d extending toward the center of the frame, but ending short thereof to provide a central passage area. EV's, or EV chains, enter the array of guide elements from one end of the array, as indicated by arrow C, generally in a direction normal to the plane of orientation of each of the guide elements.

As illustrated, the four poles 162a-d are arranged in mutually orthogonal pairs of opposing poles. There is sufficient inductance in each of the poles to allow a potential depression therein as the EV approaches. The closer an EV passes to a given pole, the greater the potential depression. Thus, for example, an EV approaching closer to the lower pole 162a than to the upper pole 162c causes a greater potential depression in the lower pole than in the opposite, upper pole. The result is that the EV is attracted more to the farther pole 162c than to the nearer pole 162a. Consequently, a net force is applied to the EV causing it to move upwardly, tending to balance the potential depressions in the two opposed poles 162a and 162c. A similar result occurs in the opposed poles to the sides, 162b and 162d, if the EV moves closer to one of these poles than the other. Thus, a net restorative force urges the EV toward the center of the distance between the two opposed pole faces in either the horizontal or vertical directions. Any overshoot by the EV from the center portion in either direction again unbalances the potential depressions and causes a restorative force tending to center the EV between the poles. It will be appreciated that the net restorative force will also be generated if the EV strays away from the center of the passage between the pole faces in a direction other than horizontal or vertical, causing unbalanced potential depressions among the four poles so that such restorative force will always have vertical and horizontal components determined by the imbalance of potential between the opposed quadrupoles in each of the two pairs.

Such restorative force tending to center the EV in its passage through a given guide element 162 may thus be provided with each guide element. With an array of such quadrupole guide elements 162, restorative forces will thus be provided throughout the length of the array with the result that the quadrupole element array acts as an EV guide, tending to maintain the path of the EV centered between opposed quadrupole faces. The spacers 164 merely provide a mechanism for maintaining the quadrupoles of adjacent guidance elements 162 separated from each other. The entire array of guide elements 162 and spacers 164 may be constructed as a laminar device, with guidance elements in contact with adjacent spacers, for example. Further, it will be appreciated that the LC guide of FIG. 20 may be extended any length as applicable with additional guide elements 162 and spacers 164.

An LC guide, such as that shown in FIG. 20, may be made in a variety of shapes, and utilizing different numbers of poles. In practice, the poles as illustrated in FIG. 20 resemble delay lines along the axis of a pair of opposed poles. After an EV passes a set of poles, there will be a rebound of the potential therein, depending upon the time constant of the LC circuit. Eventually, the oscillations in the potential will subside. The timing function of the guidance elements must be chosen to accommodate the passage of subsequent EV's, for example. Further, it will be appreciated that the LC guide of FIG. 20 operates without the need of producing specific image-like forces, as in the case of a dielectric of an RC guide, for correcting the position of an EV as it passes therethrough, although the LC guide mechanism can be construed as generating image forces on a gross scale. Indeed, the guidance elements 162 and the spacers 164 are conductors rather than dielectrics.

The coupling between the moving EV and the guidance structure 160 dictates limits in the size of the structure for a given EV size, that is, EV charge. If the guidance structure 160 is too large in transverse cross section, for example, the structure will not respond adequately to control the EV; a too small structure will not allow adequate turning time and space for the EV path to be adjusted. Whether the guidance structure 160 is too small or too large, its coupling with an EV will result in an unstable mode of propagation for the EV and destruction of the EV and damage to the guide structure. A factor that may be utilized in the design of an LC guide 160 such as that illustrated in FIG. 20 is to consider the poles to be quarter wave structures at the approach frequency of the EV to be guided. This frequency is determined primarily by the velocity of the EV and the distance between the EV and the steering, or pole, elements 162a-d. Since the diameter of the guide 160 is related to the coupling coefficient, there is an interrelationship between the diameter of the guide and the spacing of the elements 162a-d. In this type of guide, the quarter wave elements 162a-d can be operated at dc or a fixed potential without charging effects. While an LC guide can, in general, be made as large or small as necessary to accommodate and couple to the particular size EV's to be guided, the velocity range for propagation of EV's to be guided by a given LC guide is not arbitrarily wide.

It will be appreciated that the larger the number of EV's in a chain to be guided, for example, the greater will be the power level to be accommodated by the guiding device. Generally, an EV requiring an RC guide transverse cross section of 20 micrometers would require an LC guide slightly larger. The spacing between the guidance electrodes, or poles, such as 162a-d of FIG. 20, would also be in the vicinity of 20 micrometers. Such sized elements cannot be expected to handle very high power. Although multiple, parallel units can be utilized to guide a flux of EV's, it may be more economical of material use and processing to scale up the EV structure to fit a larger guide. Such scaling is primarily a function of the EV generator or the charge combining circuits following the generators when multiple generators are used.

The type of LC guide illustrated in FIG. 20 may be provided in many geometric and electric variations. However, that type of structure is preferred for relatively large sizes, and construction by lamination techniques. Different construction techniques are applicable to smaller structures and particularly to those amenable to film processes. An exploded view of an LC guide made by film construction is illustrated generally at 170 in FIG. 21.

The planar type LC EV guide 170 includes three guide layers comprising an upper guide 172 and a lower guide 174, and an intermediate guide system 176 interposed between the upper and lower guides. The upper guide 172 comprises a pair of elongate members 178 joined by cross members 180 in a ladder-like construction. Similarly, the lower guide includes longitudinally-extending members 182 joined by cross members 184. The intermediate guide system 176 includes two elongate members 186 with each such member having extending therefrom an array of stubs, or pole pieces, 188.

With the three guide members 172-176 joined together in laminar construction, the upper and lower cross members 180 and 184, respectively, cooperate with the intermediate system pole pieces 188 to provide a tunnel-like passageway through the array of cross members and pole pieces. In such construction, the lateral confinement of the EV propagation path is obtained by the conductive pole pieces 188 resembling quarter wavelength lines. The vertical confinement, as illustrated, is accomplished by the cross members 180 and 184, each operating as a shorted one-half wavelength line. The guide structure 170 effectively operates as a form of slotted wave guide or delay structure.

Since the guide structure 170 is very active electrically and can be expected to radiate strongly, the structure may be enclosed with conductive planes on both top and bottom to suppress radiation. Conductive radiation shields 190 and 192 are illustrated to be positioned as the top and bottom layers, respectively, of the laminar construction. Since there is no fundamental need for potential difference between the guide members 172-176, they may be connected together at their edges, but, of course, can be maintained isolated from each other with spacers if desired.

In general, the EV's produced in a burst by most generators are not highly regulated as to spacing between the EV's, although in some instances, the spacing of generated EV's can be affected. However, LC guides provide some synchronization of EV's passing therethrough. The mean velocity of EV's or EV chains passing through an LC guide is locked to the frequency of the guide, and the spacing of the individual EV's or EV chains is forced to fall into synchronization with the structural period of the guide. The resulting periodic electric field produced in the guide tends to bunch the EV train within that field by accelerating the slow EV's and retarding the fast EV's.

As the initial EV's move into an LC guide, there is a short time period when the electromagnetic field level is too low for strong synchronization. As the level builds up, the synchronization becomes more effective. The "Q", or figure of merit of the guide as a cavity, determines the rate of build up and decay. Too large a Q will cause breakdown of the cavity. There is an implied optimum filling factor for an LC guide as a synchronizer. With low filling, the synchronization is not effective, and with high filling, there is a danger of breakdown and interference with the guide function.

Figure 21:
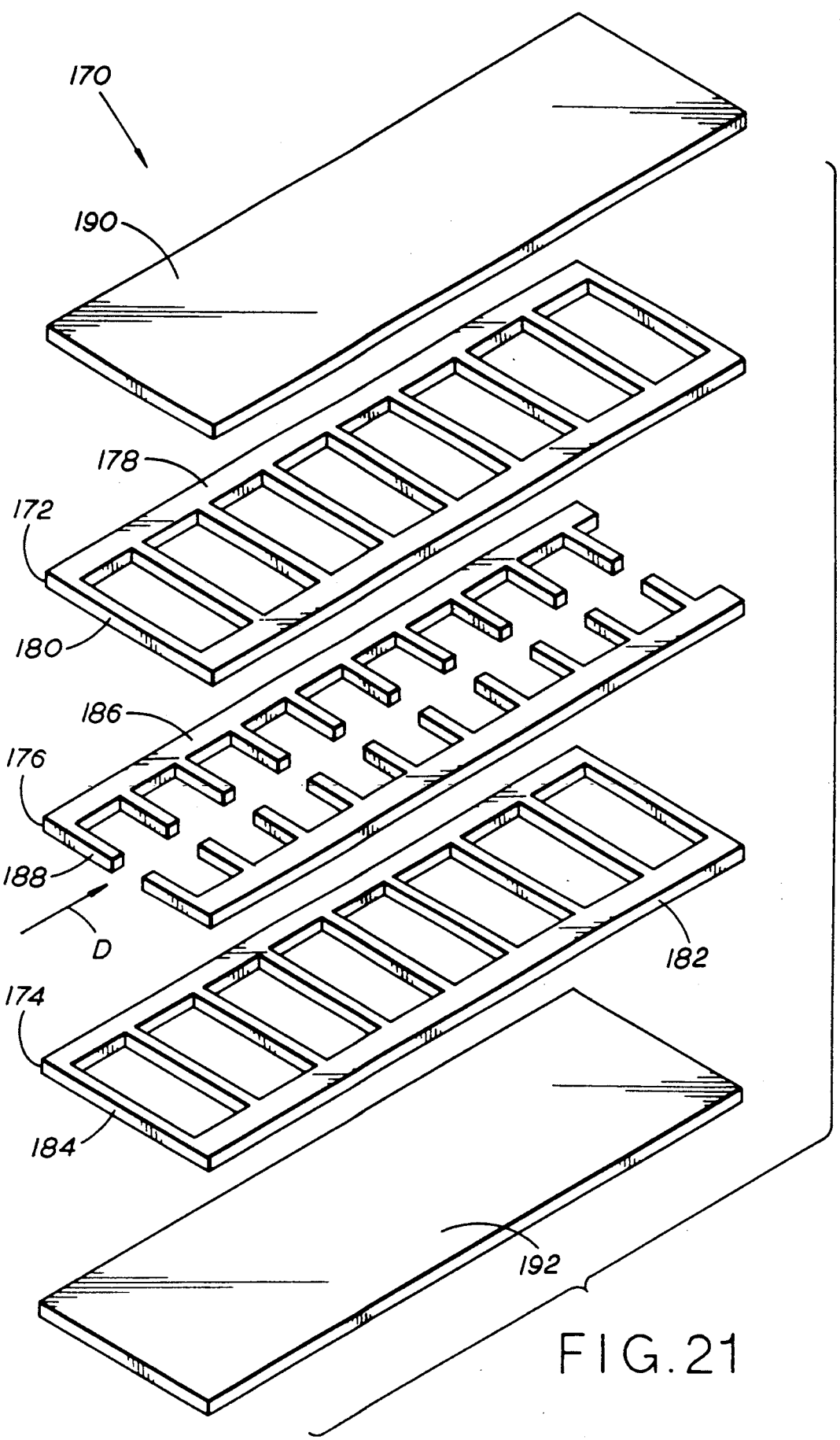
FIG. 21 is an exploded view in perspective of another form of LC EV guide.

Better synchronization may be achieved when the synchronizer is more loosely coupled to the EV's than the LC guides of FIGS. 20 and 21, for example. Such loose coupling can be accomplished by using a slotted cavity providing small slots on one side of the guide. Then, the device would operate at a lower frequency and have a much broader passband. Such a structure is disclosed hereinafter as an RF source.

9. Surface Sources

FIGS. 22-24 give three views of an EV generator comprising a surface source in conjunction with a guide component. In general, guiding EV's on or near surfaces requires coupling them from the source, or prior component, to the surface in question. In the case of a generator utilizing cathodes such as illustrated in FIGS. 4-6, for example, it is possible to locate the source a short distance from the propagating surface, and achieve workable coupling. In the apparatus illustrated in FIGS. 22-24, the source of EV's is integral with the guide device along which the EV's are to be propagated for enhanced coupling.

In particular, the generator and guide combination is shown generally at 200, and includes a dielectric base 202 featuring a guide groove 204 and a surface, or planar, cathode 206 embedded within the guide groove toward one end thereof. A surface anode/counterelectrode 208 is positioned on the opposite side of the dielectric base 202 from the groove 204 and the cathode 206, and serves to effect generation of the EV's and propagation thereof along the groove. An optional top cover 210 is shown in FIG. 24 for positioning against the grooved surface of the base 202, and can be used without sealing provided the surfaces are sufficiently flat. To avoid collecting charge in the covered guide channel, the cover 210 is coated with a charge dispersing material such as doped alumina, as discussed more fully below.

In practice, the dielectric base 202 may be an aluminum oxide ceramic plate or substrate with a thickness of approximately 0.25 mm and a guide groove 204 with depth and width approximately 0.1 mm each. The metallic coatings for the cathode 206 and counterelectrode 208 may be of silver paste compound fired onto the ceramic, for example. Mercury may be wetted onto the silver cathode by applying the mercury with a rubbing action. With such dimensions, the operating voltage to produce EV's and propagate them along the guide path 204 is approximately 500 volts. Use of thin film processing methods to produce a thinner dielectric substrate 202 allows the operating voltage to be lower. With such film techniques, aluminum oxide may be utilized for the dielectric and evaporated molybdenum for the metallic electrodes 206 and 208, all being deposited on a substrate of aluminum oxide. In such case, mercury can still be used for migratory cathode material since it can be made to wet molybdenum by ion bombardment sufficiently for such an application. Such bombardment may be by direct bombardment of the molybdenum surface. Alternatively, argon ions may be bombarded with mercury in the vicinity of the molybdenum surface, thereby cleaning the molybdenum surface for wetting. A small amount of nickel may be evaporated onto the molybdenum surface to facilitate the cleaning of the surface by direct or indirect mercury ion bombardment, since mercury and molybdenum do not have high solubility. The combination of molybdenum and mercury is preferred over silver, or copper, and mercury because silver and copper are too soluble in mercury for use in a film circuit since they can be rapidly dissolved away.

Since the cathode source 206 is effectively integral with the dielectric substrate 202 in the guide groove 204, the cathode is appropriately coupled thereto, that is, transition of an EV from the cathode production region into and along the guide groove takes place with minimal energy loss by the EV. Additionally, the cathode 206, wetted by mercury or the like, features a self-sharpening or regeneration action to maintain appropriately sharp its leading edge, at which EV's are generated. Further, the cathode 206 is an extended, or line, source so that pulse repetition rates to produce EV's can be raised to much higher values than in the case of a single point source because the regeneration process involving migration of liquid metal is not necessary between all pulses in the case of an extended source as noted hereinabove. It will be appreciated that the extended cathode 206 is identical to the cathode 64, illustrated in FIG. 7, which is also mounted directly on a ceramic base 62. Operation of such extended cathodes relies on the fringing field effects at the edge of the cathodes that cause a sharpening effect on the mobile cathode wetting material. Consequently, one or more relatively sharp structures can always be relied on for field emission that is responsible for the EV initiation, and therefore the operating voltage of such a source is relatively low.

10. Surface Charge Suppression

After an EV is generated, it may lose electrons due to relatively poor binding of such electrons at the time of formation, or by some other process such as passage of the EV over a rough surface. In the latter case in particular, the lost electrons may distribute themselves along the surface and produce a retarding field effect on subsequent EV's passing in the vicinity of the charged surface area. Several techniques are available for removing this resulting surface charge.

The dielectric substrate, or base, employed in an EV generator or RC guide, for example, experiencing the surface charge buildup may be rendered sufficiently conductive so that the surface charge is conducted through the substrate to the anode or counterelectrode. The resistivity of the base must be low enough to discharge the collected surface charge before the passage of the next EV following the one that charged the surface. However, the resistivity of the surface cannot be arbitrarily low because the subsequent EV would be destroyed by excessive conductivity to the anode or counterelectrode.

To achieve the desired degree of bulk conductivity of the substrate, the dielectric material, such as aluminum oxide, can be coated with any of the resistant materials commonly used for thick film resistor fabrication, provided the resistance does not fall much below the range of 200 ohms per square. Such a resistive coating is usually composed of a glass frit having a metallic component included therein, and is applied to the surface by silk screening and subsequent firing at an elevated temperature. However, where intense EV activity occurs with the utilization of high fields and possible high thermal gradients, such glassy materials tend to break down and are therefore unsatisfactory. In such cases in particular, a film of aluminum oxide doped with chromium, tungsten or molybdenum, for example, may be added to the dielectric component to provide a sufficiently conductive material, thereby achieving the desired level of bulk conductivity of the dielectric. The effectiveness of this procedure is enhanced by decreasing the thickness of the substrate.

The photoemission spectrum from a decaying EV is rich in ultraviolet light and soft X-rays if the disturbance of the EV causing the decay is severe. The absorption spectrum of the produced photoconductor should be tailored to match these high energy products. Since electron scatter and low electron mobility in the photoconductor causes the photoconductive process to be slower than the passage of the EV, the discharging of the surface charge due to the decaying EV occurs slightly after the EV has passed a particular location on the surface, and therefore poses no threat of conducting the EV to the anode. In addition to the ultraviolet and X-ray emission, part of the electron emission from an EV near a surface excites fluorescence in the dielectric material, and the fluorescent light then contributes to activating the photoconductive process.

Another way of effecting surface charge suppression through photoconductivity is by utilizing diamond-like carbon for the dielectric component. Such material has an energy band gap of approximately 3 eV, and thus can be stimulated into photoconduction. Further, such carbon material can be easily doped with carbon in graphitic form to increase the conductivity of the substrate.

Another technique for dispersing the surface charge is to utilize bombardment induced conductivity. Such conductivity is activated by the high speed electrons coming from the EV and penetrating a sufficiently thin layer dielectric to bombard the anode, causing conductivity of the dielectric applied to the anode. The conductivity of the dielectric is effectively increased as the high velocity electron stream is turned into a large number of low velocity electrons in the dielectric. The dielectric material is appropriately optimized for such process by being sufficiently thin, with few trap sites. The trap sites may be initially cleared thermally or optically, and are cleared by the electric field during operation.

In general, the geometry of the dielectric substrate may influence the effectiveness of making the substrate conductive to suppress surface charge, as in the cases of photoconductivity and bombardment induced conductivity techniques, for example.

11. Launchers

In some applications or structures, it is necessary or desirable to propagate an EV across a gap in vacuum or a gaseous environment. For example, an EV may be launched across a gap separating a cathode and an anode or guide structure. The launching of an EV across a gap may be accomplished by applying an appropriate voltage to attract the EV from one region to the other. However, such an applied voltage can represent a loss in power for the system or the perhaps unwanted energy gain for the EV. The required applied voltage may be reduced to minimize the system energy loss by inducing the EV to leave the cathode region and enter into a counterelectrode region, for example, without excessive energy gain. This may be accomplished by propagating the EV across a region where the field is high at the desired applied voltage so that the field strips the EV from the surface along which it was traveling and to which it was attached.

FIG. 25 illustrates a launcher construction, shown generally at 216, designed to launch EV's across a gap between an EV generator 218 and an EV guide, for example 220. The generator 218 includes a dielectric base which is generally tubular, but closes at its forward end in a conical structure terminating in a point 222. A counterelectrode 224 is formed within the dielectric base by conductor material coating the interior surface of the base throughout the conical region thereof and extending partly along the cylindrical portion of the base. A portion of the exterior of the dielectric base is coated with conductor material to form a cathode 226. The cathode 226 extends along the cylindrical portion of the base and onto the conical end of the base, but does not extend as far along the base longitudinally as does the counterelectrode 224. By terminating the cathode 226 short of the end of the conical tip 222 the leading edge of the cathode, at which EV's are formed, is maintained relatively close to the anode 224. Also, the truncated cathode 226 features a larger EV-producing area than would be the case with the cathode extending to the tip 222 of the base. The fringing field effect around the leading edge of the cathode 226 close to the anode 224 is used in the production of the EV's. The counterelectrode extends farther to the left within the cylindrical portion of the base than the cathode coats the cylindrical exterior of the base.

The tubular guide member 220, which is generally constructed like the tubular guide illustrated in FIG. 15, is coated on its exterior surface with conductor material to form a counterelectrode 228 which extends throughout most, but not all, of the length of the guide member. The counterelectrode 228 does not extend to the ends of the guide member 220 lest the EV's propagate onto the counterelectrode. The end of the guide member 220 facing the generator 218 features an internal conical surface 230 so that the generator tip 222 may be positioned within the conical end of the guide member while still maintaining a spacing between the two bodies. The guide member 220 may also be constructed to circumscribe the generator 218, provided the counterelectrode 228 is kept back from the region of the cathode 226.

In operation, an appropriate potential difference is applied between the cathode 226 and the counterelectrode 224 of the generator 218 to generate one or more EV's which leave the forward end of the cathode and travel toward the tip 222, under the influence of the field established by the potential difference. It is intended that the EV's leave the generator 218 and enter the interior of the guide member 220. Thereafter, the EV's may propagate along the interior of the guide member 220, under the influence, at least in part, of the field established by the guide member counterelectrode 228 generally as discussed hereinbefore. The conical geometry of the generator end, and the relative positioning of the generator cathode 226 and 35, counterelectrode 224 result in the EV's experiencing a large field at the generator tip 222 causing the EV's to detach from the base of the generator 218. The EV's are thus effectively ejected from the generator tip 222 at the beginning of the guide member 220 and continue along, now propagating under the influence of the guide member.

In practice, the cathode 226 may be appropriately wetted with a liquid metal conductor as discussed hereinbefore. The guide member counterelectrode 228 may be operated at the same potential as the generator counterelectrode 224, but other potentials can be used. The extraction voltage applied to the guide counterelectrode 228 is an inherent part of the generation process, and without such voltage the generator will not produce EV's effectively. The extraction voltage is normally ground potential when the cathode 226 is run at some negative voltage. With a negative-going pulse applied to the cathode 226 to generate the EV's, the generator counterelectrode 224 may be operated at ground potential. The mobile wetting metal is drawn to a thin ring at the end of the cathode 226 nearest the tip 222. EV's are generated around the cathode region so that, at a high pulse rate, there is a steady glow around the cathode end accompanying EV production.

As an example of the construction of a launcher as illustrated in FIG. 25, the dielectric body of the generator 218 may be made of aluminum oxide ceramic having a thickness of 0.1 millimeter in the region of the conical end, that is, at the wetted metal cathode edge, and being somewhat thicker along the cylindrical shank of the base for additional mechanical support. The counterelectrode 224 and the cathode 226 may be fired on silver paste coating the dielectric surface as discussed hereinbefore. Both the interior and the exterior of the conical end of the base 218 are finely pointed to increase the field at the tip 222 to cause detachment of an EV as it approaches that region. The spacing between the generator tip 222 and the nearest inside surface of the guide member 220 may be on the order of 1 millimeter or less. With the foregoing dimensions, an EV may be formed and detached at the generator tip 222 with approximately a 500 volt potential difference applied between the generator counterelectrode 224 and cathode 226. A gas pressure on the order of $10^{-2}$ torr lifts the EV off of the dielectric surface of the generator base 218 and facilitates the transfer and propagation of the EV to the guide structure 220, and even allows the cathode pulse to be reduced to as low as 200 volts. High molecular weight gases, such as xenon and mercury, are particularly good for this function.

It will be appreciated that the spacing between the guide member 220 and the generator 218 may be adjusted. In a given application under vacuum or selected gaseous conditions, requiring sealed operation, such movements can be effected by a variety of techniques.

While a generally cylindrically symmetric launcher 218 is illustrated and described herein, it will be appreciated that the launcher technique can be applied to EV generating and manipulating components of any kind. For example, the planar generator and guide illustrated in FIGS. 22-24 may employ the launcher technique to overcome a large gap to a subsequent guide member, for example, particularly when a low voltage is utilized to generate the EV's.

In general, EV's may be formed and launched at lower voltages if the dimensions of the components are decreased. For low voltage operation, it is desirable to use film coating methods to fabricate the components. For example, to construct a planar launcher, an anode may be formed by lithographic processes and then coated with films of dielectric material such as aluminum oxide or diamondlike carbon. After the deposition of the dielectric material, the cathode material, typically molybdenum, can be applied to the dielectric material, and then the entire cathode may be wetted with a liquid metal. While a generally cylindrical launcher may not be so fabricated using film techniques, the electrodes may be painted on to make such a launcher. With dimensions of approximately 1 micrometer thickness for the dielectric base of the generator, an EV may be formed and launched at a potential difference between the cathode and anode of the generator of less than 100 volts.

Although the preferred embodiments of a launcher for EV's have been illustrated and described herein, those skilled in the art will realize that launchers for EV's may be constructed in various other forms.

12. Selectors

As noted hereinbefore, EV's may be generated as beads in a chain with multiple chains being produced at essentially the same time. It may be desirable, or necessary to isolate EV's of a selected total charge for use in a process or a device. A selector action can help limit the number of types of EV's available to provide the desired species. In general, a variety of EV's may be generated and directed toward an anode or collector around a sharp edge on a dielectric surface. An extractor field detaches selected EV's at the dielectric edge and propels them toward a guide component or other selected region. The extractor voltage as well as a guide voltage may be readily adjusted, in view of the geometry of the selector, to extract EV's of a chosen charge size. Typically, approximately five EV chains, each with ten or twelve beads, may be extracted at a time, with the number of chains or EV's scaled according to the geometry of the extracting apparatus.

A generally cylindrically symmetric selector is shown at 236 in FIG. 26, and includes a generator, or source, 238 constructed generally in the form of the separator shown in FIG. 8. A generally tubular dielectric ceramic base 240 has a conical forward end wherein the respective angles of taper of the exterior and interior conical surfaces cooperate to form a small aperture defined by a circular, sharp edge 242. A conductive coating, such as a fired on silver paste coating, forms a counterelectrode band 244 about the exterior base of the conical end. A wetted metal cathode 246 is positioned within the tubular dielectric base 240 with the cathode conical end within the conical structure of the dielectric base and facing the aperture defined by the edge 242. The cathode 246 may be copper wetted with mercury, for example, as described hereinbefore.

An extractor 248, in the form of a conducting plate with a circular aperture 250, is positioned in front of, centered on and a short distance from the source circular edge 242. Beyond the extractor 248 is a tubular guide 252, for example, having a dielectric body with its external surface coated, in part, with a conducting surface to form a counterelectrode 254.

If the generator 238 is operated to produce EV's without the application of a voltage on the extractor 248, the EV's move from the region of the cathode tip to the anode 244 by traveling through the hole in the end of the ceramic cone and around the sharp edge 242 to the outside of the cone and to the anode. When an appropriate voltage is applied to the extractor, however, a selected portion of the EV's at the dielectric edge 242 are detached from the dielectric and propelled through the extractor opening 250 and to the guide member 252 through which they are propagated under the influence of the potential placed on the guide counterelectrode 254.

A planar selector is shown generally at 260 in FIG. 27 and includes a generally flat dielectric base 262 having an elongate neck 264. A surface source, or generator, generally of the type shown in FIG. 22, is incorporated in the selector 260 with a planar cathode 266 residing in a groove 268. However, rather than being positioned on the opposite side of the dielectric base 260, the anode used in the generation of the EV's is in the form of a coating 270 on the side of a second groove 272 which intersects with the first groove 268 at an acute angle to form a sharp intersection edge 274. With a potential difference applied only across the cathode 266 and the anode 270, EV's formed at the cathode, which may be a wetted metal type, move along the groove 268 to its intersection with the groove 272, whereupon the EV's turn around the sharp edge 274 and proceed to the anode 270.

Two extractor electrodes 276 and 278 are positioned along the outside surfaces of the neck 264 of the base 262, on opposite sides thereof and flanking the guide groove 268. Application of an appropriate voltage to the extractor electrodes 276 and 278 causes selected EV's negotiating the sharp edge 274 to be detached therefrom and to proceed along the guide groove 268 and through the region bounded by the extractor electrodes. As shown in FIG. 28, a counterelectrode 280 underlies a portion of the guide groove 268 along the neck 264 of the dielectric base to further propel the selected EV's along the guide groove beyond the extractor electrodes 276 and 278.

As noted hereinbefore, when an EV is traveling along a surface, it is bound thereto by image forces. The magnitude of the binding force depends to some extent upon the geometry of the surface through which the image force is effected When the effective area of the surface is reduced, such as the case when an EV is passing about the sharp circular edge 242 of the conical structure of the generator 238 in FIG. 26, or about the sharp edge 274 of the planar selector 260 in FIG. 27, then the image force is reduced, and the EV becomes more loosely bound and sensitive to being stripped away by a field provided by means of another electrode with a relatively positive voltage applied to it. The high negative charge of the EV's moving toward the extractor electrode may momentarily reduce the potential between the cathode and the extractor below the threshold required to extract any of the remaining bead chains or beads in the group at the edge in question and moving toward the source anode. After the initial EV structure is extracted and propagates beyond the extractor field, a subsequent EV may be extracted from the region of the dielectric edge.

As an example, in the configuration shown in FIG. 26, for an applied negative voltage of 2 kv on the cathode, an aperture defined by the sharp edge 242 of approximately 50 micrometers, a cone radius of equivalent size, and a spacing from the dielectric aperture to the extractor electrode of approximately 1 millimeter, a positive extraction voltage of approximately 2 kv is needed to detach an EV. The extraction threshold voltage is critical. For example, when an EV source of such dimensions is constantly firing and the EV's are being captured entirely by the anode on the dielectric cone, no extraction to the extractor occurs with an extraction voltage of 1.9 kv, but EV's are so extracted at a positive extraction voltage of 2.0 kv.

While separators are shown in FIGS. 24–26, as associated with EV generators, separators may be incorporated virtually anywhere along a line of EV manipulating components. For example, a separator may follow a guide device, or even another separator. Providing EV separators in sequence, or even in cascade, permits extraction of EV's of a particular binding energy from EV's in a wide range of binding energies.

13. Splitters

In general, operations involving close timing or synchronization of events can be controlled by two or more output signals derived from a single input signal. For example, a first event can be divided into a multiplicity of subevents. With an EV source that produces a large number of EV beads or bead chains within a very short period of time, it is possible to divide such an event, that is, to divide a burst of EV's, into two or more EV propagation signals. Apparatus for so dividing EV signals is called a splitter, and is constructed generally by interrupting a guide component, such as the RC guide devices illustrated in FIGS. 11-16, with one or more side guide channels intersecting the main guide channel. As EV's move along the main guide channel and reach the intersection of the main channel with a side, or secondary, channel, some of the EV's move into the secondary channel while the remainder continue along the main channel. In constructing a splitter, care must be taken to ensure that the secondary guide channel intersects the main channel at a position where the EV's actually propagate. For example, if the main channel is relatively large so that EV's may move along at a variety of locations throughout the transverse cross section of the main channel, then there can be no certainty that an EV will encounter the intersection of the secondary channel with the main channel sufficiently close to the secondary channel entrance to move into the secondary channel.

A splitter shown generally at 290 in FIGS. 29 and 30 includes a dielectric base 292 with a mosaic tile 294 bonded to the base. A second tile piece 296 is also bonded to the base 292. The tiles 294 and 296 are cut as illustrated and bonded to the base 292 appropriately separated to form a secondary guide channel 298 between the two tiles. A single tile, generally rectangular as viewed from the top in FIG. 29, may be cut into two pieces to form the channel 298 when the pieces are appropriately bonded to the base 292.

As discussed hereinbefore, a 90° angle between the edge of such a mosaic tile and the base 292 would form a channel to which EV's would be attracted and along which they would be guided. However, providing a 45° bevel forms an acute angle primary channel 300 when the tiles 294 and 296 are bonded to the base 292, in the same fashion that such a channel is provided by the guide member 110 illustrated in FIGS. 13 and 14. A guide counterelectrode or ground plane 302 for contributing to the attractive force maintaining the EV's within the guide channels is positioned on the opposite side of the base 292 from the tiles 294 and 296. The dielectric tiles 294, 296 and base 292 may be constructed of any suitable material, such as aluminum oxide. Similarly, the counterelectrode 302 may be formed by any suitable conductor material, such as silver paste. The potential applied to the counterelectrode 302 is chosen according to the application and other potential levels used, and may be positive or ground.

A second version of a splitter is shown generally at 310 in FIG. 31, and includes a dielectric base 312 with a primary, straight guide channel 314 and a secondary guide channel 316 branching off of the primary channel at an acute angle. The channels 314 and 316 are grooves of rectangular cross section formed in the base 312. As shown in FIG. 32, a counterelectrode 318 is positioned on the opposite side of the base 312 from the channels 314 and 316 to promote propagation of the EV's along the channels, and a flat, dielectric cover 320 is provided for optional placement against the top surface of the base to enclose the guide channels. In order to ensure that EV's moving from left to right along the main channel 314, as viewed in FIG. 31, are sufficiently close to the side of the main channel broken by the secondary channel 316, it is necessary that the primary channel cross section not be much larger than the mean size of the EV's that are propagated along that channel, although each channel has to be large enough to accommodate the largest EV structure to be propagated therethrough. (The mosaic guide channel with the bevel 300 in FIGS. 29 and 30 will accommodate any size EV structure because it has an open side.). Typically, for an EV bead chain formed at 2 kv, the primary channel lateral dimension should be 20 micrometers. The lower limit for a channel width guiding a single EV bead is approximately 1 micrometer. But, where EV bead chains formed at 2 kv are to be propagated along both channels of the splitter 310, the width of the secondary channel 316 should be at least 20 micrometers and the width of the primary channel 314 may range between 20 micrometers and 30–35 micrometers.

Both splitters 290 and 310 may be utilized with a variety of other components, and, for example, EV's may be launched or propagated into the primary guide channels 300 and 314 from any of the sources disclosed herein. In the case of the splitter 290 of FIGS. 29 and 30, EV's or EV bead chains move along the apex of the channel formation bevel 300 until the intersection with the secondary channel 298 is reached. At that point, some of the EV's or EV bead chains move into the secondary guide channel 298 and the remainder continue to the right, as viewed in FIG. 29, along the primary channel 300. The secondary channel 298 guides the EV's or EV bead chains having entered that channel around the elbow of that channel as illustrated, so that two streams of EV's or EV bead chains arrive at the right end of the splitter 290 as viewed in FIG. 29 along the two channels 300 and 298. From there, the EV's may be manipulated or exploited by other components.

Similarly, EV's or EV bead chains launched into the left end of the primary channel 314 of the splitter 310 of FIGS. 31 and 32 move along that channel until some of the EV's or EV bead chains enter the secondary channel 316 and are guided around its elbow so that two streams of EV's or EV bead chains arrive at the right end of the splitter for further manipulation or exploitation.

A single EV moving along the primary channel of either of the splitters 290 and 310 illustrated may be expected to turn into the narrower secondary channel in each case. However, it is noted that a stream of EV's or EV bead chains will be split as described, with some of the propagation following the main guide channel and the remainder following the secondary channel. The deflection of only a portion of an EV propagation stream into a secondary channel of a cross section smaller than or equal to that of the primary channel may be due to a crowding effect of multiple EV's or EV bead chains at the channel intersection, perhaps caused by the high concentration of charge of the EV's, that prevents the total EV group from taking the secondary path. This is a form of self-switching in which one or a few EV structures pass into the secondary channel at a time while others continue along the main path. In any event, splitters of the type illustrated in FIGS. 29-32 are effective in producing multiple streams of EV propagation generated as a single stream from a single source. Additionally, the arrivals of the EV's at the output ends of the primary and secondary channels are effectively simultaneous, since the difference in path length along the primary and secondary channels is insignificant. Consequently, multiple EV's generated with a single signal pulse and arriving at the junction of primary and secondary guide channels, for example, may split up with some EV's propagating along each guide channel to produce EV arrivals, or signals, at two locations. If the guide channel path lengths are identical, the EV's may arrive at the end points of the channels simultaneously, or nearly so.

A variable time delay splitter is shown generally at 330 in FIGS. 33 and 34 for use in producing a pair of EV propagation signals, generated from a single burst of EV's but arriving at a pair of locations at specified times which may be essentially the same or different. The time delay splitter 330 includes a dielectric base 332 to which are bonded three mosaic dielectric tiles 334, 336 and 338. A pointed cathode 340, such as those illustrated in FIGS. 1 and 2 or 17, is shown for use in generating EV's for propagation along a first path 342 extending along the intersections of the base 332 with the top edges (as viewed in FIG. 33) of the two tiles 334 and 336. The path 342 further extends upwardly, as shown in FIG. 33, along the intersection of the base 332 with the left edge of the rectangular tile 338, along its upper edge and downwardly along its right edge.

The first tile 334 is in the form of a trapezoid which cooperates with the second tile, 336, which is in the form of a triangle, to provide a channel 344 separating these two tiles and intersecting the primary path 342 at an acute angle to form the initial leg of a secondary guide path 346.

A generally U-shaped dielectric tile 348, having left and right legs 350 and 352 for extending about the lower portion of the rectangular tile 338 as illustrated, is movable, and may be selectively positioned, relative to the rectangular tile 338 as indicated by the double-headed arrow E. The secondary path 346 continues downwardly, as viewed in FIG. 33, along the 90° intersection (see FIG. 34) of the base 332 with the left side of the tile 338, until the path reaches the tile leg 350. The movable left leg 350 has a 45° beveled lower inner edge 354, as shown in FIG. 34. Consequently, the secondary path 346, which follows along the intersection of the base 332 and the left edge of the rectangular tile 338 below the channel 344, is guided then by the intersection of the base 332 and the beveled edge 354 of the leg 350 as the EV's prefer the more confined intersection than the 90° intersection of the edge of the tile 338 with the base 332. Consequently, the EV path 346 leaves the tile 338 to follow the tile leg 350. It will be appreciated that the movable tile 348 may be positioned with the leg 350 at the outlet of the channel 344 so that the secondary path 346 follows the leg without first following the left side of the tile 338. The secondary path 346 advances to the base of the U-shaped tile 348 and thereafter moves across the tile base to the right leg 352, which intersects along its left edge with the base 332 at a 90° angle as illustrated in FIG. 34. However, the lower right edge of the tile 338 features a 45° bevel 356 as an intersection with the base 332. Consequently, EV's moving upwardly, as shown in FIG. 33, along the intersection of the tile leg 352 with the base 332, then move along the beveled intersection of the tile 338 with the base, and upwardly away from the end of the movable leg. As shown in FIG. 34, a counterelectrode 358 underlies the base 332 to provide the necessary potential for enhancing the guiding effects of the paths 342 and 346 and, where the splitter 330 includes a cathode 340 for the generation of EV's, to provide the potential for such generation.

The right edge of the rectangular tile 338, as viewed in FIG. 33, includes two launchers 360 and 362 in the form of dielectric extensions ending in sharp edges. Thus, EV's moving along the 90° intersection of the upper portion of the right edge of the tile 338 with the base 332 are guided by the intersection of the launcher 360 with the base. However, the launcher 360 is generally triangular in cross section, as shown in FIG. 33, to provide a sharp edge at the right end of the launcher. The EV will go forward onto the flat substrate of the base 332 rather than turning around the sharp corner of the launcher 360. This forward movement of the EV is greatly influenced by the exact shape of the leading edge of the launcher 360, which must therefore be relatively sharp and straight to avoid launching EV's at undesired angles. An external field may be provided by electrodes (not shown) placed to the right of the launcher 360 for further manipulation of the EV's.

Similarly, the launcher 362 features a sharp edge toward its right end so that EV's moving along the beveled intersection of the lower right edge of the tile 338 with the base 332 turn toward the right, as viewed in FIG. 33, to move along the perpendicular intersection between the launcher 362 and the base, and then out over the base away from the launcher. EV's exiting the launcher 362 may be further manipulated by an appropriate external field applied with the use of appropriate electrodes (not shown).

The primary path 342 is a fixed path, that is, it has a singular path length between the intersection of that path and the channel 344, for example, and the launcher 360. On the other hand, the secondary path 346 is variable in path length between the intersection of the channel 344 with the primary path 342 and the second launcher 362, for example. This variation in path length is achieved by movement of the U-shaped dielectric member 348 relative to the rectangular tile 338 as indicated by the double-headed arrow E. The farther the dielectric member 348 is positioned downwardly relative to the tile 338, as viewed in FIG. 33, the longer will be the secondary path length 346 (and the shorter will be the overlapped portions of the legs 350 and 352 with the respective sides of the tile 338). By selectively positioning the dielectric guide member 348 relative to the tile 338, the length of the path 346 may be selected and, in this way, the time required for EV's to traverse the secondary path 346 and arrive at the second launcher 362 may be chosen. Consequently, the relative time of arrival at the two launchers 360 and 362 of EV's generated by a single pulse, for example, and following the two paths 342 and 346 may be selected by the positioning of the dielectric guide member 348.

The 10 mm dimension indicated in FIG. 33 shows a typical scale for a variable splitter. It will be appreciated that differences in path lengths on the order of a tenth of a millimeter or less may be readily effected using a variable splitter of the size indicated. Any appropriate means may be utilized to move and selectively position the movable guide member 348, including a mechanical linkage for example. If necessary, where the adjustment is made manually, a form of micromanipulator or translator, such as a lever and/or gear system with appropriate mechanical advantage may be utilized to achieve the desired sensitivity of control.

It will be appreciated that the guide paths 342 and 346 may be modified as appropriate to any application. Further, the paths need not extend to launchers 360 and 362, but may continue on to further guide paths, for example, or other components as appropriate.

Figure 35:
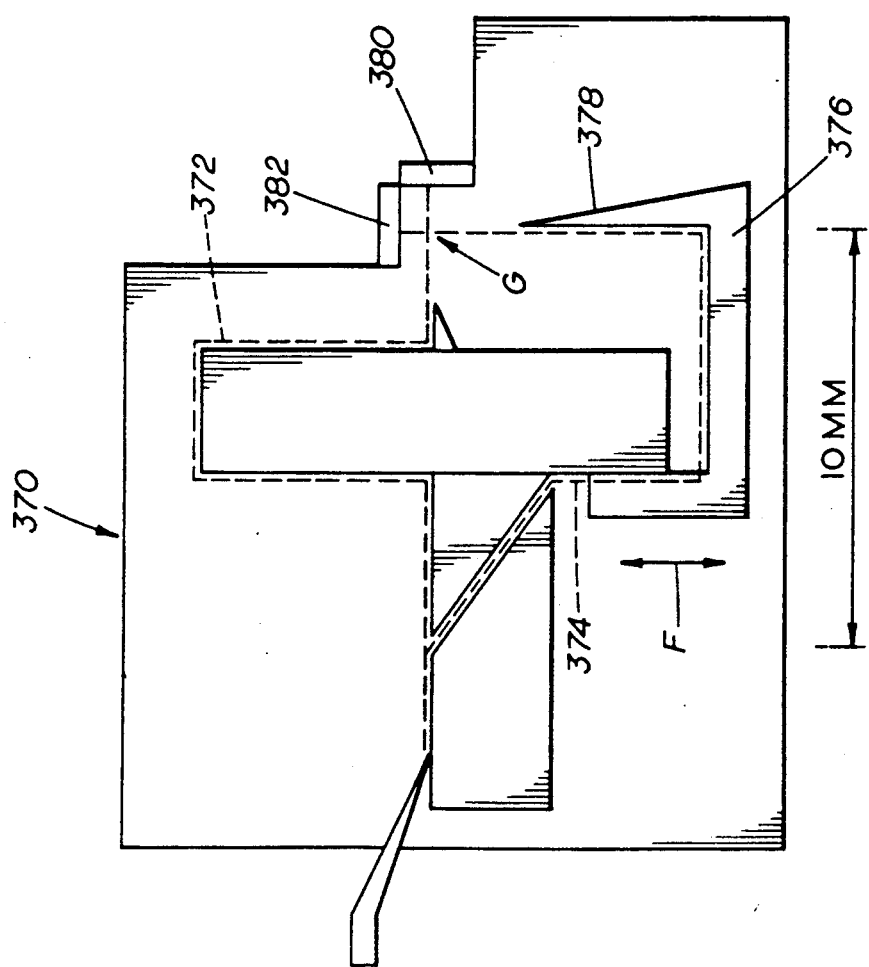
FIG. 35 is a top plan view of another form of variable time delay EV splitter.

For example, a version of a variable time delay splitter is shown generally at 370 in FIG. 35. The construction and operation of the splitter 370 is similar to that of the splitter 330, and need not be further described in detail, except for the differences therebetween. For example, the fixed guide path 372 may be the same as the fixed guide path 342 in FIG. 33, but the variable guide path 374 provided by the splitter 370 is adjusted by a movable guide member 376 (as indicated by the double-headed arrow F) which extends farther to the right, as viewed in FIG. 35, and ends in a launcher 378 which expels the EV's along a line directed toward a point of intersection, G, with the first guide path 372. Thus, EV's may be caused to reach the point G from two different directions at the same time, or at selected different times, depending on the position of the movable guide member 376. Witness plates, or other EV-detecting devices such as phosphorous screens, 380 and 382 may be positioned to receive the EV's moving along the primary and secondary paths 372 and 374, respectively. Additionally, appropriate anodes or counterelectrodes may be utilized to enhance or further the movement of the EV's from the launchers.

In general, the secondary channel of a splitter may be larger, smaller or equal in transverse dimensions to the main channel. If the secondary channel is much larger in cross section than the primary channel, all EV propagation may follow the secondary channel. The secondary channel may intersect the main channel at any acute angle up to 90°. The channels may mutually branch in various patterns, such as to form a "Y" or a "T", for example. For such examples, the two branches may be equivalent channels. Further, multiple secondary paths may be utilized so that any number of output signals may be constructed from a single input EV signal from a single source, for example. It will be appreciated that splitters may also be constructed in forms different from those illustrated in FIGS. 29–35. For example, splitters may be constructed utilizing generally tubular guide components as discussed hereinbefore.

14. Deflection Switches

As noted, not only may EV's and EV chains be propagated in selected directions by use of guide components, but the guide components may also include turns in the guide paths to selectively change the direction of propagation. The guide components influence the direction of propagation of EV's due to the attraction EV's experience toward the dielectric guide surfaces caused by image charge forces on the EV's, as well as the fields established by counterelectrodes further attracting the EV's to the dielectric guide surfaces. The direction of propagation of EV's and EV bead chains may also be influenced by the use of transverse electric fields acting on the electric charge of the EV entities to deflect them to new, selected directions. The extent of the deflection will depend on the size of the deflecting field as well as the period of time over which the field is applied to the EV entity. Additionally, the deflecting field can be turned on or off, or set at varying strengths to selectively deflect EV's differing amounts, or not at all, as the EV's traverse a particular region. Of course, there is a bilateral effect present, and the deflecting mechanism, whatever form it may take, may experience undesirable reaction from a countervoltage caused by the EV passage.

As EV's move along guide paths, such as provided by guide grooves as previously described for example, the EV propagation path is very stable, not only due to the potential well the EV's are traveling in due to the dielectric image charge and counterelectrode field, but also to the transverse wall boundaries established by the dielectric groove in two or more transverse directions. In order that an EV, moving along a guide channel, may be deflected sideways by an applied field to a new direction of propagation, the guide constraints in the direction of deflection must be sufficiently low to permit the deflection under the influence of a deflecting field. At the least, the region in which deflection is to occur must be free of any guide channel wall that would interfere with the transverse deflection of the EV. In general, an EV moving along a guide channel and experiencing a highly stable propagation path must be exposed to a relatively unstable path in the region of the deflection; after the desired deflection has occurred, the EV may again enter a relatively highly stable propagation path along a guide channel, for example. Where a choice is permitted, the EV may proceed in one of two or more available post-deflection propagation paths, depending on the application of a deflection field. A device which is thus used to selectively change the direction of propagation of an EV or EV chain, for example, is a deflection switch.

Figure 36:
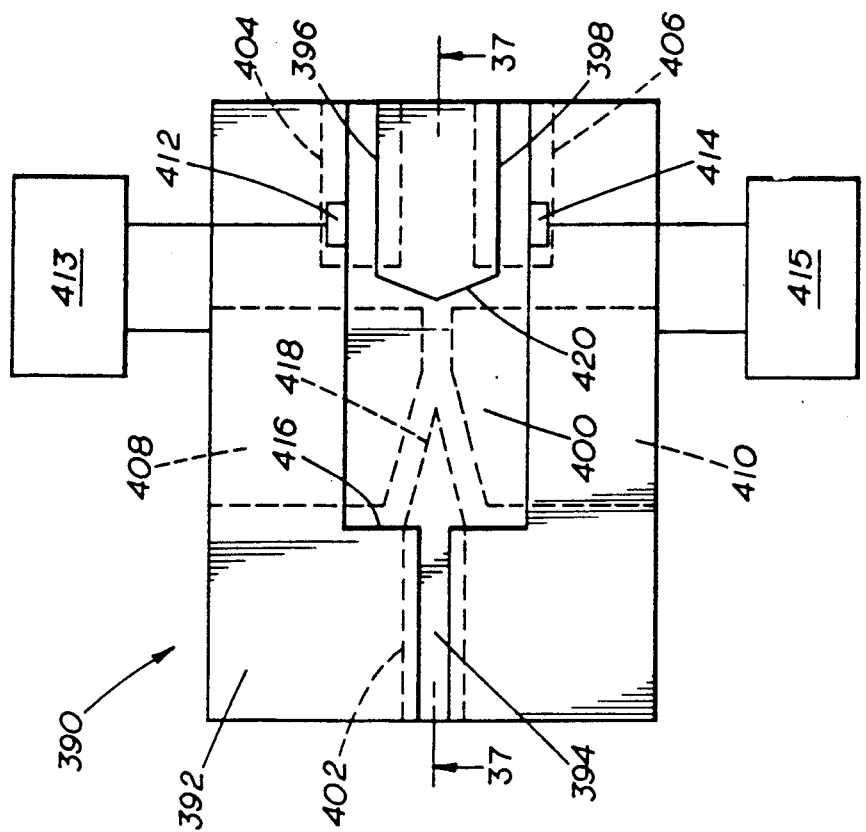
FIG. 36 is a top plan view of an EV deflection switch.

FIGS. 36-38 illustrate top, side and end views, respectively, of a deflection switch shown generally at 390. The EV deflection switch 390 is a single pole, double throw switch, constructed with a dielectric base 392 incorporating a single input guide channel 394 and first and second output guide channels 396 and 398, respectively. The input and output channels 394-398, which are shown as mutually parallel but may be set at virtually any angles relative to each other, are connected by a transition, or deflection, region 400 which has the same depth as the guide channels but which is generally broadened. A guide counterelectrode 402 underlies the input channel 394, and guide counterelectrodes 404 and 406 underlie the output channels 396 and 398, respectively, for the application of appropriate voltages to enhance the propagation of EV's along the respective guide paths.

Two deflection electrodes 408 and 410 are also positioned on the bottom side of the base 392 opposite the guide channels 394-398 and the transition region 400, the deflector electrodes extending laterally from positions partly underlying the transition region outwardly to provide relatively large surface area electrodes. Thus, an EV entering the transition region 400 from the input guide channel 394 may be deflected to the left (as viewed from the point of view of the EV entering the transition region) by a positive charge placed on the left deflector electrode 408 and/or a negative charge placed on the right deflector electrode 410. In this way, the path of propagation of the EV is turned from the generally straight line path enforced within the input guide channel 394. By appropriate application of charge to the deflector electrode 408 and/or the deflector electrode 410, the EV path may be deflected so that the EV enters the first, or left, output guide channel 396 along which the EV may continue to propagate. Alternatively, charge may be placed on one or both of the deflector plates 408 and 410 to deflect the path of propagation of an EV emerging from the input channel 394 so that the EV enters the second, or right, output channel 398, along which the EV may continue to propagate.

The deflection switch operates by allowing an EV to move from a relatively highly stable path in the input guide channel into a region of relative instability within which the path may be selectively deflected by the application of a deflector field, whereupon the EV may enter an output guide channel providing another relatively highly stable propagation path. The transition from the input guide channel to the transition region should be done in a manner that does not set up transients in the EV path, otherwise spurious switching can result. Feedback from the deflected EV can be used to completely relieve the effects of input loading or coupling. For example, any nearby electrode will pick up voltage feedback as an EV passes; the feedback signal can be communicated to a deflection plate through an appropriate variable amplitude, phase inverter coupling. Those skilled in the art will recognize this as a push-pull device. By reversing leads, it can be used to provide cross coupling. Such a feedback electrode 412 is shown positioned on the top of the base 392 adjacent the left output channel 396 and connected by an appropriate lead to a coupling circuit 413, the output of which is connected to the left side deflection electrode 408. A similar feedback electrode 414 is positioned on top of the base adjacent to the right output channel 398 and connected to a coupling circuit 415, the output of which is connected to the right side deflection electrode 410. In this way, degenerative or regenerative feedback may be achieved to produce a stable or unstable, that is, bistable, switching process, respectively. Other known feedback effects may be achieved, with a different feedback circuit for each effect Similarly, filters can be constructed with the feedback circuitry to limit the switching of EV's to an output channel according to charge magnitude or other parameters, for example. There is a considerable advantage in having the feedback circuit use electromagnetic components operating near the velocity of light to circumvent the delays that would otherwise produce poor transient response. Conventional resistor, capacitor and inductance components in general work well with EV's traveling at about 0.1 the velocity of light.

The deflection switch 390 illustrated in FIGS. 36–38 may be constructed by etching the guide paths and transition region into fused silica using photolithographic techniques, for example. The conductive electrode deposits can be made using vacuum evaporation or sputtering methods. The depth and width of the input and output guide channels should be approximately 0.05 mm for operation with EV's generated at about 1 kv. The deflection voltages applied to the deflector electrodes may range from tens of volts to kilovolts, depending upon the degree of stability of the path of the EV passing through the transition, or deflection, region. The degree of stability of the EV path within the transition region depends upon the shape and length of the transition region as well as the configurations of the counterelectrodes.

To optimize the deflection sensitivity of a switch, the EV propagation path should be more unstable down the middle of the transition region. For example, the deflection switch 390 features a transition guide portion 400 with side walls 416 which intersect the input channel guide walls at right angles to mark an abrupt end of the input guide channel 394. Such an abrupt mechanical transition requires high deflection voltages to selectively control and deflect the EV's within the transition region since the EV's can merely lock onto one of the side walls of the transition guide region 400, opposite to the desired deflection direction. Consequently, high deflection voltage would be required to switch an EV across the transition guide section 400 to the opposite wall.

The transition from the input channel 394 to the deflection guide area 400 can be made more gradual, and the deflection sensitivity of the device increased, by particularly patterning the electrodes, including the input guide counterelectrode 402. For example, as illustrated, the input guide counterelectrode 402 does not end at the intersection of the input guide channel 394 with the intermediate transition section 400, but rather continues on in a tapered portion 418 extending partly under the intermediate section. Accordingly, the deflector electrodes 408 and 410 are truncated to parallel the tapered portion 418 of the input counterelectrode 402. Such an electrical transition technique allows an EV to move from the input guide channel 394 to the intermediate guide section 400 with little disturbance, that is, with no significant change in propagation path in the absence of a deflector field, thereby promoting high deflection sensitivity. Without the use of a counterelectrode in general, the EV propagation path cannot be readily predicted.

As illustrated, the intermediate region 400 forms a shallow V-shaped wall 420 between the first and second output guide channels 396 and 398, respectively. The shape of this portion 420 of the intermediate guide section side wall is relatively ineffective in controlling the stability of the EV paths within the intermediate region.

Alternatively, an EV may be introduced into the intermediate transition section for deflection with low disturbance with the use of a mechanical design to provide a gradual transition of the EV from the influence of the input guide channel to the intermediate guide region. For example, such a deflection switch may feature an input guide groove which tapers in the thickness direction, or depth, in conjunction with an input guide counterelectrode which may end relatively abruptly, and may even be squared off, for example. For example, a tapered top surface 422 about the input channel 394 is shown in phantom in FIG. 37 as an illustration of such mechanical design. The input guide channel gradually loses its effectiveness in guiding the EV as the EV advances toward the deflection region, thus negotiating a transition between the two regions with little disturbance of the propagation path of the EV in the absence of a deflector field, and again providing relatively high deflection sensitivity. It will be appreciated that etching techniques in general yield tapered edges rather than abrupt, squared-off edges at the ends of surfaces. This naturally occurring etch taper may be exaggerated to achieve the taper such as illustrated at 422 in FIG. 37.

A technique to give greater stability against charge collection is to use a low resistance coating for the deflector electrodes, and placing these electrodes on the upper surface within the transition region 400 rather than under the region. Thus, the EV path will generally cross a deflector electrode. Dielectric charging is prevented by using this deflection method.

15. EV Oscilloscope

An EV or EV bead chain traveling across a surface in vacuum may do so in an erratic fashion due to local fields and surface disturbances. Such movement is accompanied by the ejection of electrons from the EV so that its path is visible when viewed by an electron imaging system or by the ejected electrons striking a nearby phosphor that produces visible light. By utilizing field forming structures, such as deflection electrodes, to impress electric fields to control the path of an EV, the path, and therefore its optical image, can be made to describe the time varying function of the applied voltage, thus providing the functions of an oscilloscope. This can be effectively achieved by extending the quality of the stabilizing and deflection methods of the EV switch 390 of FIGS. 36–38.

An EV oscilloscope of the planar type is illustrated generally at 424 in FIG. 39, and includes a dielectric substrate, or base, 426 featuring an EV input guide channel 428 opening onto a flat transition, or deflection, area 430 after the fashion of the transition area 400 of the deflection switch 390 in FIG. 36. A guide counterelectrode 432 underlies the guide groove 428, but ends in an extended taper under the deflection area 430 as illustrated. The leading wall 434 of the deflection area 430 is set at a 90° angle relative to the input channel 428. Consequently, the combination of the tapered counterelectrode 432 and the structure of the deflection area wall 434 relative to the input channel 428 maximizes the stability of EV's or EV chains entering the deflection area from the input channel as discussed hereinbefore in connection with the deflection switch 390.

Two deflector electrodes 436 and 438 are provided on the underside of the substrate 426 as illustrated to selectively apply a signal to act on EV's moving across a selected portion, the active area indicated by the broken line H, of the transition area 430. The entire interior area of the transition region 430 may be coated with resistive material to suppress surface charge and act as a terminator for the transmission line feeding in the deflection signal to the deflection electrodes 436 and 438. The bottom surface of the deflection area 430 must be smooth to avoid local unintended structures which might deflect an EV. The EV, or EV chain, propagates out of the active area H and the deflection region 430 in general, and may eventually be caught by a collector anode (not shown).

FIG. 40 is an end view of the EV oscilloscope 424, showing the addition of a phosphor screen 440. The screen 440 is to be positioned over at least the active area H, but may extend over the entire transition area 430 or even the entire substrate 426 as illustrated. Electrons emitted from the EV or EV chain moving under the influence of the applied deflection field interact with the phosphor 440 to emit light. An optical microscope 442 is positioned to receive light emitted from the phosphor 440 for magnification and observation. A light intensifying television camera can also be used in this configuration in place of the optical microscope. Magnification for the viewing system, whether a microscope or a television camera, should be sufficient to show an object of several micrometers, the approximate size of an EV. Utilizing a television monitor to view the activity of the oscilloscope provides both increased sensitivity and easy recording ability. Additionally, an electron camera, described hereinafter in Section 16, can be utilized to look directly at an EV traveling on the transition area 430, or even in space.

Any EV source compatible with launching into guides can be utilized with the EV oscilloscope 424. If appropriate, a separator or selector may also be utilized to provide the desired EV or EV chain entering the scope guide channel 428. Typically, the formation and launching voltage used to obtain EV's for the oscilloscope 424 may range between 200 volts and 2 kv depending upon the size of the structures utilized. As in the case of the deflector switch 390 of FIGS. 36–38, the design of the guide channel 428 (such as its length) and counterelectrode 432, and the deflection region 430 must be such as to provide a stabilized EV launched into the deflection region 430 without locking onto the side walls of the deflection region. The scope 424 effectively operates, in part, as an analog-type of switch with many output states that are determined by the voltage applied to the deflector electrodes 436 and 438.

The velocity of the EV moving out of the guide channel 428 and across the deflection region 430, coupled with the image magnification provided by the optical microscope, television system or electron camera, for example, represent the horizontal scan rate of the oscilloscope 424 while the electric field impressed orthogonally to this motion, by use of the deflector electrodes 436 and 438, displays the vertical axis. The EV motion resulting is not a true function of the potential impressed upon the deflection electrodes 436 and 438, but rather an integral of the function.

Synchronization of the EV trace with the electrical event being analyzed by use of the scope 424 may be accomplished by generating the EV's slightly before the event is to be displayed, as is usual for oscillography. The sensitivity and sweep speed of the scope 424 may be varied by changing the entire device geometrically, or at least viewing a longer EV run in an extended active area H for longer sweep times. Typically, the distance between nearest points of the two deflector electrodes 436 and 438 may be in the range of approximately 1 millimeter, and impressed signal frequencies on the order of 100 GHz may be utilized. The voltage range of the display is determined by selecting a particular attenuation for the signal before it is impressed upon the deflection electrodes 436 and 438. Due to the small size of the EV and its relatively high velocity, the bandwidth of an EV oscilloscope is relatively large. Single event waveforms can be analyzed when the transition times lie in the 0.1 picosecond range. Such a fast oscilloscope provides a significant tool in analyzing high speed effects obtained with use of EV's. For such wide bandwidths, as is possible with the "picoscope," it is necessary to compensate the attenuators used in the signal input circuitry to the deflection electrodes 436 and 438. Use of microstructures in constructing the EV scope avoids excessive signal time delays. The scope 424 and any associated circuitry should be operated as closely as possible to the electrical event being measured to prevent dispersion in the coupling transmission lines. For much of the work in the range of an EV scope, the scope may be effectively embedded in the region generating the signal. The picoscope essentially becomes a "chip scope," and may be considered practically disposable.

16. Electron Camera

As noted hereinbefore, an electron camera may be utilized to view the electron emissions from EV's moving on an EV oscilloscope, such as the picoscope 424 of FIGS. 39 and 40. Such an electron camera is shown generally at 450 in FIGS. 41 and 42. The camera 450 includes a metallic casing 452 which serves as an electrical shield against stray fields which might otherwise affect the manipulation of charge within the casing. A pinhole aperture 454 is provided as an entrance to the casing 452 to allow electrons, ions, neutral particles or photons, to enter the casing while assisting in screening out stray charge, for example. Typical scale for the camera 452 is indicated by the 25 millimeter dimension shown in FIG. 42. Typical lateral dimension of the aperture 454 is approximately 50 micrometers.

A pair of deflector plates 456 and 458 are positioned within the casing 452 so that charged particles entering the aperture 454 are generally directed between the deflection plates. Terminals 460 and 464 extend from the deflection plates 456 and 458, respectively, through the wall of the casing 452 and are insulated therefrom by insulation shafts 462 and 466, respectively. A combination channel electron multiplier (CEM) and phosphor screen 468 is positioned across the end of the casing 452 opposite the aperture 454. Charged particles impact the CEM, which produces a cascade effect to yield a magnified charge impact on the screen, which glows to optically signal the original impact on the CEM at the location opposite the glow on the screen. The construction and operation of such a CEM and phosphor screen combination 468 are known, and need not be further described in detail herein.

The casing 452 is open at the phosphor screen, except with the possible addition of a conducting film to complete the shielding provided by the casing, but which will not interfere with the emergence of light from the phosphor screen to be viewed outside the casing. Although not shown in the drawings, the CEM and phosphor screen 468 are provided with appropriate lead connections by which selected voltages may be applied thereto separate from the potential at which the casing 452 may be set, and by which a potential difference may be effected between the CEM and the phosphor screen. Typically, the potential difference between the CEM and the phosphor screen is 5 kv, while the CEM gain is independently varied by setting its potential. In general, the various components of the camera 450, including the case 452, may be set at either polarity and at any potential, at least up to 5 kv.

In addition to the capability of having various voltages applied to the casing 452, CEM and phosphor screen 468 and electrodes 456 and 458, the camera 450 may also be mounted for selected movement and positioning relative to whatever is being examined by means of the camera. Thus, for example, it may be appropriate to move the camera longitudinally and/or sideways, or rotate the camera about any of its axes.

Charged particles, such as electrons, entering the aperture 454 may strike the CEM 468 at any point thereof, with the result that a bright spot is produced on the phosphor screen and can be viewed as an indication of some event. The deflection plates 456 and 458 are provided for use in performing charge or energy analysis, for example, or in other measurements. Retarding potential methods, utilizing the voltage on the CEM, for example, may also be used in the analyses. Such analysis techniques are known, and need not be described in detail herein.

The pinhole camera 450 has a variety of applications in conjunction with EV's, for example. In FIG. 41, an EV source 470 and anode 472 are positioned in front of the camera aperture 454 so that EV's may be extracted from the source and passed through an aperture in the extracting anode. The EV's will strike the front of the camera 450 around the aperture 454, which may be in a molybdenum plate. A brass ring (not shown) may be placed in front of the plate with the aperture 454 to receive the EV's and prevent them from striking the face of the camera 450. A metal foil may be placed across the aperture 454 to serve as a target. In another such arrangement, the combination of the EV source 470 and the extractor 472 may be positioned at a different angular orientation relative to the camera 450, such as at 90° relative to the configuration illustrated in FIG. 41 so that generated EV's are made to pass by the camera aperture 454 with the result that some electrons emitted from the passing EV may enter the camera aperture for observation of the EV propagation.

FIG. 43 illustrates how the camera 450 may be used in conjunction with an EV oscilloscope such as the picoscope 424 of FIG. 39. As illustrated in FIG. 43, the camera 450 may be positioned facing the active area H of the oscilloscope 424 with the camera aperture a short distance therefrom so that electron emission from an EV being used to trace a signal on the scope active area may enter the camera through the camera aperture and be detected by the CEM and phosphor screen. For such use of the camera, the deflection plates 456 and 458 may be maintained at ground potential, for example, while the CEM is maintained at sufficient voltage to accelerate the EV-emitted electrons to strike the CEM. The lens system of a television camera 474 is illustrated facing the light output end of the camera 450 in FIG. 43. The CEM and phosphor screen combination already provides a magnification of approximately 5 in the camera 450 as illustrated. The overall magnification of the combination of the electron camera 450 and the television camera 474 may be increased by use of the television system.

Figure 44:
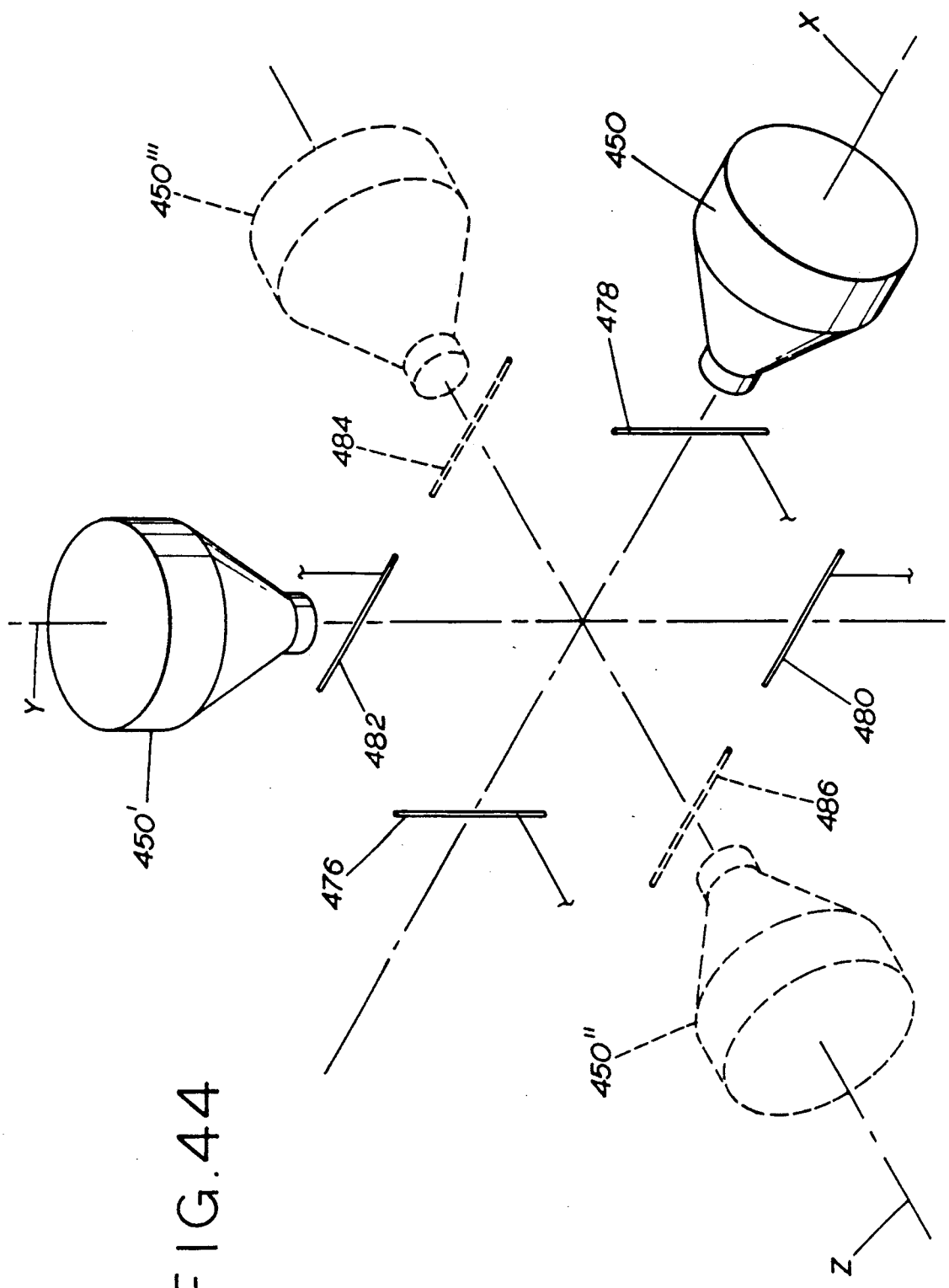
FIG. 44 is a schematic representation showing the use of multiple electron cameras to observe the behavior of EV's.

FIG. 44 shows yet another use of an electron camera 450, here in conjunction with a second electron camera 450' positioned so that the longitudinal axes of the two cameras are mutually perpendicular and may be in the same plane. In this way, the location of an EV, for example, passing in front of the two cameras may be determined in three dimensions. As illustrated, the cameras 450 and 450' are positioned along the x and y axes, respectively, of an orthogonal xyz coordinate system, with the cameras "looking back" toward the origin of the coordinate system. Two sets of deflecting electrodes, including electrodes 476 and 478 located in mutual opposition along the x axis, and electrodes 480 and 482 also located in mutual opposition and along a line perpendicular to the axis of orientation of the first pair of electrodes 476 and 478, that is, along the y axis, may be positioned as illustrated to selectively deflect an EV in the combined field of view of the cameras 450 and 450'. The electrodes 476–482 may be thin wires, say on the order of 0.5 mm in diameter, so that the wires 478 and 481 nearest the cameras 450 and 450', respectively, may be placed in front of the respective cameras without interfering with the line of sight of the cameras, that is, the cameras "see sround" the wire electrodes. Appropriate leads to the electrodes 476–482 permit setting them at desired potentials. In this way, as noted hereinbefore in the discussion of an EV oscilloscope in Section 15, an EV oscilloscope operating in three dimensions can be constructed and utilized with two electron cameras.

FIG. 44 also illustrates the use of a third electron camera 450" positioned along the z axis, for example, to further observe the behavior of EV's in three dimensions in conjunction with the x and y cameras, 450 and 450', respectively. Field electrodes 484 and 486 are provided along the z axis to deflect EV's in that direction.

Two electron cameras may be positioned along the same line, such as cameras 450" and 450'" shown in FIG. 44 facing each other along the z axis, to perform Doppler energy analyses on electrons, for example.

As in the case of the picoscope of Section 15, for example, any appropriate EV source, with EV manipulating components disclosed herein, may be utilized to introduce EV's into the field of observation of any of the camera arrangements indicated in FIG. 44.

17. Multielectrode Sources

The separators, selectors and launchers described hereinbefore are forms of multielectrode sources, or EV generators, designed for specific purposes as noted; that is, these devices include electrodes in addition to a cathode and single anode, or counterelectrode used to generate EV's. Multielectrode devices may be used for other purposes as well. For some applications, it may be necessary to maintain a fixed cathode and anode potential difference for EV generation while still exercising selective control over the production of EV's. This may be accomplished by adding a control electrode to form a triode. One version of a triode source is shown generally at 490 in FIG. 45. The triode 490 is constructed on a dielectric base 492 featuring an elongate guide groove 494 in which is located a planar cathode 496. An anode, or counterelectrode, 498 is positioned on the opposite side of the base 492 from the cathode 496, and toward the opposite end of the base. A control electrode 500 is also positioned on the opposite side of the base 492 from the cathode 496, but closer longitudinally to the end of the cathode then is the anode 498. Effectively, the control electrode 500 is positioned between the cathode 496 and the anode 498 so that the voltage of the control electrode may significantly affect the electric field at the emission end of the cathode where EV's are formed.

With fixed potentials applied to the cathode 496 and anode 498, an EV may be generated at the cathode by pulsing the control electrode 500 in a positive sense. There is a sharp threshold for effecting field emission at the cathode, the process that initiates the generation of an EV. Therefore, a bias voltage may be applied to the control electrode 500 with a pulse signal of modest voltage amplitude to generate EV's. In such case, no dc current is drawn from the control electrode 500, but large ac currents are present with the pulsed signal.

A triode operates by raising the cathode emission density to the critical point required for the generation of an EV. As in triodes in general, some interaction between the control electrode 500 and the output of the source 490 may occur. The control electrode 500 must be driven hard enough to force the first EV and a subsequent EV into existence because of the strong feedback effects that tend to suppress the creation of the EV's. Standard feedback at high frequencies diminishes the gain of the generator, so that the control electrode cannot be raised to sufficiently high positive potential to effect subsequent EV generation. For example, as the control electrode voltage is being raised in a positive sense to effect initial EV generation at the cathode 496, the capacitance of the combination of the control electrode and the anode 498 increases due to the presence of an EV as well as the increase in the control electrode voltage. When the first EV formation begins, the effect of the control voltage is reduced due to space charge. As the EV leaves the region over the control electrode 500 and approaches the region over the anode 498, there is a voltage coupled to the control electrode that depends upon the anode instantaneous potential, and which inhibits raising the control electrode potential for generation of the subsequent EV. This coupling can be reduced by incorporating still another electrode to produce a tetrode.

Figure 45:
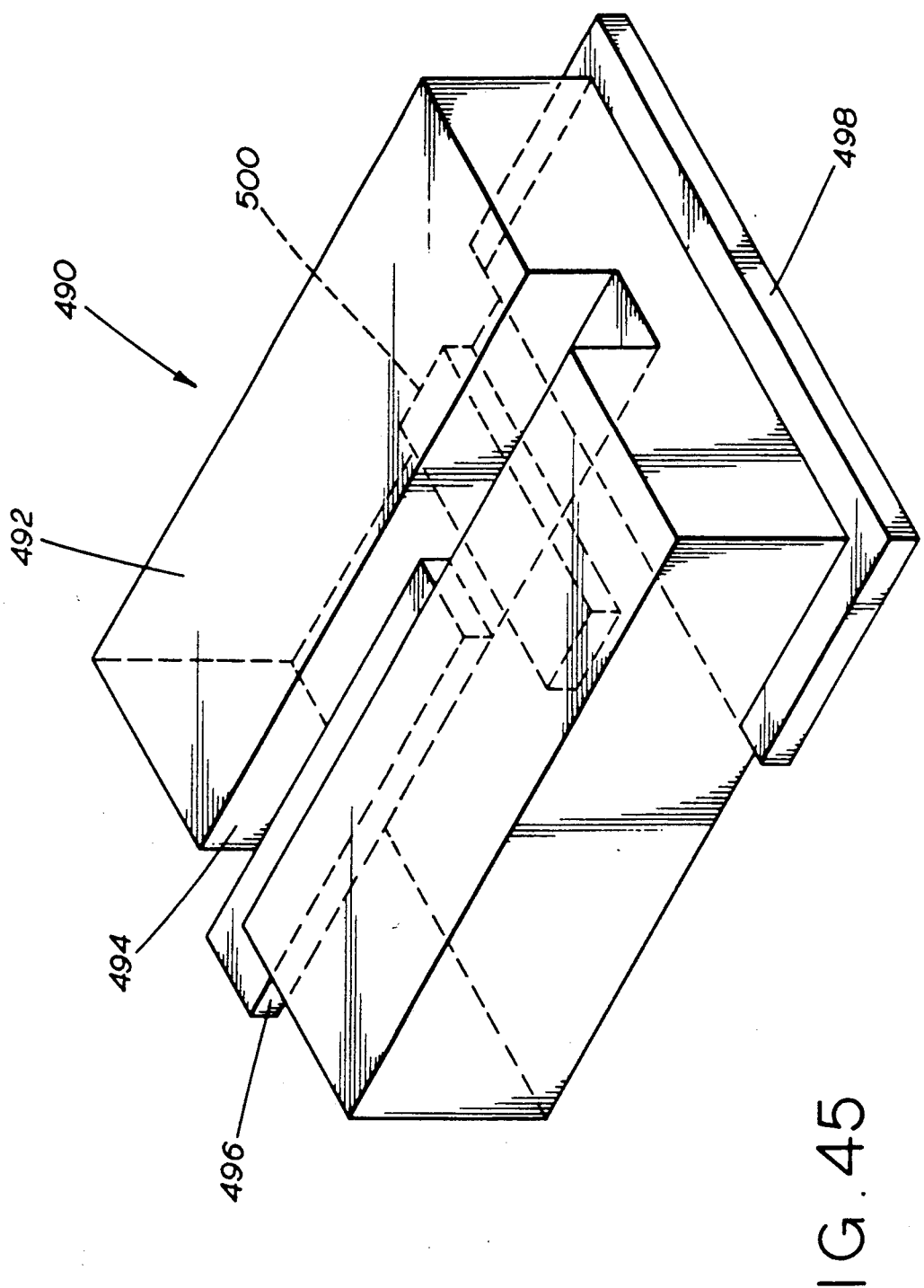
FIG. 45 is a schematic, isometric representation of a planar multielectrode EV generator.

A planar tetrode source is shown generally at 510 in FIGS. 46–48. A dielectric base 512 features a guide groove 514 in which a planar cathode 516 is located. On the opposite side of the base 512, and toward the opposite end thereof, from the cathode 516 is an anode, or counter-electrode, 518. A control electrode 520, similar to the control electrode 500 shown in FIG. 45, is positioned on the opposite side of the base 512 from the cathode 546 crossing under the guide groove 514, and is located between the longitudinal position of the anode 518 and that of the cathode. Consequently, the control electrode 520 may be biased and pulsed to effect generation of EV's from the cathode 516 as described in relation to the triode source 490 in FIG. 45, even with the cathode and anode potentials held constant.

A feedback electrode 522 is also positioned on the opposite side of the base 512 from the cathode 516. The feedback electrode 522 is positioned sufficiently close to the anode 518 to diminish any coupling between the control electrode 520 and the anode. Further, as may be appreciated by reference to FIG. 46, the feedback electrode 522 extends partly into a recess 524 in the side of the anode 518 so that the anode partially shields the feedback electrode from the control electrode 520 to minimize any inadvertent coupling between the control electrode and the feedback electrode.

The tetrode at 510 illustrated in FIGS. 46–48 may be constructed utilizing microlithographic film techniques. The width of the EV guide groove 514 may range from approximately 1 micrometer to approximately 20 micrometers; therefore, either optical or electron lithographic methods may be used to construct the tetrode. Typically, aluminum oxide may be used to form the dielectric base 512, and molybdenum may be the conductor material used to form the various electrodes. Other choices for materials include diamond-like carbon for the dielectric and titanium carbide or graphite for the conductor. In general, any stable dielectric material and stable metallic conductor material may be utilized. The cathode 516 may be wetted with liquid metal as discussed hereinbefore. However, with small structures in thermal equilibrium, there is the possible danger of the migratory metal straying to places other than the cathode 516 to alter the electrode configuration. Alternatively, the planar cathode 516 may be pointed at the end 526 to provide a sharpened tip to aid in the production of field emitted electrons in EV formation, rather than relying on metal wetting to restore a cathode edge for EV production. Multielectrode sources such as the triode 490 and the tetrode 510 illustrated herein may be operated in vacuum, or in selected gas pressure as discussed hereinbefore in relation to other devices.

Multielectrode sources are discussed in further detail in Section 21 on field emission sources, wherein an operating circuit is indicated for a tetrode source.

The previously described triode devices, including the separators, selectors and launchers, may be provided in tetrode form as well. While several multielectrode generators are illustrated and described herein, other apparatus employing two or more electrodes and useful in various applications and for a range of purposes may be adaptable to EV technology. In general, techniques used in the operation of vacuum tubes can be used effectively in various EV generation or manipulation devices.

18. Electrodeless Sources

Yet another type of EV generator is shown generally at 530 in FIG. 49. A generally elongate dielectric envelope 532 features three electrodes 534, 536 and 538, fixed to exterior surfaces of the envelope. The two electrodes 534 and 538 are positioned on opposite ends of the envelope 532 while the intermediate electrode 536 is shown located approximately one-third of the distance from the electrode 534 to the electrode 538. The end electrode 538 is an extractor electrode which is used in the manipulation of EV's after their formation. The remaining electrodes 534 and 536 are utilized in the formation of EV's. The intermediate electrode 536 is in the form of a ring electrode surrounding the envelope 532. In the particular embodiment illustrated, the ring electrode 536 is located within the exterior formation of a constriction that defines an interior aperture 540 separating the interior of the envelope 532 into a formation chamber 542, to the left as viewed in FIG. 49, and an exploitation, or working, chamber 544, to the right as viewed in FIG. 49. Likewise, the end electrode 534 is positioned within the depression formed by an indentation into the end of the envelope 532. Consequently, the intermediate electrode 536 is frustoconical, and the end electrode 534 is conical; the extractor electrode 538 is planar. The indentation and constriction on which the electrodes 534 and 536, respectively, are located are not necessary for the formation of EV's, but serve other purposes as discussed hereinafter. Although the working chamber 544 is illustrated as approximately twice the length of the formation chamber 542, the working chamber may be virtually any length.

When bipolar electrical energy, such as radio frequency energy, is applied to the first and second electrodes 534 and 536, respectively, mounted on the dielectric envelope 532 which contains a gas, EV's are formed within the formation chamber 542 even though the external metallic electrodes are isolated from the internal discharge. A cathode is utilized to generate the EV's although the isolated first electrode 534 appears as a "virtual cathode." Such "electrodeless," or isolated cathode, EV production may be desirable under some conditions, such as when there is danger of damaging electrodes by sputtering action due to high voltage discharge EV production.

For a given set of parameters such as spacing, gas pressure and voltage, the discharge is particularly effective in producing and guiding EV's (as discussed in connection with gas and optical guides, for example), when the atomic number of the interior gas is high. For example, in the range of effectiveness, argon ranks low; krypton is more effective; xenon is the most effective of the three, assuming the spacing, pressure and voltage conditions remain the same.

Propagation of EV's through the gas within the envelope 532 produces ion streamers, as described hereinbefore, appearing as very thin, bright lines in the free gas or attached to the wall of the envelope. One or more EV's may follow along an ion streamer established by an earlier propagated EV. The first EV of such a series is propagated without charge balance; subsequent EV's passing along the same ion sheath established by the first EV of the series do so with charge balance maintained. As multiple EV's propagate along the same streamer, the thickness of the ion sheath increases.

The dielectric envelope 532 may typically be made of aluminum oxide and have an internal transverse thickness of approximately 0.25 mm for operation at 3 kilovolt peak voltage between the two formation electrodes 534 and 536, with an interior pressure of 0.1 atmosphere of xenon gas, such parameters, the spacing between the formation electrodes 534 and 536 should be approximately 1 mm. The dielectric may be metallized with silver for the formation of the electrodes 534-538.

The frustoconical shape of the first electrode 534 tends to stabilize the position of the EV formation. The annular constriction provides the aperture 540 of approximately $5 \times 10^{-2}$ mm for the remaining above-noted parameters. The aperture 540 permits operation at different pressures on opposite sides thereof between the formation chamber 542 and the exploitation chamber 544, when appropriate pumping is utilized to produce the pressure differential by means of gas pressure communication lines (not shown). For example, reduced gas pressure in the exploitation chamber reduces the guiding effect of the streamers for easier selective manipulation of the EV's. EV's in the exploitation, or load, chamber may be controlled by application of appropriately variable amplitude or timing potentials to the extractor electrode 538, as well as other external electrodes (not shown) for example, for useful manipulation of the EV's. For a given pumping rate, a greater pressure differential may be maintained on opposite sides of the aperture 540 for a smaller diameter aperture. The aperture diameter may be reduced to approximately $2.5 \times 10^{-2}$ mm and still allow passage of EV's therethrough. If the gas pressure in the exploitation chamber is sufficiently low, the EV's will propagate without visible streamer production as "black" EV's. Furthermore, an electrodeless source can be constructed with a smaller distance separating the formation electrodes 534 and 536 whereby EV's can be generated with as low as a few hundred volts applied. Moreover, the electrodeless source may be planar.

19. Traveling Wave Components

One use for EV's generated within a dielectric envelope such as provided by the source 530 of FIG. 49 is in a traveling wave circuit, and particularly in a traveling wave tube. Such a device provides a good coupling technique for exchanging energy from an EV to a conventional electrical circuit, for example. In general, an EV current manipulated by any of the guiding, generating or launching devices described herein may be coupled for such an exchange of energy. For example, a traveling wave tube is shown generally at 550 in FIG. 50, and includes a launcher (generally of the type illustrated in FIG. 25), or cathode, 552 for launching or generating EV's within a cylindrically symmetric EV guide tube 554, at the opposite end of which is an anode, or collector electrode, 556. A counterelectrode ground plane 558 is illustrated exterior to and along the guide tube 554, and may partially circumscribe the guide tube. The ground plane 558 cannot completely circumscribe the tube 554 because such construction would shield the electromagnetic radiation signal from propagating out of the tube. Appropriate mounting and sealing fittings 560 and 562 are provided for positioning the launcher or cathode 552 and anode 556, respectively, at the opposite ends of the guide tube 554.

A conducting wire helix 564 is disposed about the guide tube 554 and extends generally between, or just overlaps, the launcher 552 and the anode 556. The helix 564 is terminated in a load 566, which represents any appropriate application but which must match the impedance of the helix to minimize reflections. A pulsed input signal may be fed to the launcher or cathode 552 through an optional input, current-limiting, resistor 568. The input resistor 568 may be deleted if it consumes too much power for a given application. EV energy not expended to the helix 564 is collected at the anode 556 and a collector resistor 570 to ground. An output terminal 572 is provided for communication to an appropriate detector, such as an oscilloscope, for example, for wave form monitoring.

The velocity of an EV is typically 0.1 the velocity of light, or a little greater, and this speed range compares favorably with the range of delays that can be achieved by helix and serpentine delay line structures. For example, the length of the helix 564 and of the EV path from the launcher or cathode 552 to the anode 556 may be approximately 30 cm with the helix so constructed to achieve a delay of approximately 16 ns at a helix impedance of approximately 200 ohms. The impedance and delay of the helix 564 are affected, in part, by the capacitive coupling to the ground plane 558. The inside diameter of the glass or ceramic tubing 554 may be approximately 1 mm or smaller, with the tubing having an outside diameter of approximately 3 mm. An EV can be launched at a voltage of 1 kv (determined primarily by the source) at a xenon gas pressure of $10^{-2}$ torr to achieve an output pulse of several kv, for example, from the helix 564.

As an example, with a mercury wetted copper wire as a cathode in place of the launcher 552, a xenon gas pressure of approximately $10^{-2}$ torr, an input pulse voltage 600 ns wide at 1 kv with a firing rate of 100 pulses per second impressed through a 1500 ohm input resistor 568, and with an anode voltage of zero and a target load 570 of 50 ohms, an output voltage of −2 kv was achieved on a 200 ohm delay line 564 and an output voltage into the target 556 of −60 volts. A faint purple glow was established within the tube 554 and, when a positive input voltage was applied to the anode 556, visual EV streamers were present for the last centimeter of the EV run just before striking the anode. The wave form generated in the helix 564 is a function of the gas pressure. Generally, a sharp negative pulse of approximately 16 ns in length was produced with the aforementioned parameters, followed by a flat pulse having a length that was linearly related to the gas pressure, and which could be made to vary from virtually zero at preferred conditions of minimal gas pressure to as long as one millisecond. The input pulse repetition rate may be reduced for such high gas pressure values to permit clearing of ions within the tube between pulses to accommodate the long output pulse. The magnitude of the negative pulse increased as the gas pressure decreased. At minimal gas pressure, only a sharp negative pulse of approximately 16 ns width was obtained.

A planar traveling wave circuit is shown generally at 580 in FIG. 51, and may be constructed by lithographic technology using films of material. A dielectric base 582 includes a guide channel 584 containing a collector, or anode, 586. EV's are input by a launcher, or other appropriate device, at the left end of the guide groove 584 as viewed in FIG. 51, and are further maintained within the guide groove by use of a counterelectrode (not visible) on the opposite side of the base 582 from the groove.

A serpentine conductor 588 is positioned on the bottom side of the base 582, underlying the guide groove 414 as illustrated, and ending in a load resistor, or other type load, 590, as needed. As EV's are launched into and guided down the groove 584, energy of the EV's is transferred to the serpentine conductor 588 and communicated to the load 590. Remaining EV energy is absorbed at the anode 586, which may be connected to a ground resistor, detector or other load. Although not illustrated, it is preferable to have a counterelectrode under the serpentine conductor, separated by a dielectric layer, to achieve a reasonable line impedance and the reduction of radiation, and also a dielectric or space layer between the groove and the serpentine.

As an alternative to placing the conductor 588 on the bottom of the base 582 opposite to the guide groove 584, the groove may be covered with a dielectric and a serpentine conductor such as 588 placed above the dielectric cover to overlie the groove. Without such a dielectric cover layer separating the groove 584 from the conductor above, a counterelectrode must be positioned on the bottom side of the base 584 under the guide groove to prevent EV's from moving onto the serpentine conductor. With such an arrangement, electrons emitted during EV propagation down the guide groove 584 may be collected on the serpentine conductor for added energy transfer.

Traveling wave tubes or circuits as illustrated in FIGS. 50 and 51, for example, thus provide a technique for converting EV energy into energy that may be communicated by conventional electrical circuitry. With such techniques, electromagnetic radiation from the microwave region to visible light can be generated by EV pulses and coupled to conventional electrical circuitry by selectively adjusting the transmission line parameters and EV generation energy.

20. Pulse Generator

An EV is characterized by a large, negative electric charge concentrated in a small volume and traveling at relatively high speed, so that an EV or EV chain can be used to generate a high voltage fast rise and fall pulse. For example, any of the devices described herein for generation of EV's may be utilized in conjunction with a selector, such as shown in FIG. 26 or FIG. 27, to obtain the desired charge structure to provide EV's at a capturing electrode whereby the high charge density of an EV is converted to an electromagnetic pulse with the desired overall pulse shape. A switching, or pulse rise, speed as fast as approximately $10^{-14}$ seconds may be obtained when a 1 micrometer EV bead containing $10^{11}$ elementary charges and traveling at 0.1 the velocity of light is captured on an electrode system designed for the desired bandwidth. The voltage generated depends upon the impedance of the circuit capturing the EV's, but will generally be in the range of several kv.

A pulse generator is shown generally at 600 in FIG. 52, and includes a cylindrically symmetric selector shown generally at 602. A conically-tipped cathode 604, wetted with conducting material, is positioned within a separator dielectric base 606 and facing an aperture 608 thereof. A generating anode 610 coats the exterior of the dielectric base 606, and an extractor electrode 612 is positioned a short distance in front of the base aperture. A generally cylindrical conducting shield 614 generally circumscribes the separator 602, and is closed by a disk 616 of dielectric material on which is mounted the extractor electrode 612. A conductive metal coating in the shape of an annular ring provides a conducting terminal 618 on the side of the disk 616 facing the shield 614, and makes electrical contact with the shield. A load resistance 620 provided by a resistor coating covers the annular surface area between the extractor electrode 612 and the ring conductor 618 so that the separator 602 is nearly completely surrounded by shielding to limit electrical stray fields and to help complete current paths with minimal inductance. The overall size of the pulse generator may be approximately 0.5 cm.

The external side of the dielectric disk 616, shown also in FIG. 53, is virtually a mirror image of the interior side, featuring a circular output electrode 622 connected to an annular ring electrode 624 by a resistive coating 626, with the shape and dimensions of the exterior electrodes 622 and 624 being essentially the same as those of the interior electrodes 612 and 618, respectively. The output electrode 622 is thus capacitively coupled to the extractor electrode 612 whereby the capture of the relatively high charge of an EV or EV chain by the extractor electrode produces a corresponding high negative charge on the output electrode.

To initiate EV production, an appropriate negative pulse may be applied to the cathode 604 by means of an input terminal 628 with the anode 610 maintained at ground, or a relatively small positive potential, by means of a terminal 630 passing through an appropriate opening 632 in the shield 614. A more positive extractor voltage is applied to the extractor electrode 612 through a terminal 634 to the shield 614 connected to the extractor electrode by means of the conducting ring 618 and the internal resistor coating 620. When an EV is generated and leaves the selector 602, and is captured by the extractor electrode 612, the potential of the extractor electrode is rapidly lowered, and rises as the EV charge is dispersed by means of the resistor coating 620 and the shield 614, and ultimately by way of the terminal 634. The extractor voltage applied to the extractor electrode 612 is variable so that only selected EV's may be extracted from the selector 602 to provide the output pulses as desired. A bias voltage may be placed on the output electrode 622 by a terminal 636 connected to the ring conductor 624 and ultimately to the output electrode by the resistor coating 626.

In general, for fast pulse times, small, low reactance components with a minimum distance between the various circuit elements are used. The approach distance of the EV from the selector 602 to the extractor electrode 612, and the charge of the EV determine the rise time of the negative pulse on the output electrode 622. The RC constant, or resistance, of the load resistor 620 determines the pulse fall time. For example, output pulses with a rise and fall time of $10^{-13}$ seconds minimum may be achieved with the "picopulser" 600 having a maximum external diameter of approximately 0.5 cm. The load resistor 620 is typically at least as large as about $10^{-4}$ ohms (and can be $10^{-3}$ ohms), and may be achieved by utilizing a thin metallic coating on the surface of the dielectric disk 616, which may be ceramic, for example. A similar resistive coating may be used as the resistor 626 to achieve the output coupling and bypass capacitor action. The output resistor 626 determines the bias on loads, for example. Where dc current is drawn at the output, the output pulse decay times may be varied by varying the output resistive coating 626, with longer pulse decay times achieved by increasing the resistance value of the coating, utilizing fired-on thick film fabrication techniques, for example. An operating voltage of up to 8 kv for various biases can be obtained, with proper attention to the finish of the metal conductive coating rings 618 and 624. The level of the output pulse may be varied by selectively varying the attenuation factor in the load circuit applied to the terminal 636.

The picopulser 600 thus provides a technique for achieving very fast and large voltage pulses by initial generation of EV's or EV chains. For optimum performance, the pulse generator 600 should be operated in vacuum.

21. Field Emission Sources

The principle requirement for generating an EV is to rapidly concentrate a very high, uncompensated electronic charge in a small volume. Such an operation implies an emission process coupled to a fast switching process. In the various gaseous EV generators described hereinbefore, the switching process is provided by non-linear actions of gas ionization and possibly some electronic ram effects. The gas switching process operates even with the sources utilizing cathodes wetted with liquid metal, once the basic field emission process liberates metal vapor from the cathode region by thermal evaporation and ionic bombardment. Pure field emission generation of EV's can be achieved with the elimination of all gas and migratory material from the system of EV generation. To achieve such field emission generation, fast switching must be provided and coupled to the field emitter so that the emission process can be switched on and then off again before the emitter is heated to the evaporation point by electronic conduction. Thus, EV's are generated by a field emission cathode operated in the emission density region beyond that normally used with other field emission devices, by pulsing the emitter on and off very rapidly, that is, faster than the thermal time constant of the cathode, thereby preventing thermal destruction of the emitter. Since the thermal time constant of the emitter is typically less than 1 picosecond, the resulting required short switching time for potentials in the hundreds of volts range can be achieved using EV-actuated switching devices, such as the pulse generator 600 illustrated in FIGS. 52 and 53.

A field emission EV source is shown generally at 650 in FIG. 54, and is constructed and functions similarly to the pulse generator 600 of FIGS. 52 and 53 with the exception that the pulse output electrode 652 of the field emission source includes a pointed emitter 654 extending from the otherwise disk-shaped electrode. An appropriate voltage pulse signal is applied to the cathode 656 and anode 658 of the separator shown generally at 660 to generate EV's, and a selected extractor voltage is applied to the extractor electrode 662 to attract an EV thereto. Capture of the EV at the extractor electrode 662 produces a fast rise negative pulse on the output electrode 652 so that a large field is concentrated at the tip of the emitter 654. The resulting field effect at the tip of the emitter 654 produces one or more EV's by pure field emission, with the field emission source operating in vacuum. The EV-generated negative pulse on the output electrode 652 must also have a short fall time so that the pulse is killed before the emitter 654 is damaged in the decline of the pulse. The resistor coating 64 on the extractor electrode side of the disk 666 may be approximately $10^{-2}$ ohms, and the resistor coating 668 on the field emitter side may be approximately $10^6$ ohms. An EV guide, 670, of the generally cylindrical construction illustrated in FIG. 15, for example, is shown positioned to receive EV's launched from the emitter 654 and to manipulate them to whatever load is intended.

The field emission generator 650 may be used to form EV's while at the same time testing the field emission cathode 654 for damage in order to optimize the formation process to minimize damage. A phosphor screen, or a witness plate (not shown), may be positioned appropriately to receive EV's formed at the emitter 654. The picopulser is turned off and a bias voltage is applied through the lead 672 to impress a dc voltage on the emitter 654 to draw dc field emission therefrom. Although the bias voltage applied to the lead 672 is usually negative, it can be positive if the EV from cathode 656 is produced by a voltage higher than 2 kv. Then, the emission pattern on the adjacent phosphor screen or witness plate may be analyzed in conjunction with the value of the dc bias voltage and current to the emitter 654 to determine the cathode radius, crystallographic status and other morphological characteristics immediately after EV generation. Such analysis methods for field emission surfaces are well known.

The peak voltage of the picopulser being used to drive the field emitter 654 can be determined by varying the bias voltage through the lead 672 to offset the pulse voltage to the cathode 656. In this way, the field emitter 654 is being used as a very high speed rectifier or detector to measure the pulse peak to the cathode 654. To test characteristics of the EV's produced, a film or foil of smooth metal, as a witness plate, may be positioned in front of an anode (not shown) positioned in front of the emitter 654, and connected to that anode. A spacing of up to one millimeter between the emitter 654 and such an anode can be used in vacuum when the system is operated at approximately 2 kv. The impact mark the EV leaves on the witness plate can be analyzed in a scanning electron microscope to determine the number of EV beads formed and their pattern of arrival. Many high speed effects can be investigated with the generator 650 of FIG. 54. If the output from the pulse generator is kept low in voltage and a sensitive detector used for detecting emission from the field emitter 654, it is possible to effectively measure very short pulse voltage amplitude by a substitution technique using the high speed rectification ability of the field emitter. The bias voltage applied through lead 672 is substituted for the pulse voltage.

At high levels of pulse voltage, far into what is usually thought of as the space charge saturation region for a field emitter, the emitter 654 generates bunches of electrons that resemble EV's, as detected on a nearby witness plate. These small EV's are potentially very useful for specialized computer-like applications using charge steering.

The field emission generator 650 shown in FIG. 54 is an example of one of the ways relatively large components can be utilized in reaching the necessary switching speeds to achieve pure field emission EV production. For practical application, it may be desirable to use a complete system of compatible microcomponents to fabricate the switching and launching devices. Moreover, in view of the small sizes and relatively high voltages required, more practical devices for utilizing and generating EV's formed from relatively pure field emission may be constructed utilizing microfabrication.

FIG. 55 shows a microcircuit using thin film techniques to construct a complete system for producing EV's by field emission without relying upon external EV generators or bulk components that might complicate high speed operation. Here, the switching process is carried out by feedback on a time scale consistent with the thermal processes in the EV generator, that is, the switching rate is equal to or, preferably, faster than the thermal time constants and thermal processes. It is necessary to switch the emitter on and off in less than 1 ps to prevent cathode destruction.

The field emission source shown generally at 680 in FIG. 55 is similar in construction to the tetrode source 510 of FIGS. 46–48. Thus, a dielectric base 682 features an elongate groove 684, which may be of generally rectangular cross section, in which is positioned a line cathode source 686 which is operated without being wetted with a metallic coating. A counterelectrode 688 is positioned on the opposite side of the base 682 from the groove 684 and toward the opposite end of the base from the cathode 686. The counterelectrode 688 underlies a portion of the guide groove 684. A control electrode 690 is also positioned on the same side of the base 682 as the counterelectrode 688, and extends from a side edge of the base to a position underlying and crossing under the guide groove 684 between the ends of the cathode 686 and the counterelectrode. A feedback electrode 692 is also positioned on the opposite side of the base 682 from the cathode 686, and extends laterally across the underside of the base toward the end of the counterelectrode 688 closer to the cathode. A leg 694 of the feedback electrode 692 extends along a recess 696 in the counterelectrode 688 whereby the feedback electrode may interact with a generated EV during the propagation of the EV along the guide groove 684, generally for the length of the electrode leg 694.

FIG. 56 shows a circuit diagram at 700 of the field emission source 680 of FIG. 55 and associated apparatus for effecting the field emission production of EV's. An energy storage device 702 is connected to the cathode 686, and provided with appropriate negative potential through a lead 704. The passive energy source 702 may be a capacitor or a strip delay line, as used in hydrogen thyratron pulse radar systems for example, with a resistor or conductor feed. The generating energy source 702 typically provides a 1 ps negative pulse when discharged by means of the potential change on the control electrode 690. Otherwise, a constant potential may be applied between the cathode 686 and the counterelectrode 688.

A phase inverting air core pulse transformer 706 is selectively operated by a trigger pulse through a lead 708 to apply a positive control bias voltage, supplied by means of a lead 710, to the control electrode 690 to initiate the EV field emission generation at the cathode 686. The feedback signal needed to sustain emission after the trigger pulse has been removed, and until the stored energy in the power supply 702 has been depleted, is provided by the transformer 706 by means of the feedback electrode 692.

The field emitters, such as 654 and 686, used in pure field emission sources such as those described, should be fabricated from relatively stable material in terms of thermal and ion sputter damage. For example, metal carbides, such as titanium carbide and graphite, provide such characteristics to make good cathodes. Similarly, the dielectric material should be of high stability and high dielectric field strength. Aluminum oxide and diamond-like carbon films exhibit such characteristics. Since there is no self-repairing process available for the cathodes, as there is with liquid metal wetted sources, it is preferred to use ultra high vacuum at the emitters to avoid damage thereto by ion bombardment, or modification of the surface work function.

Prevailing factors preclude the use of pure field emitters of large size. The critical limit appears to be approximately one micrometer for the lateral dimension of an emitter of the type 686 shown in FIG. 55. For cathodes above such size, the stored energy of the associated circuitry places an undue thermal strain on the small emitter area during emission. Below the one micrometer size range, the field emitter has the advantage of large cooling effects provided small elements having a naturally high surface-to-volume ratio.

22. X-Ray Source

EV's may be utilized to generate X-rays. An X-ray generator, or source, is shown generally at 720 in FIG. 57, and includes a mercury wetted copper type cathode 722, as illustrated in FIG. 4, and a separator 724 equipped with a relative to an anode 728 for generation and propagation of EV's, including possibly EV chains, from the cathode through the separator aperture to the anode.

It has been found that stoppage of an EV on a material target or anode is accompanied by a flash of light from the plasma produced and a crater left as a result of the disruption of the EV and accompanying expenditure of energy. A portion of the energy expended is carried off in X-ray production. The X-ray source itself within the target 728 is as small as the EV, that is, in a range of approximately 1 to 20 micrometers in lateral dimension, depending upon how the EV was originally made or selected. The small source of X-rays has a relatively high production efficiency and intensity, providing a high total X-ray output compared to the input energy. This phenomenon indicates an intense X-ray production upon disruption of the ordered EV structure, possibly due to the sudden disruption of the large magnetic field generated by electron motion within the EV.

Output from the cathode 722 and separator 724 impinges on the anode target 728 to produce emission of X-rays as indicated schematically in FIG. 57. The material of the target 728 is sufficiently low in inductance to cause the EV to effectively break apart. A low atomic number material, such as graphite, minimizes damage due to EV disruption, and allows relatively easy passage of X-rays produced to the output side of the target 728. The X-ray source 720 can be operated either in vacuum or in a low pressure gas. For example, in an environment of a few torr of xenon gas, the cathode 722 and separator 724 may be spaced as far as approximately 60 cm from the anode target 728, with a pulse signal of 2 kv applied to the cathode for the production of EV's. Analysis of the total X-ray output from the source 720 can be accomplished utilizing known techniques, such as using filters, or photographic film, or wavelength dispersion spectrometers. However, since the X-ray photons are all generated at approximately the same time, energy dispersive spectrometers are not able to analyze the spectral energy content of the X-ray output.

The present invention thus provides an X-ray generator, or source, capable for use as a point source of X-rays for application in stop motion X-ray photography, for example. The X-ray generator of the present invention can additionally be used in a wide range of X-ray applications.

23. Electron Source

EV's moving along a guide will generally produce the emission of electrons, which may be collected by a collector electrode, for example. In the case of RC guides, for example, it is possible to collect electron emission out the top of the guide groove if the groove is sufficiently deep and the EV is strongly locked to the bottom of the guide groove, or at least the counterelectrode on the opposite side of the dielectric base of the guide. The electrons thus emitted come from secondary and field emission sources that have been produced by the energy of the passing EV. Since these electrons have come from a dielectric material with a relatively long RC time constant for recharge, it is necessary to wait for such recharge until another EV can occupy the region, and thereby cause further electron emission. In the LC class of guides, this time delay is relatively short since recharge is supplied by way of metallic electrodes. Electrons can be collected for dc output use by simply supplying a collector electrode, since the emitted electrons have been given initial energy by the EV. In the case of LC guides, any of the electrodes in the guide structures of FIGS. 20 or 21 can be utilized as collector electrodes.

The characteristic of an EV that it can cause electron emission enables the EV to be effectively used as a cathode for various applications. A properly stimulated EV can be made to emit a fairly narrow band of electron energies. The primary consideration in using this type of cathode is determining the mean energy and the energy spread of the emitted electrons. There is also a chopping effect that results from having a definite spacing between the EV's moving along a guide and producing electron emission, for example. The chopping range is generally available from essentially steady emission from a virtually continuous train of EV's to a very pulse-like emission from passing a single EV or EV chain under an aperture. Consequently, the nature of the EV propagation as well as the guide structure through which the EV's are moving must be chosen appropriate to the application of the electron emission.

Figure 58:
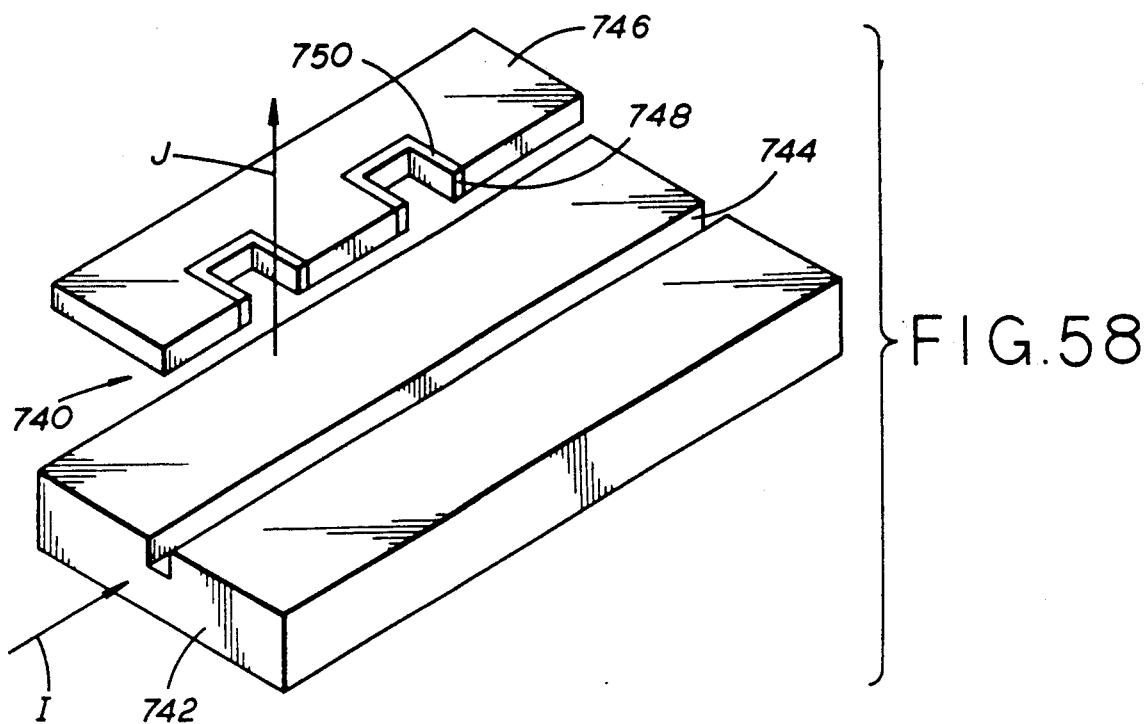
FIG. 58 is an exploded, isometric view of a gated electron source utilizing EV's.

A gated, or chopped, electron emission source is shown generally at 740 in FIG. 58, and may be part of a triode-like structure. An RC EV guide 742 is provided, featuring a guide groove 744 and a counterelectrode (not visible) on the underside of the guide base from the groove generally like the EV guide illustrated in FIG. 11. A dielectric plate 746 is positioned immediately over the base of the guide 742. The plate 746 features openings 748 which overlie the guide groove 744, and are lined with metal coatings 750 which serve as gating electrodes. A third element, not shown, may be an anode or the like positioned above the dielectric plate 746 to receive or collect the emitted electrons; the exact nature of the third element is dictated by the use to which the electron emission is to be applied.

In operation, one or more EV's are launched or otherwise propagated into the guide groove 744 as indicated by the arrow I. As discussed hereinabove, secondary or field emission effects associated with the passage of the EV down the guide groove 744 result in electron emission which may be propagated out of the guide groove, as indicated by the arrow J, the electrons having been given initial propagation energy in their formation associated with the presence of the EV. In general, the emitted electrons may be further attracted by the third component, such as an anode (not shown). However, electron propagation to the third component is selectively controlled by the application of appropriate potentials to the control electrodes 750. In general, the potential applied to a control electrode 750 will always be negative relative to the cathode used to generate the EV's. In effect, the gate, or opening, 748 in the dielectric 746, in each case, may be opened or closed to electron passage therethrough by selection of the specific potential on the respective control electrode 750. To close the gate 748, the potential on the control electrode 750 is made more negative so that no electron emission will take place therethrough. To open the gate 748, the potential on the control electrode 750 is made less negative, that is, relative to the EV-generating cathode, and electron emission through the gate is permitted.

As an EV propagates down the guide groove 744, the electron emission is generated. However, electrons may pass through the dielectric plate 746 to the third electrode component only at the locations of the passageways 748. Consequently, an EV moving along the guide groove 744 causes electron pulses to be emitted through the dielectric plate 746, with the pulses occurring at the locations of the passages 748. Further, a given passage 748 may be closed to electron transmission therethrough by the appropriate potential being placed on the respective control electrode 750. Consequently, a selective pattern of electron emission pulses may be achieved by appropriate application of potentials to the control electrodes 750. The pulse pattern may be further varied by propagating a train of EV's or EV chains down the guide groove 744 to achieve, for example, an extended pattern of electron emission pulses along the array of ports 748, with the potential values placed on the various control electrodes 750 themselves changing with time. Consequently, the electron emission pattern may be varied extensively by both the selection of EV propagation as well as the modulation of potentials on the control electrodes 750.

To prevent the EV itself from exiting one of the ports 748, the groove 744 should be maintained relatively deep, or alternatively, a spacer (not shown) can be used between the plate 746 and the base of the guide 742.

It will be appreciated that a pattern of electron emission ports 748 may be provided as desired, with appropriate EV guide mechanisms positioned in conjunction therewith. The number and positioning of the ports 748 along the guide groove 744 may be varied to select the electron emission pattern as well. The electron emission ports 748 may also be effectively throughbores in a dielectric plate which completely circumscribes each port, for example. In such case, the control electrodes 750 may also line the port walls on all sides.

In general, any type of EV generator that produces the desired EV output for the given application may be utilized to provide the EV's for electron emission. Typically, a version of the electrodeless source illustrated in FIG. 49, operating at a low gas pressure, may be utilized. The inert gas pressure in the system might be in the range of $10^{-3}$ torr, and would be in equilibrium throughout the system.

Electron emission by EV propagation, utilizing any of the apparatus described herein, such as the gated electron source 740 illustrated in FIG. 58, may find various applications. For example, various devices until now impractical for failure of the prior art to provide a cathode of sufficient emission intensity may now be exploited using an EV-generated electron source such as disclosed herein. Such a class of devices as the beamed deflection, free electron device, for example, may be provided utilizing a gated electron source of the type illustrated in FIG. 58, for example.

24. RF Source

Passage of EV's through the LC guides of FIGS. 20 and 21 generates RF fields within the guides, but the interaction with such fields is utilized to guide the EV's, and not to exploit external radiation. However, RF generated by passage of an EV can be coupled out of an EV guide and made available for external application.

Figure 59:
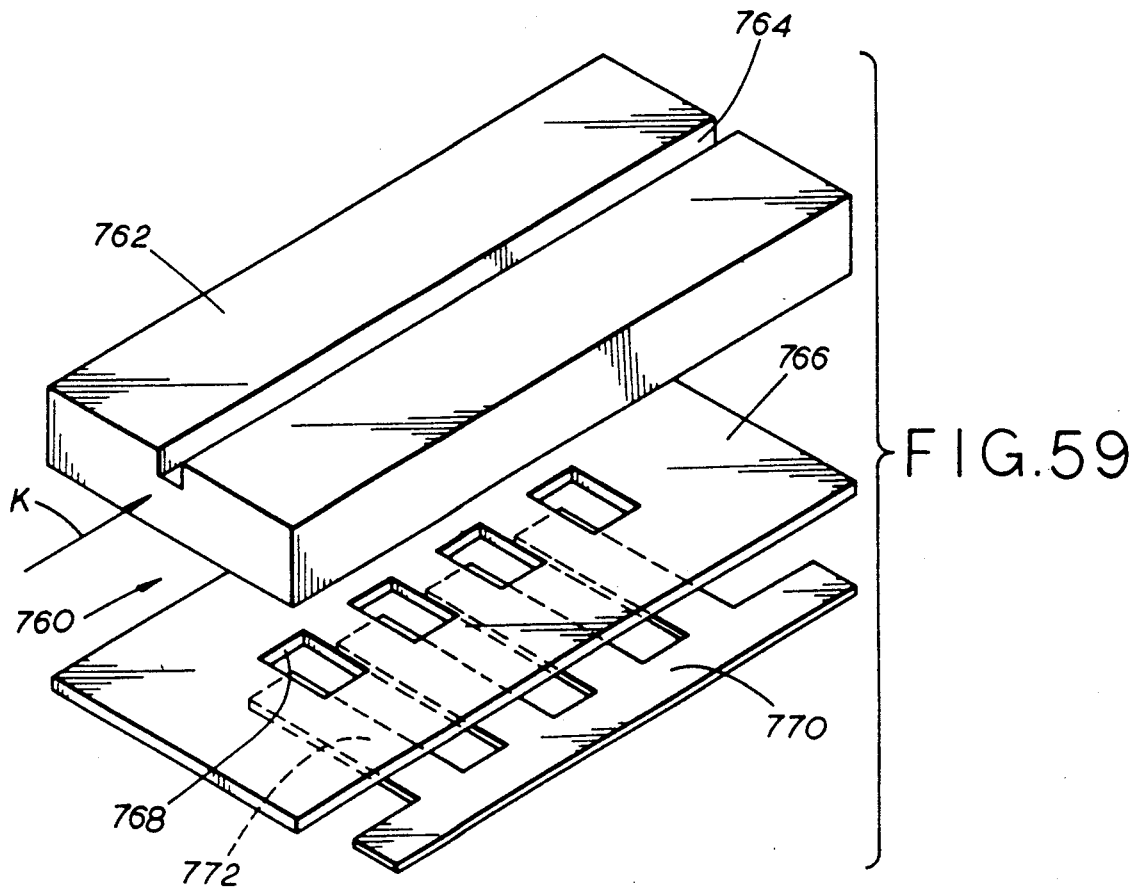
FIG. 59 is an exploded, isometric view of an RF source utilizing EV's.

FIG. 59 illustrates a general form of an RF source, or generator, shown generally at 760. A dielectric base 762 featuring an elongate guide groove 764 provides a guide structure for EV's entering the groove, as indicated by the arrow K. A counterelectrode 766, which may be positioned on the underside of the dielectric base 762, features a series of slots 768. The RF production involves a charge induced field on the counterelectrode 766. The results are intense if the counterelectrode is in slotted form. A second electrode, in the form of a collector, 770 is positioned below the counterelectrode 766, and separated therefrom by a dielectric. This latter dielectric may be space, or a layer of dielectric material (not shown). The collector 770 features a series of arms, or extensions, 772, with one such extension positioned directly below each of the counterelectrode slots 768. As EV's move along the guide channel 764, the counterelectrode slots 768 provide openings for the charge of the EV's to couple to the collector 770 wherein the RF field is produced. The RF energy can be tapped from the collector 770 by any appropriate circuit, or further radiation system.

There is a reciprocal relationship between the EV velocity along the guide channel 764 and the output cavities 768, in conjunction with the collector electrode arms 772, that determines the frequency of the radiation provided. The frequency produced is equal to the speed of the EV multiplied by the inverse of the spacing between the slots 768.

It will be appreciated that the shapes of the openings 768 in the counterelectrode 766 determine the wave forms to be produced. Aperiodic waveforms, which may be employed for driving various computer or timing functions, can be generated with the structure shown in FIG. 59 by appropriately shaping the counterelectrode openings 768.

The load on the collector electrode 770 must be proportioned according to the bandwidth of the generated waveform. For low frequencies, the output of the collector electrode 770 should be connected to a transmission line with resistive termination at its characteristic impedance. The velocity of the EV's in the guide groove 764 can be locked into synchronous motion by using RF injection or interaction as noted hereinbefore in the discussion of LC guides. Such synchronization helps regulate the periodic rate of the output pulses obtained from the collector electrode 770.

The wave form generator of FIG. 59 can be operated to provide either positive or negative polarity pulses by differentiation of the EV charge as the EV passes the slot 768 in the counterelectrode 766. A high impedance load on the output of the collector electrode 770 produces essentially negative pulses. However, a low load impedance on the counterelectrode 770 results in the production of first a negative pulse and then a positive one. This pulse form is useful for generating positive wave forms used in driving field emission devices into the emitting state, as an example of but one application of the use of EV's to generate electromagnetic energy.

25. Channel Sources

Figure 63:
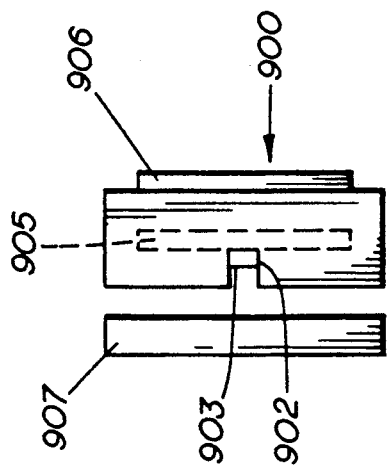
FIG. 63 is an end view of the EV generater illustrated in FIG. 62.
Figure 62:
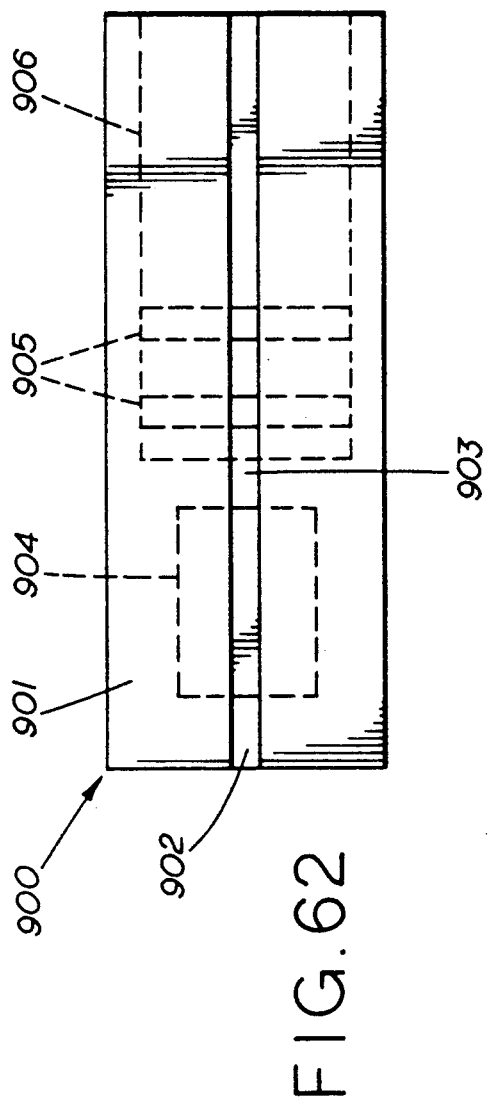
FIG. 62 is a plan view of a channel source device using electron multiplication to generate EV's.
Figure 64:
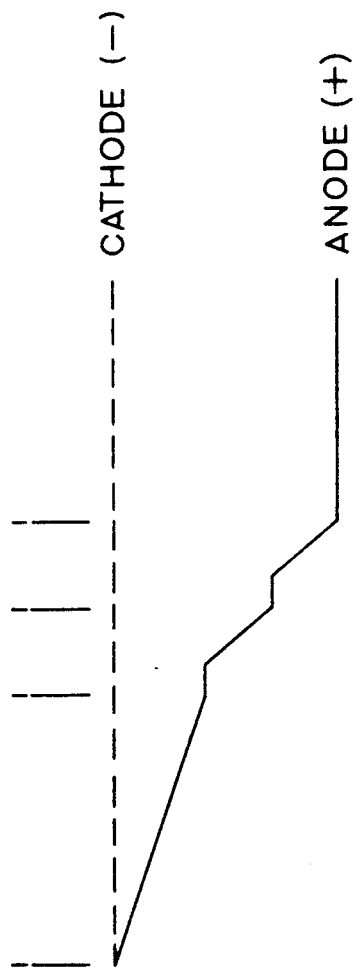
FIG. 64 is a graphic representation of the voltage gradient found in the EV generator illustrated in FIG. 62.

Referring now to FIG. 62, there is illustrated an alternative source for generating EV's, one which is sometimes referred to hereinafter as a channel source. The channel source 900 includes a ceramic base 901 having a cathode 902 in a guide channel 903. A distributed resistor 904 underlies the channel 903, the resistor having its beginning edge contiguous with the cathode 902. A plurality of dynodes 905, only two of which are illustrated, successively underlie the channel 903. A counterelectrode 906 is located further along the channel 903, but is located on the underside of the ceramic base 901. FIG. 63 illustrates an end view of the channel source 900. A ceramic cover 907, not illustrated in FIG. 62, can be used if desired. FIG. 64 illustrates a typical voltage profile for the channel source 900, going from the negative voltage on the cathode, to the progressively more positive voltages applied to the dynodes 905 and finally to the counterelectrode 906, identified in the profile as the anode. The counterelectrode 906 extends under the dynodes 905 to increase capacity.

In the operation of the channel source 900, it should be appreciated that the initial source of electrons, illustrated as a cathode 902, is conventional, and can be any known source of electrons or photons. Any useful application of the channel source preferably commences with an easily controllable process. This can be done most easily at the input of the distributed electron multiplier as only a few electrons or photons of sufficient energy are needed to get over the noise level of the device. These input events can be turned on and introduced into the input by any number of known processes. The gain of the input electron multiplier, whether distributed or discrete elements are used, should not be so high as to amplify single electron or photon events to the EV triggering threshold level; otherwise, false EV generation will occur.

Following the initial input of electrons or photons, the high gain portion of the electron multiplier, illustrated as the resistor material region 904 around the guide between the cathode and the first dynode, is charged with the task of increasing the number of electrons from the initial few to some very high number. Typically, the gain of such a multiplier channel is in the range of over one million. This value is often chosen because it is sufficient to provide adequate sensitivity so as not to over burden the input triggering system and also low enough not to produce spurious noise bursts. This gain is most often controlled by the value of the voltage applied to the input distributed dynode section of the multiplier. Geometric factors play an important part in providing the gain of the input multiplier section. Uniformity of the voltage gradient in the channel is very important to obtain, as is having an adequate secondary electron emission coefficient on the walls of the channel. Once these factors have been provided, the only function of the input section is to build up the level of electron density to near the saturation level for this type of electron multiplier whereby no further increase in electron density can occur due to the limited energy storage of the distributed elements. This limited charge density is then handed off to the second section of the electron multiplier whereby the charge density can be further increased.

The second section of electron multiplier is adapted to film technology and reduced to the size of both the EV guide following and to the distributed channel electron multiplier feeding the input.

It is the function of this channel source to raise the charge density to the critical level for forming an EV. The prime requirement for doing this is to have sufficient stored electrical energy available to the passing charge cloud to allow the charge density to increase to the EV threshold formation level. Since the charge density is sufficiently high before this threshold level is reached to present a severe space charge saturation effect, the field intensity along the multiplier guide must be adequate to overcome this space charge.

Both the need for increased field intensity and increased energy storage level operate in the same direction and dictate designs that stress the dielectric material in the high charge density region of the multiplier. In FIG. 62 the discrete dynodes 905 represent any number of dynodes required to raise the charge density to the appropriate level. In addition to the dynodes, the additional electrode 906 serves the function of increasing the capacity and energy storage of the dynodes without being connected directly to them. The dynodes 905 are thus connected to a source of positive voltage via a voltage divider (not illustrated) that produces the most desirable voltage gradient, illustrated in FIG. 64. This voltage gradient serves to pull the electrons through the channel increasing the charge and charge density as they go. To maintain this voltage gradient in the presence of the metallic dynodes it is essential that the dynodes be very narrow in the direction of electron travel. A dimension of about one channel width or 20 micrometers represents a reasonable maximum. It is not essential for the electrons to actually strike either the dynodes 905 or the counterelectrode 906. These electrodes can be covered with a thin dielectric material having a high secondary emission ratio provided the material is doped with metal to increase the conductivity. An aluminum oxide film material doped with tungsten or molybdenum is a good choice.

The initial phase of the EV generation process uses the familiar ramming phenomenon, sometimes, referred to as a Raudorf ram, having the ability to accelerate electrons from 15 KV to 15 MEV. When a sufficiently high charge density has been reached, either by direct electron emission from the solid walls of the guide and dynodes or by electron wave phenomena, EV's are formed and proceed along the multiplier section into whatever guide one chooses to use.

The foregoing description of the operation of the channel source is premised upon the discovery that an EV can be formed by raising the electron density of a region of space to the EV formation level through the use of secondary emission from nearby sources, coupled with the accompanying electron ram effect. A closed channel shape of dielectric material, for electron containment, coated with a resistance material to distribute potential and provide a field gradient for electrons, is a principal element of the channel source. It is necessary to have sufficient energy storage in the channel, preferably in the form of distributed capacity to a fixed potential electrode, to supply the peak current demanded by the EV formation process; otherwise, saturation can set in and prevent the formation of an EV. A very suitable material for the dielectric material is tungsten-doped aluminum oxide.

It should be appreciated that the channel source typically has a need to have a field alongside the channel that can be rapidly regenerated after the formation of an EV. This charge regeneration could be provided by the use of a resistor chain connected to a power supply (not illustrated). The power drain due to such resistor chain would be quite high when the resistance value is low enough to form an EV, thus creating a severe heat buildup in the source. This would dictate the use of a satisfactory refractory material, such as the tungsten-doped aluminum oxide. However, by using fixed potentials to the lumped dynodes (instead of the resistor chain), the heat problem is further alleviated.

If preferred, a gas can be used in the channel source, thus increasing the efficiency of electron generation and to aid in removing the charge from the walls of the channel. Moreover, by using gas, a high value of channel resistance can be used.

26. Circulators and Wigglers

Referring now to FIG. 65, there is illustrated an LC guide structure 950 bent in a circle to depict a circulator for EV's. The EV's are injected into the closed loop circulator 950 through the feed and exit line 952. Coupled to the feed and exit line 952 are a pair of switch points 954 and 956, both of which are electrodes. The switch points 954 and 956 are nothing more than isolated parts of the LC guides herein described, with the isolation being obtained through the use of inductive or resistive elements. By applying appropriate voltages from the power supply 958 through the conductors 960 and 962 to the switch points 954 and 956, respectively, the injected EV is deflected 90° into the circulator path. In a similar manner, for extraction, appropriate voltages are applied to the circulating EV, causing it to again be deflected 90° and thus be once again in the feed and exit line 952. FIG. 66, a cross-sectional view of the circulator 950 taken along the lines 66—66 of FIG. 65, illustrates the LC guide structure in greater detail. The LC guide structure includes a ceramic substrate 970 and a lower RF shield 972, as well as an upper RF shield 974. A circulating EV 976 is illustrated as being centered within the interior of the LC guide, surrounded by a center guide electrode 978, as well as an upper guide electrode 980 and a lower guide electrode 982.

In the operation of the circulator illustrated in FIGS. 65 and 66, it should be appreciated that the photon generation and subsequent radiation produced by this method springs from the fact that a charge under acceleration radiates energy. The frequency of radiation is determined by the acceleration of the charge while the intensity varies with a large number of factors related to the geometry of the radiation source and number of charges involved. Thus a radiation source can be produced by a slowly moving charge in a small radius or a fast moving charge in a large radius. The time for completing one full circle defines the frequency of radiation. Furthermore, the radiation pattern from a circulating charge is equivalent to two lines of charges oscillating in a sinusoidal manner with a phase angle of 90 degrees to each other.

As is described with respect to FIG. 66, there is illustrated a lower RF shield 972 and an upper RF shield 974. As long as both shields 972 and 974 are used, the circulator 950 represents a storage mechanism for either energy or information. The principal difference between the radiation of energy from circulation and the storage of energy by circulation is in whether or not the circulation unit is effectively shielded at the radiation frequency. Without shielding there is radiation and a possibility of using it in some beneficial way. With shielding there is no radiation external to the circulator and the same device exchanges radiation between the shield and the generator to produce storage of energy. The efficiency of storage is a direct function of the shielding efficiency.

Thus, by proper shielding, the radiation resulting from the circulating EV is maintained within the confines of the circulator. By removing the shield 974, either totally or through the use of windows in the shield 974, the RF energy is radiated out from the circulator 950.

Although the embodiment of FIG. 65 contemplates the radiation coming "out of the paper", those skilled in the art will recognize that by use of appropriate windows, the radiation can be beamed towards the center point of the circulator, or alternatively, beamed outwardly, i.e., in the same plane as the paper away from the center point of the circulator.

In addition to fundamental frequency radiators, there is a class of harmonic radiators that depend upon circulation of the charge at a lower speed and having this charge excite a periodic structure that in turn is coupled to space for radiation at the frequency of the periodic array. The method of radiation resulting from the embodiment illustrated in FIG. 65 is of this latter kind. By simply exposing the upper guide slots 955 of the LC guide to the region of space to receive the radiation, the output function is accomplished. For ease of illustration, there are eighteen such output slots 955 in FIG. 65, although the number can be any number desired. The slots 955 are in the upper guide electrode 980, illustrated in FIG. 66. Through the use of eighteen slots, the 18th harmonic frequency of radiation is produced. If there were seventy-two slots 955, the 72nd harmonic frequency would be produced. If there are no such slots, the harmonic number is reduced to the fundamental of one circulation per cycle of radiation.

Assuming it to be desirable to circulate the EV's within the circulator 950 at a precise rate, to thus maintain an assigned frequency, a velocity synchronization system can be used, coupled with the guiding action of the LC guide. With such a synchronization, the mean velocity of an EV chain is locked into the frequency in the LC guide, such that the spacing of the individual EV's is forced to fall into synchronization with the slot period of the guide. This effect is caused by the periodic field produced in the guide, and the ability of this field to bunch the EV train into that field by accelerating the slow EV's and retarding the fast EV's. By so doing, a plurality of such circulators can be accurately phase locked to a master source of stable radiation energy. By properly adjusting the phasing of an array of circulating radiators, the radiation is easily shaped into tight patterns, steerable electrically over a wide angle from a simple flat plate containing such an array, all as is commonly known in the field of phased array antennas.

Figure 67:
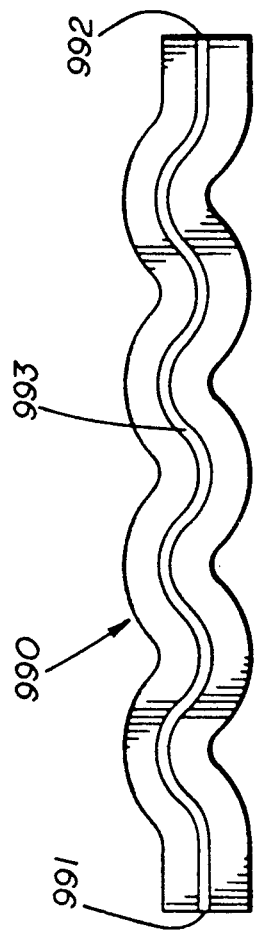
FIG. 67 is a plan view of an EV wiggler device.

Referring now to FIG. 67, there is illustrated an alternative embodiment of an RF generator 990. For purposes of illustration, the generator 990 is an RC guide, elsewhere described herein, and having a guide channel 993 having a dielectric base which is formed in a pattern of one-half circles. In addition to the one-half circles, other non-linear walls can be used to cause the EV to accelerate. When an EV is introduced at the entrance 991, and caused to pass through the RC guide at a constant velocity, then the radiation from this motion has a frequency of one period of the "wiggle" caused by the turning of the guide. The predetermined number of oscillations or wiggles in the RF generator 990, spaced between the entry 991 and exit 992, determines the length of the pulse of radiation emitted. There is a motion of the effective radiation source, and those skilled in the art will recognize the need to factor in this phase motion in calculating the far-field radiation pattern of such a device. Instead of using an RC guide to build such a device, LC guides can also be used, but are slightly more complex to manufacture.

By employing any number of a wide variety of patterns with a constant velocity EV it is possible to perform many frequency chirping or frequency modulation effects. The harmonic content of the emission can be controlled with the pattern shape. The amplitude of the emitted radiation can be varied from one region to another by varying the coupling coefficient from the guide to the radiation space, by changing the amount of charge in the wiggler guide or by changing the amplitude of the wiggler pattern and then making a corresponding change in the EV velocity to keep the period the same. Various length pulses can be made by progressively switching the EV from a long path length to shorter paths by using the deflection switch technique elsewhere described herein. It should also be clear that the emission pattern of the wiggler type of radiator can be very effectively controlled by both shape of the pattern and phasing of the EV's to dynamically produce both pattern shape variations and beam scanning. Those skilled in the art of phased array antennas are, of course, familiar with the resulting radiation patterns.

The circulators and the "wiggle" type of radiators hereinabove described, fabricated using thin film technology, are directly applicable to a wide range of collision avoidance and communications applications where the generator array is directly exposed to the environment being radiated. For example, by using EV circulators having a path length of one wavelength, and when desired to have a frequency of 3 GHz (a wavelength of 10 cm), this entails the use of a circulator having a physical dimension of 3 cm for light velocity circulation or 4.3 cm for 1/10 light velocity EV's. These radiators, being about 0.12 inches in diameter, can be coupled to synchronizers to stabilize the frequency of radiation, and can be placed in an array of thousands laid out on a plane substrate of only a few inches on a side. The directional pattern of the array, and consequently the direction the beam is steered, can be determined by the phasing of the radiators. For a pulse system, they have to be turned on at different times as well as phase controlled. This is a complex switching pattern for thousands of sources, but it is within the ability of an EV switching system to do this. Switching can be accomplished on a separate substrate with capacity coupling between the two plates being used for connection.

27. Flat Panel Display

Figure 68:
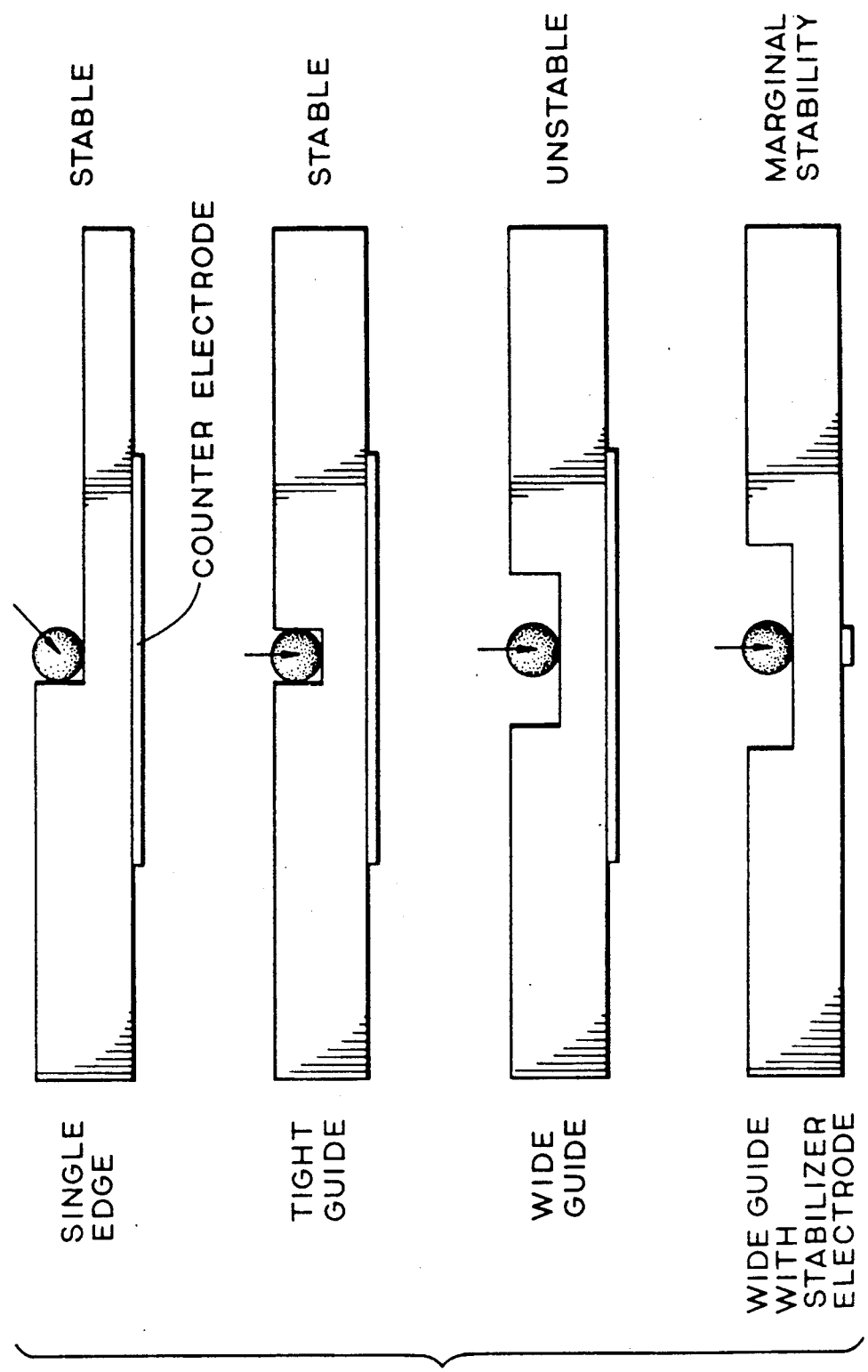
FIG. 68 is a series of force diagrams relating to the use of EV's in various guide structures.

Referring now to FIGS. 68–81, there is illustrated a flat panel display and various components used in such a display, wherein each of such components involves either the generation, guidance or manipulation of EV's. Basic to the construction of such a flat panel display is the deflection switch involved in FIG. 68, wherein the force diagram shows various states of stability for an EV on surfaces and in grooves or guides. The single edge with a counterelectrode is very stable and generally the EV cannot be detached from such a corner. This is even more true for the case of an EV in a tight guide. A wide guide with a counterelectrode presents an unstable case for the EV when it is initially in the center of the guide. The case of interest for the deflection switch operation is illustrated in the last line of FIG. 68 as being marginally stable with the narrow counterelectrode shown. In practice, the counterelectrode is tapered to a point as the electrode enters the wide region of the guide, as is shown schematically in FIG. 69.

Figure 69:
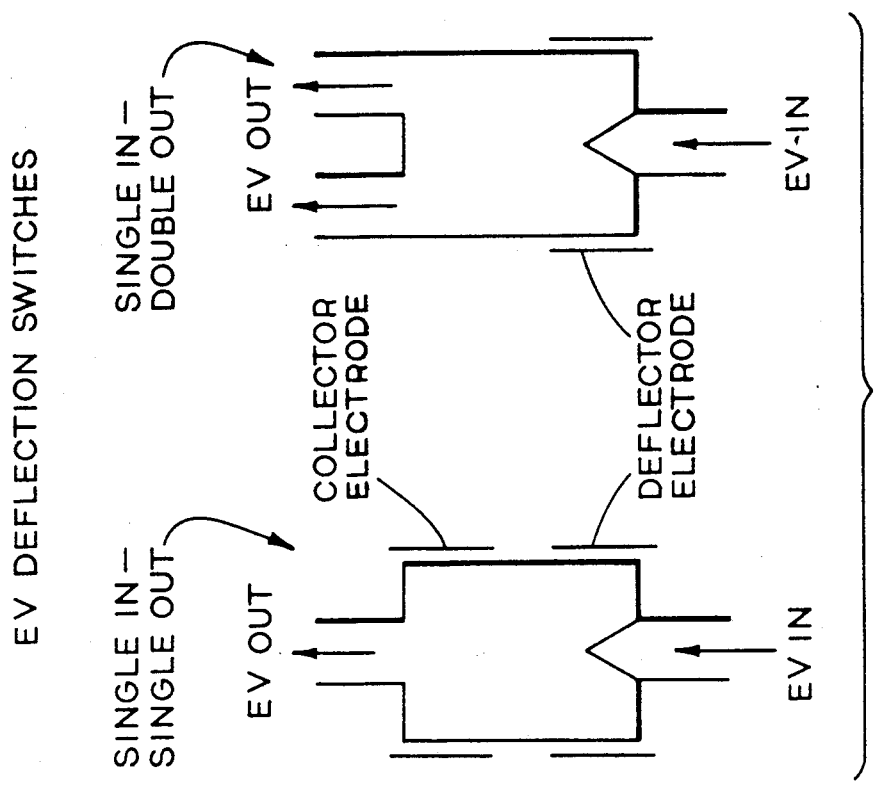
FIG. 69 illustrates, schematically, a pair of EV deflection switches.

FIG. 69 shows two different configurations for deflection switches. Although deflection switches are discussed herein before with respect to FIGS. 36–38, it seems appropriate to again discuss deflection switches in a more generalized manner. The view on the left is designed to have electrical output while the view on the right shows a single input and a double output for the EV path. No electrical signal output is shown, although this is also possible. The output would only be a sharp pulse as the EV passed if the coupling was for ac only. By moving the electrodes into the direct line of contact with electrons emitted by the EV, the output can be made to have a dc component and the charge can remain on the electrode until dispelled by leakage or another load.

In both of the configurations shown in FIG. 69, the sensitivity of the switch, or the gain, is determined by the balance of the system to all forces that effect the passing EV. A careful balance can produce a high gain device. By purposely offsetting any parameter of the deflection switch that tends to guide the EV to one output or the other, a bias is established that must be overcome by the input deflection electrodes.

Referring now to FIG. 70, an EV guide is shown opening into a wider region that is bounded on the sides by deflection electrodes 1001 and 1002 and has a symbolized, tapered counterelectrode 1003 under the entry guide. This is the same as the deflection switch described earlier. The main difference in this device is the use of photoconductors 1004, 1005, 1006 and 1007 on opposite sides of the wide channel and a cross coupling between the photoconductors and the deflectors. A power supply connection is shown attached to the photoconductors for supplying potential to the electrodes when the photoconductor is activated by EV passage. It is obvious that the EV must be in an optically excited state or the guide wall material must fluoresce with EV passage to accomplish the desired result. A wide variety of photoconductors may be used here, but diamond films are particularly desirable due to their sensitivity to UV emission and insensitivity to thermal emissions. There is also a dividing barrier 1008 shown between the two halves of the wide portion of the component, whereby the EV traversing the channel from one end to the other will go on one side or the other of the barrier.

With the configuration shown, there is a field set up across the deflectors connected to the photoconductors whenever an EV is deflected to one channel or the other by application of voltage to the input deflection electrodes. This effect is provided by the activation of the photoconductors when the EV is in the guide channel and the conduction process connects the deflectors to the power supply momentarily. Photoconductors are known to turn on within picoseconds of the applied radiation in devices called Auston switches and they show low impedance. Upon passage of the EV the photoconductor returns more slowly to the quiescent, high resistance state. Memory of the event is stored simply as a charge on the dielectric material. Refreshing is provided by passing an EV through the structure often enough to make up for lost charge. Normally, updating by a very low EV firing rate can be used to refresh storage.

There is an interesting ancillary function available using this photoconductive technique. The memory state of a particular cell in the display array can be accessed from outside the display by optical illumination of the cell. If this effect is used in conjunction with a light producing display unit, there is an implied feedback from the phosphor light source and the gain of the process cannot be carried to high levels without danger of instability. Nevertheless, this is a potentially useful function for altering a stored state on a display. The principal means for increased stability would be by using a violet light for the light gun doing the data modification and a photoconductor sensitive to violet wavelengths.

By changing the connections between the photoconductors and the deflectors in another cell, it is possible to repeat information from one cell of the switch to another. If the potentials applied to the input cell are such as to deflect the EV to the left hand path, then the left hand path is also taken in the second cell. By cascading two such cells it is clear that whatever information is available at the input cell when the EV goes by is conveyed to the second cell, either forward or backward with respect to the direction of EV travel.

Referring now to FIG. 71, there is illustrated, schematically, a diode activated storage device. The description of this device is very similar to the description of the photo activated storage device. This device is also based upon photon activation, but the process used can accommodate a much wider range of radiation wavelengths, especially on the low frequency end of the spectrum, than can a photoconductor. The device discussed here is based upon obtaining the required potentials for the deflectors from the wideband disturbance the EV produces upon entering the guide region near the pickup electrodes.

For this embodiment, the photoconductors have been replaced with field emission diodes 1010, 1011, 1012 and 1013, although any rectifiers can be used provided they have good high frequency response, an effective operating bias voltage and adequate inverse voltage. An operating voltage in the range of 50 volts is required. Field emission rectifiers are known to operate into the optical wavelength band with good efficiency. They operate well at 50 volts and they compliment the construction technology used in the fabrication of EV structures in general. As in conventional circuit diagrams, the field emitter cathode is shown as a pointed electrode and this signifies that it is the electrode that will be positive when all alternating current or RF field is impressed upon the electrodes. Field emitters also have a threshold voltage that must be attained before they emit electrons. In this case, the external potentials that had been used in the photo activated deflector can be removed unless they are desirable as bias potentials. In any event, the diode electrodes shown in the drawing must be operated at RF ground.

All other functions of this configuration are the same as the photo activated storage device described earlier. If an EV enters the left hand path, the surge or disturbance creates a momentary alternating potential that is changed into a dc potential on the deflector electrodes and remains there until leakage or an unwanted disturbance removes it. In all designs care must be taken to prevent excessive EV noise in the deflection region; otherwise, this noise signal can be fed into the diodes and produce a false state of storage.

Referring now to FIG. 72, there is illustrated a charge activated storage device. As in the other switches the EV enters the narrow guide and is conducted into the expanded portion of the guide over the tapered counterelectrode. The deflector electrode 1015 is shown as both input and output for this storage device. Of course another deflection electrode can be added to insert an input or it's compliment into the device. As in the other configurations, the storage is accomplished by using charge storage on the deflection electrode 1015 and associated collector electrode 1016.

Operation of this storage device depends upon the electron emission from the EV itself or from nearby structures that are excited by the passage of the EV. The simple collection of electrons will not produce all of the effects needed, however. It is most beneficial to have a process that produces a positive going voltage on an electrode when an electron arrives at the electrode. Secondary electron emission is such a process and many devices have been devised in the past using the effect and they are well known in the literature. The efficiency of the secondary electron production is low, rarely being above 2%, but even with this low efficiency the process is useful. A requirement for the process to work is that there be an electrode 1017 near the switching electrode that remains positive relative to the switching electrode in order to collect the secondary electrons. In addition, this electrode 1017 should be somewhat shielded from the primary electrons. In our case this collector electrode 1017 can be located on a portion of the cover plate. This electrode 1017 is shown schematically in the drawing with a + sign beside it signifying a connection to a positive power supply. A current limiting effect, such as inductance, should be provided in this power supply line to prevent excessive current being drawn when an EV passes close to it.

In operation, this type of device depends upon the fact that an EV passing over an electrode will suppress most emitted electrons with the negative space charge field, thus allowing the electrode to charge negative. In the drawing, when an EV passes down the left side of the switch and passes over the collector electrode 1016, both the collector and the deflector connected to it are charged negatively. In the opposite case when the EV passes down the right side of the switch the emitted electrons strike the collector from a greater distance and velocity, allowing secondary emission to occur and emit electrons that are collected by the positive electrode 1017 and thus charge the collector 1016 and deflector 1015 positive. The storage and propagation of information is the same as in the previous cases.

Referring now to FIG. 73, there is illustrated a pair of switching devices 1020 and 1021, which allow the output on a storage device to be involved in an EV pathway change. The device 1020 is similar to the device illustrated in FIG. 72, but having two outputs, 1022 and 1023, separated by the barrier 1024. The outputs can also be taken from the electrodes. This device also contains an additional input deflector anode 1025, if needed.

The device 1021 involves a configuration that is amenable to counting by two. The device 1021 includes a deflection anode 1026 and another anode 1027 which functions both as a deflection anode and a collector anode. With each successive passage of an EV, the state of the electrodes change and the output paths, as well as the potential, are alternated between the two available states.

Referring now to FIG. 74, there is illustrated a storage device 1030 which sets the state of storage with the passage of an EV. The device is basically a charge activated storage device with three inputs and two outputs. When an EV is directed into either of the two outboard inputs 1031 or 1032, it then proceeds down that side of the device and sets whatever potential on the collector and deflector that is appropriate. Testing or sampling of the previously stored state can be done by directing an EV into the center channel 1033. Regeneration of the stored state is also accomplished by interrogating the state of storage.

A very useful function for storage devices in a flat panel display is to employ them in a stepping register configuration. Such a configuration is shown in FIG. 75 using charge activated devices, although any of the storage devices herein described would do the job just as well.

The most noticeable feature of this device is that the information flow is directed in the opposite direction to the EV travel by means of back coupling the collector of one stage to the deflector on another stage of storage. Outputs are shown going to gates that will be used in the flat panel display device, although such outputs are useful for a wide range of electronic functions. Data input to such a line of stepping registers is applied to the deflector 1040 of the first cell in the line or at the opposite end from where the EV is injected. Whenever an EV is injected into the system, the data stored is stepped to the right one cell with each successive passage.

Figure 76:
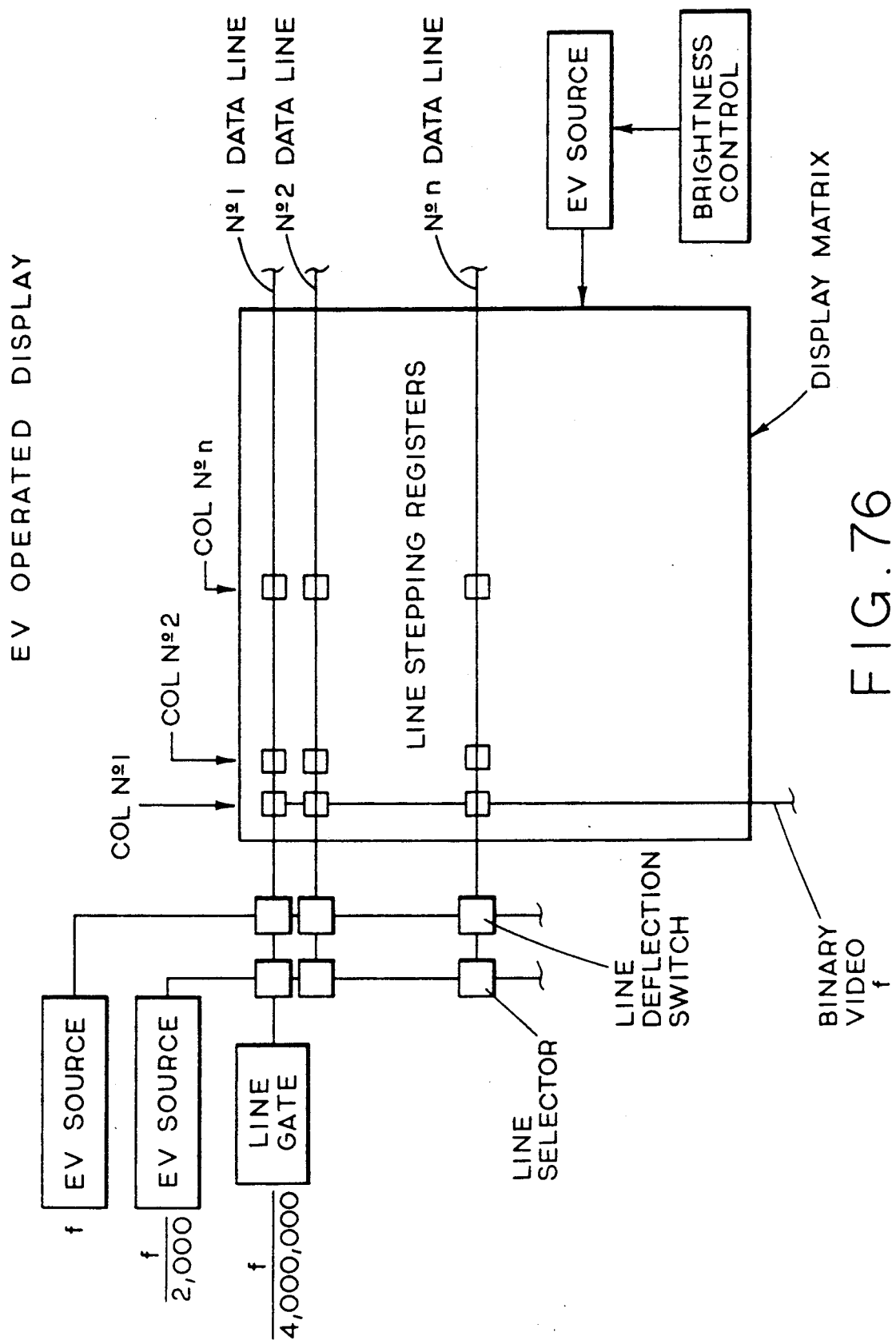
FIG. 76 is a block diagram of an EV operated flat panel display.

Referring now to FIG. 76, there is illustrated a block diagram of a flat panel display which makes use of the devices illustrated in FIGS. 68-75. Before describing the circuitry of FIG. 76 in detail, it should be appreciated that the following Tables 1-4 are included to better understand the operation of the system.

TABLE 1
PHYSICAL PARAMETERS

SIZE OF DISPLAY SCREEN. = 400 mm × 400 mm (16" × 16")
NUMBER OF ACTIVE LINES AND COLUMNS. 2,000 × 2,000
NUMBER OF PIXELS. 4,000,000
MAXIMUM PIXEL SIZE. 0.2 mm × 0.2 mm (200 micrometers sq.)
ENVELOPE IS EDGE SEALED GLASS SUPPORTED INTERNALLY BY LAYERS OF ACTIVE EV COMPONENTS FABRICATED ON REGISTERED THIN METAL SHEETS.
THICKNESS OF DISPLAY IS DETERMINED BY PHYSICAL STRENGTH REQUIREMENTS OF BETWEEN 1 AND 3 mm.
DIMENSIONAL STABILITY AND DISTORTION OF IMAGE IS LIMITED ONLY BY THERMAL PROPERTIES OF GLASS PLATE.
NUMBER OF LEAD WIRE INTO VACUUM ENVELOPE EQUALS 6 MINIMUM TO 30 MAXIMUM, DEPENDING UPON HOW MUCH OF THE SYNCHRONIZATION CIRCUITRY IS DONE WITHIN THE ENVELOPE.

TABLE 2
SYSTEM PARAMETERS

TRICOLOR SYSTEM USING PHOSPHORS FOR FULL COLOR RANGE.
SEVEN BINARY LEVELS FOR SETTING OF EACH COLOR INTENSITY. (CONTRAST RATIO RANGE = 127)
TOTAL PICTURE MEMORY ON SCREEN = 4,000,000 × 7 × 3 = 84 MEGA BITS = 10.5 MEGA BYTES.
VIDEO BANDWIDTH UP TO 100 $MH_z$.
FRAME RATE FROM 0 TO 1 $KH_z$. (NOMINALLY 10 $H_z$)
BRIGHTNESS FLICKER EFFECTS ESSENTIALLY ZERO DUE TO INTERNAL STORAGE.

TABLE 3
PHOSPHOR SCREEN PARAMETERS

BRIGHTNESS CONTROL FROM ZERO TO FULL PHOSPHOR SATURATION BY USING PULSE RATE CONTROL OF EV ELECTRON SOURCE. (0 TO 10,000 fL)
MEAN PHOSPHOR CURRENT AT 100% DUTY FACTOR = 200 MICROAMPERES
PHOSPHOR ACCELERATING VOLTAGE = 10 kv.
POWER TO PHOSPHOR SCREEN = 2 WATTS.
ELECTRONIC CHARGES REQUIRED PER LINE = 2 × $10^{-4}$/1.6 × $10^{-19}$ = 1.25 × $10^{15}$ chg./s/2,000 LINES = 6.3 × $10^{11}$ chg./s/LINE.
ELECTRONIC CHARGES REQUIRED PER PIXEL = 6.3 × $10^{11}$/2,000 = 3.2 × $10^8$.
MEASURED CHARGES FROM A SINGLE EV PULSE AT A DISTANCE OF 7 mm INTO A 0.05 mm DIAMETER HOLE = $10^7$.
CALCULATED CHARGES INTO DISPLAY PIXEL AT 0.7 mm DISTANCE = $10^9$ FOR A SINGLE EV PULSE.

TABLE 4
STORAGE ELEMENT PARAMETERS

CAPACITY OF STORAGE ELEMENT = $10^{15}$ F.
CHARGE AND VOLTAGE ON STORAGE ELEMENT = 6 × $15^5$ ELECTRONS FOR 100 VOLTS.
CURRENT FLOW UPON SWITCHNG ALL STORAGE ELEMENTS (84 Mbits) AT 10 $H_z$ RATE = 8.4 × $10^7$ × 6 × $10^5$ × 10 × 1.6 × $19^{-19}$ = 8 × $10^{-5}$ AMPERS.
POWER CONSUMED IN SWITCHING = 100 VOLTS × 8 × $10^{-5}$ AMPERES = 8 × $10^{-3}$ WATTS.
ELECTRONIC CHARGES REQUIRED PER LINE = 6 × $10^5$ × 2,000 PIXELS = 1.2 × $10^9$
EV TRANSIT TIME PER LINE FOR 500 VOLT VELOCITY. (1.3 × $10^9$ cm/s or 0.04 c) = 31 NANOSECONDS.
EV TRANSIT TIME PER PIXEL = 16 PICOSECONDS.

Referring again to FIG. 76, it should be appreciated that this circuit shows only one layer of the seven layer system. Appropriate binary video is fed into the system and an external synchronization system does the counting necessary to feed the various EV sources and line gate. Such counting can be done within the display device although this specializes it for a particular information format. External control of data allows a much wider variety of information formats to be used. The data is shown progressing from left to right on a line and each line is shown feeding from top to bottom.

The brightness control used in this system varies the frequency of firing of the main EV lines that are used to generate electrons for the phosphor screen. Any conceivable configuration of these sources can be used from one EV source per line to one source for the entire system switched by appropriate deflection switches as is shown in FIG. 79, covering line selection technique. The individual gates on each line are responsible for pixel information content at whatever level of grey or color is appropriate.

Figure 77:
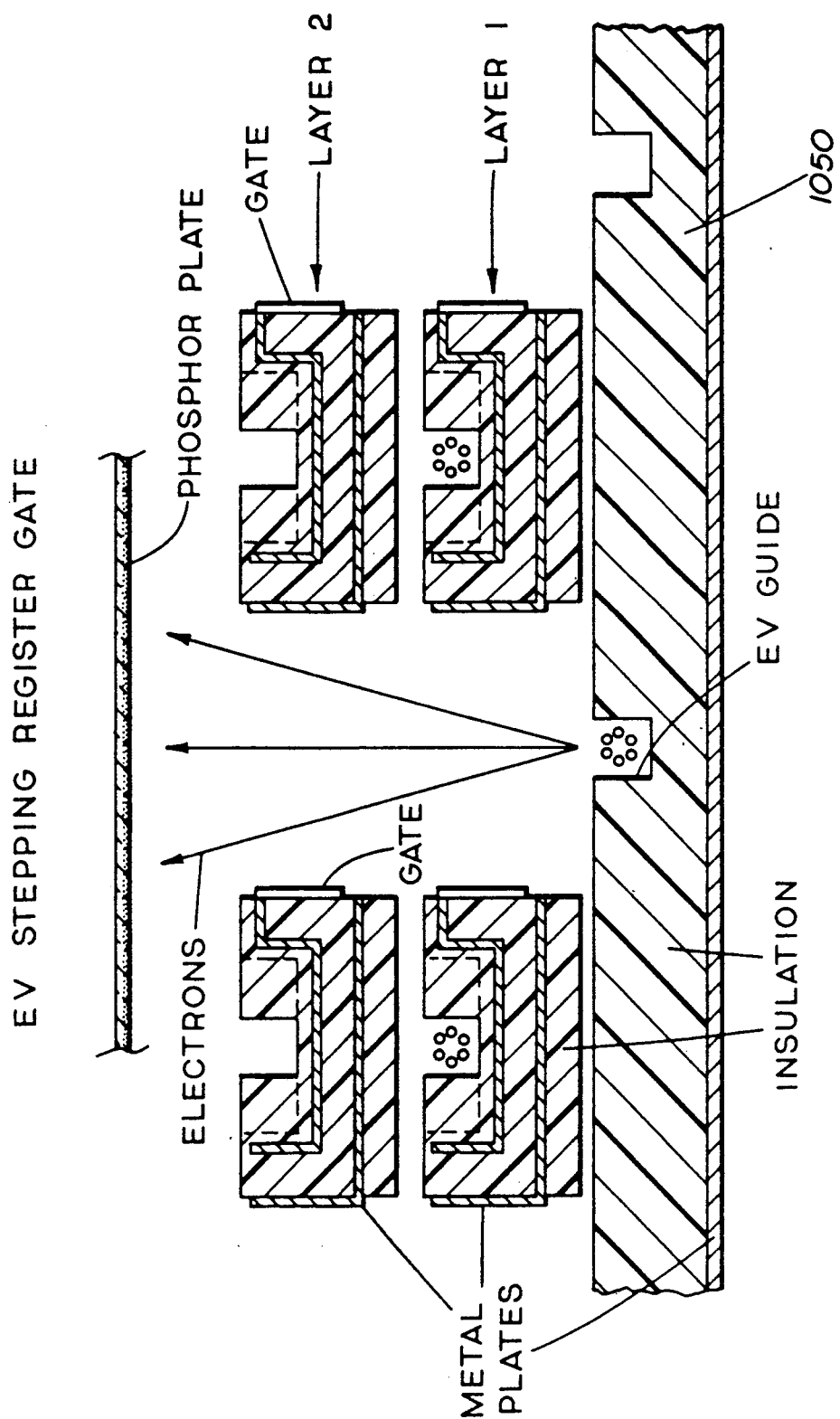
FIG. 77 is an elevated view, in cross-section of an EV stepping register gate.

FIG. 77 shows an end view of one of the data lines. The open channel EV guide that serves as the electron source to stimulate the phosphor is shown on the lower plate 1050. There are seven separate metal plates above this level, each carrying stepping registers that treat the appropriate contrast level for one of the desired primary colors. It is intended that these metal plates with their associated dielectric materials be assembled in a stack that is aligned with each other. Only two of these plates are shown and they are not to scale. The gating action is controlled in much the same fashion as is the conventional grid modulation of a single spot cathode ray tube.

Figure 78:
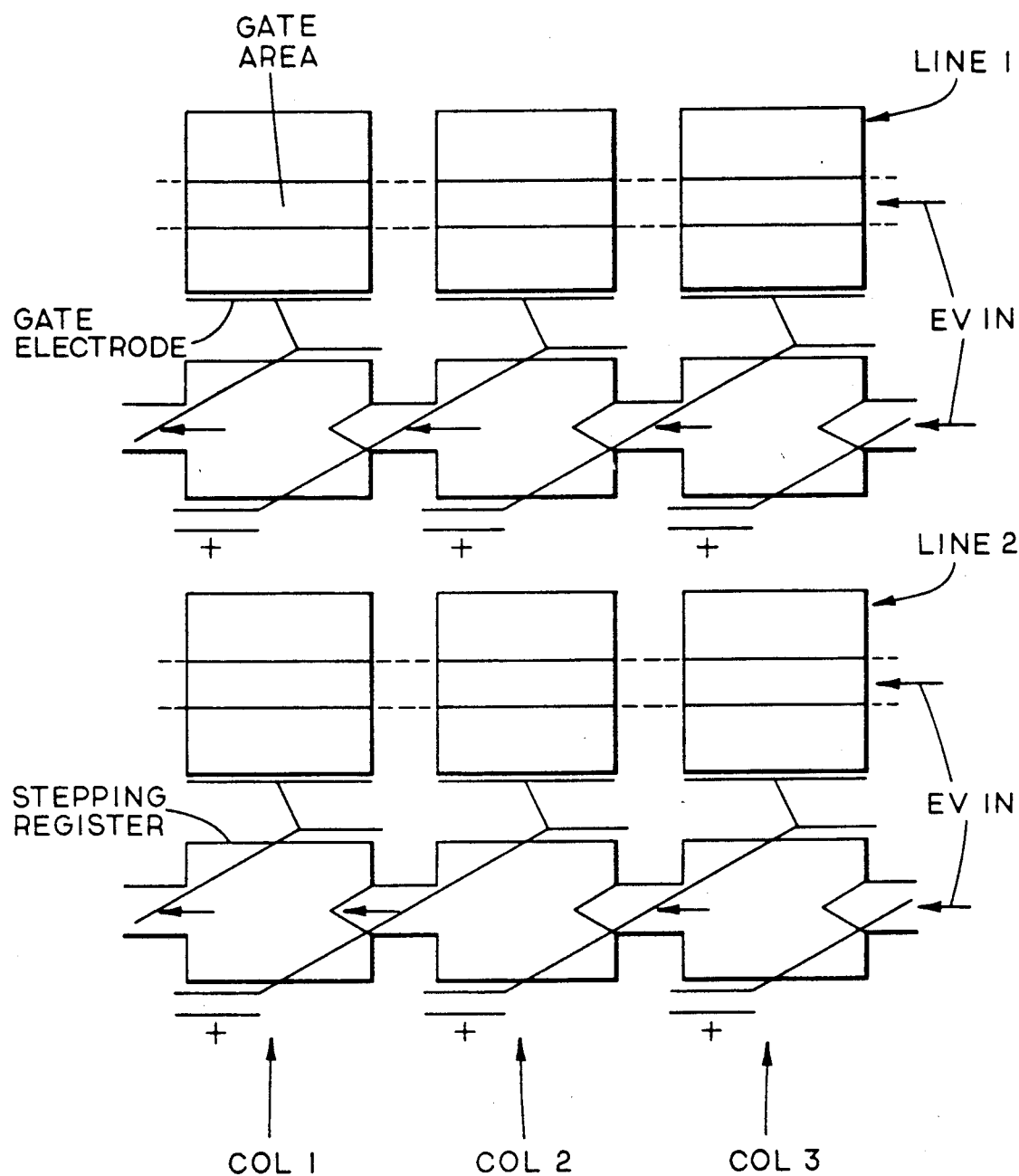
FIG. 78 is a block diagram, schematic view, of a section of gates, showing the line of stepping registers that control the gates.

FIG. 78 is a top view of a section of gates showing the line of stepping registers that control the gates. An EV run is shown under the gate region as well as traversing the stepping register region.

FIG. 79 shows the layout of the line selector that is responsible for selecting and feeding EVs into the appropriate line of stepping registers. Biased deflection switches are shown and this is simply a switch that is geometrically proportioned to send an EV straight forward unless a voltage is applied to the switch input from the line selector stepping register. The appropriate frequencies for driving the various functions are shown and the waveform is a simple pulse with a width of the basic binary video pulse.

28. LRC Guides

Referring now to FIGS. 80, 81 and 82, there is illustrated an LRC guide device 1060 which can be used with the flat panel display, but is not concerned directly with logic, and can be used in many other applications in which it is desired to guide an EV. This device involves an effect that is similar to an LRC circuit available in what is otherwise a simple RC guide. This addition greatly improves the recharge time constant of the RC guide without necessitating doping of the dielectric material. Stray charge is removed by using a thin metallic coating 1062 directly on the walls of the guide 1064. This charge is conveyed to the end of the guide by the high inductance path of the slender guide configuration, thus preventing excessive charge drain upon the EV. Termination of the conductive material at the end of the guide must also be done in an inductive fashion with appropriate damping by a resistive component. This resistive component is most conveniently done by making a thin film of conductor on the guide. The thickness of coating 1062 would optimally be in the range of 200 to 500 angstroms where good optical reflectance is obtained for the EV, but where the resistance along the channel is moderately high. Aluminum and molybdenum are good classes of material for coating the guide. This technique requires the coating of the cover plate above an EV guide for most applications, but can be eliminated for applications requiring guides with an open top for free electron emission. In the drawing the guide is shown going off the end of the plate but the charge collected on the guide walls is shown going to some ground path via a high inductance lead or film of conductive material. The dimensions for the guide are somewhat inconsequential, because the effect of LRC charge removal scales to all size guides.

29. Analogue to Digital Encoder

Figure 83:
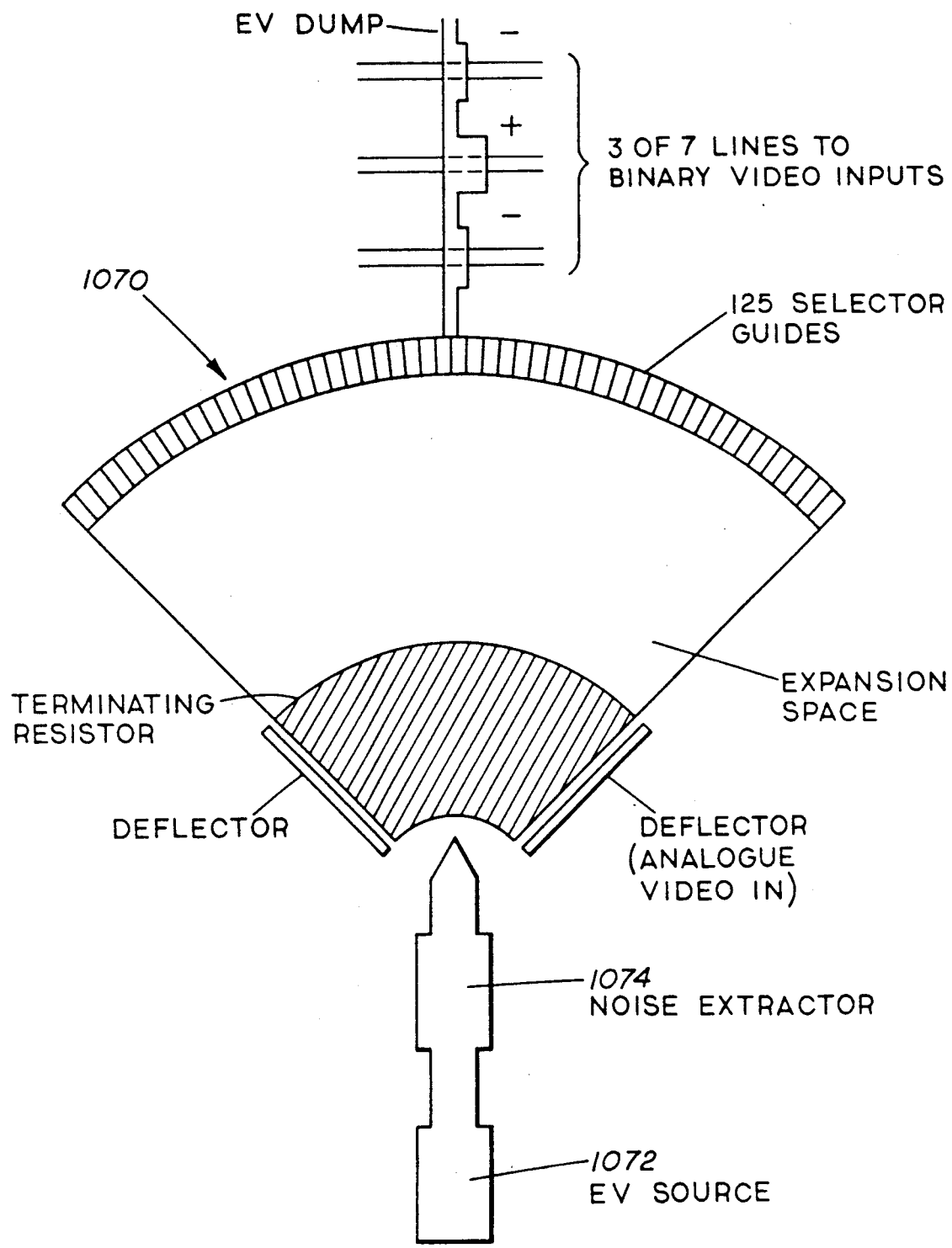
FIG. 83 is a plan view, in schematic, of an analogue to digital encoder for use in displays operated by EV's.

In regard to FIG. 76, there was an indication of a need for binary video data to drive the stepping registers, although in discussing that circuitry, there was no means described to derive this data from the wideband analogue video that is needed for a high resolution display system. Moreover, with regard to FIG. 76, it was suggested that this conversion be done external to the display device proper. It may be more appropriate to do the job internally. Accordingly, the following description of FIG. 83 is presented for using EV technology to do the job.

The overall action of the analogue to digital encoder 1070 is to take whatever analogue voltage that appears on the deflection plates, within their design limits, and change this to an output code that satisfies the binary data requirements of the stepping registers. This is a form of look up table operation or ROM. Due to the small size of the device, typically 3 mm overall for use with the largest guides known to be useful in information processing, the operating band width can be high. It is expected that operation can be secured at several hundred megahertz. In the display device example under discussion, the firing frequency of the EV source would be expected to satisfy the Nyquist sampling criterion of 2.1 times the highest frequency in the analogue video information.

An EV source 1072 is shown schematically, preferably a field emission source to accommodate the high pulse repetition rate, followed by a noise extractor 1074 to assure the quietest EV and therefore one that is most accurately deflected in the following deflection fields. In the simplest case a noise extractor is just a good guide that gives the EV time to rearrange itself before being emitted into an interaction space. In the extreme case, the extractor must be designed to absorb radiation in a particularly active band of frequencies that are known to exist. This absorption technique is a common practice with low noise electron beam work. The end result desired is easily shown by observing the response of the EV to deflection fields by watching the deflection region with an electron camera. In this regard, the launching portion of the encoder is performing the function of a picoscope.

The exit of the noise extractor guide 1074 is terminated with a tapered counterelectrode on a flat plane. Every precaution, such as tapering the exit of the guide, must be taken to prevent electric field surges from occurring in this region; otherwise, they will induce erratic motion on the EV path. A terminating resistor for the transmission line driving the deflection plates is shown in the drawing. The resistance of this material must not be too low or otherwise the EV will destroy itself on the resistor. Following the deflector a region called expansion space is shown. This is just a region that is put in to allow a larger physical entry for the selector guides that follow. The expansion space must have a charge dispelling coating applied to it, and it is best to gradually taper the resistance, measured in ohms per square, from the low value in the region of the deflectors to a higher value in the region of the expansion space.

As many selector guides are required as is dictated by the complexity of the encoding being done, although there will be limits set by the effective "noise" or unpredictability of the deflection system and EV path. Once the EV has entered the selector guide, it is conducted to a region that is responsible for setting the potential on the lines feeding binary video data to the stepping registers. For convenience in the drawing, only one guide is shown connected to these lines. This line shows two different size bumps that symbolize the effect sought here. It is necessary to set the potential of these output lines to either a 1 or a 0 state as defined by the voltage on them. These are permanently assigned effects, and every time an EV goes through any one particular guide, the same voltage is set on the line. The setting is similar to the one discussed herein with respect to FIG. 72. Basically, to set a negative voltage the EV is simply run over the lead wire. To set a positive voltage, secondary electron emission is invoked.

Although a wire is shown in the sketch, it is also possible to use EV guides for the function of conveying information to the binary video inputs if a path for doing this is available. In such a case a device similar to that illustrated in FIG. 74 would be used at the junction between the selector guides and the binary video guide. If a path is not available due to having the stepping registers located on separate substrates or layers, wire are the obvious choice.

30. Crossed Guides

Figure 84:
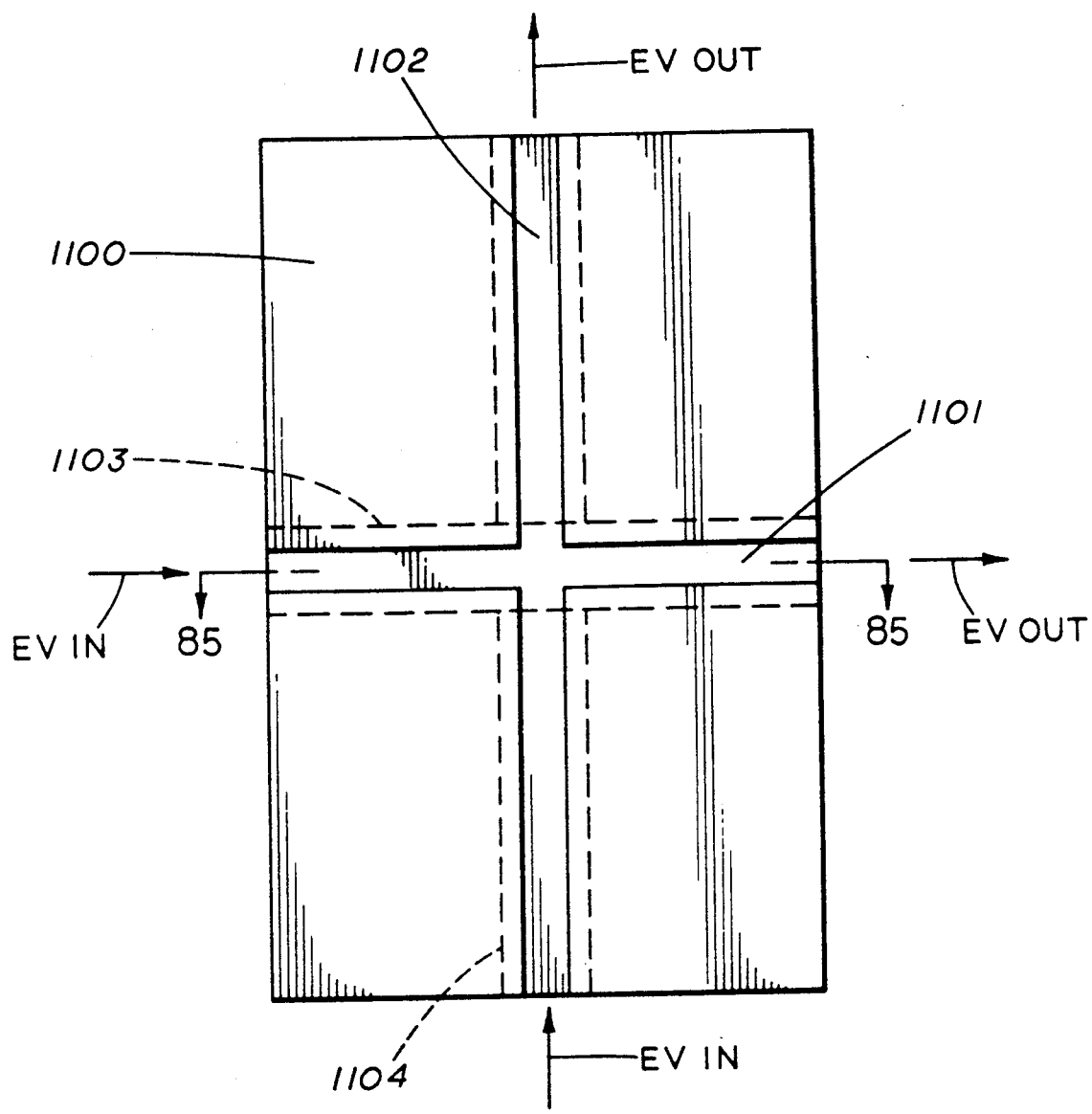
FIG. 84 is a plan view of two crossing EV guides.
Figure 85:
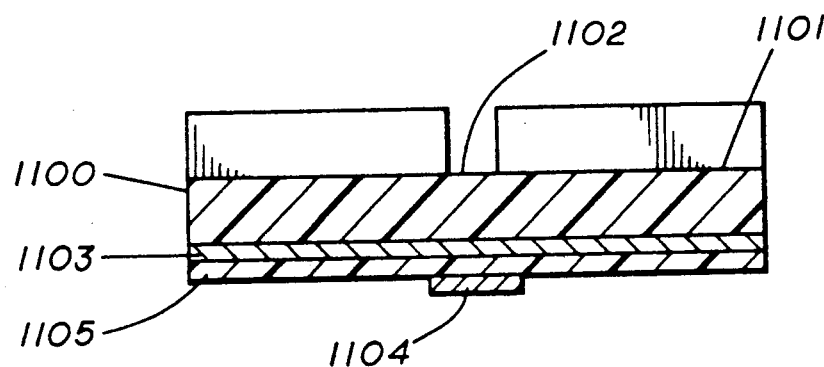
FIG. 85 is a cross-sectional view of the embodiment of FIG. 84, taken along the lines 85—85 of FIG. 84.

FIGS. 84 and 85 illustrate a phenomenon in dealing with EV's that is not available when using conventional wiring methods. A ceramic substrate 1100 has a pair of intersecting guide channels 1101 and 1102, such channels typically being arranged at 90° with respect to each other. As illustrated in FIG. 83, the guide channel 1101 has a counterelectrode 1103 running underneath, while the guide channel 1102 has a counterelectrode 1104, with an insulator 1105 separating the counterelectrodes 1103 and 1104. The insulator 1105 is considered to be optional, and will not be needed in most applications. With some circuits, the channels 1101 and 1102 can use a common counterelectrode. I have found that it is possible to cross EV guides, under certain conditions, typically at 90°, without the effect of "shorting" that would occur in wired circuits. Of course timing considerations must be observed to prevent actual collision of EVs at the intersection. In most EV logic circuits it is expected that the occupancy of the guide is very low, largely due to the high power of the EV and the small need to have a high occupancy. In certain special cases it may be necessary to consider what kind of spurious waves are launched down the side branches of the crossings and take preventive measures against them.

31. Energy Converters

From the discussion above regarding traveling wave circuits, it is clear that electrical energy may be obtained from an EV utilizing, for example, a traveling wave tube as illustrated in FIG. 50, or a planar traveling wave circuit as shown in FIG. 51. Energy from the EV is obtainable in the form of an electromagnetic pulse output from the traveling wave tube wire helix 564 or the planar circuit serpentine 588. This output signal is, in general, in the form of a negative pulse whose wave form is a function of the gas pressure. For minimal gas pressure, a relatively sharp negative pulse with no trailing portion is obtainable. Repeated EV propagation along the traveling wave conductor 564 or 588 results in a traveling wave output whose long term voltage average is zero; the traveling wave output is therefore ac. Energy is also obtainable at the collector electrode 556 or 586 when the EV strikes the electrode in question. Additionally, electrons emitted by the EV as well as electrons that may have been excited out of the environment, such as out of the guide material of the planar circuit, for example, may reach the collector electrode. Further, if the EV is terminated within the traveling wave or the guide channel prior to reaching the electrode, resulting electrons from the EV may be gathered at the collector. And, in any event, the passage of an EV along the traveling wave tube or the planar traveling wave device results in sudden accumulation of negative charge yielding dc output at the respective collector electrode, and the corresponding energy may be either dissipated or channeled to a useful application.

The amount of energy that may be obtained from an EV moving along a traveling wave device is dependent on the several parameters as described in Section 19. Under preferred conditions, considerably more energy is output from the traveling wave device than is necessary to generate the EV. For example, in the case described in Section 19, with an input pulse of 1 kv through the input resistor 568 of 1500 ohms, and an output pulse of 2 kv through the helix 564 having an impedance of 200 ohms, the ratio of the output peak power to the input peak power is $20,000 \div 667 = 30$. This result must be multiplied by the ratio of the width of the output pulse to the input pulse width, which was given as $16 \text{ ns} \div 600 \text{ ns} = 0.027$. The resulting corrected energy conversion factor is $0.027 \times 30 = 0.81$. However, not all of the input energy is used in generating the EV. A portion of the input energy is lost to excitation of the gas in the traveling wave tube, for example.

Under preferred conditions, the gas pressure is reduced to the lowest value that will sustain the EV generation in the tube, or envelope, at the same time losing the trailing portion of the output pulse as discussed above. The EV is formed during a brief portion early in the time of the input pulse, and this fact is reflected in a brief, sharp shoulder in the vicinity of the leading edge of the negative input pulse. Consequently, with reduced gas pressure in the traveling wave tube, the length of the input pulse may be reduced while still providing a 16 ns long output pulse. With the input pulse length reduced to 5 ns, for example, the corrected energy conversion factor becomes $(16 \div 5) \div 30 = 96$. That is to say, with the input pulse length reduced as noted, energy available at the output of the helix of the traveling wave tube is ninety-six times the energy input to the traveling wave tube, in addition to the energy consumed within the traveling wave tube and the energy available in the form of collected particles at the collector electrode.

Even a greater energy conversion factor is available if the input pulse is further reduced; an EV may be generated with an input pulse as short as $10^{-3}$ ns. The EV is a mechanism for tapping a source of energy and providing that energy for conversion to usable electrical form.

As discussed above, a traveling wave device may be operated to output more electrical energy than is supplied by the pulse source to the device to initiate an EV and cause it to propagate along the traveling wave output conductor. Energy conversion to dc electrical output occurs when electrons are freed during passage of an EV along an RC guide, for example, as well as when an EV and/or EV-liberated electrons are captured at a counterelectrode, for example.

An EV is formed when the concentration of electrons reaches a threshold, that is, when the charge density is sufficiently high. Then, the charges into the single EV entity. Once the electron cluster has been so formed into an EV, the EV entity is apparently held together. I believe a large portion of the electron charges contained within an EV are masked, so that I believe the EV does not manifest to external measuring devices a charge size equal to the total charge contained within the EV.

As an EV moves through or across a medium, the EV interacts with its environment. For example, an EV moving across a solid surface, such as propagating along an RC guide, can cause photo, field, secondary or thermionic emission of electrons. At least some of these produced electrons may be absorbed by the EV, which may also be emitting electrons. An EV interacting with a gaseous medium causes exitation of the gas molecules to produce streamers as discussed above. A moving EV thus appears to be in an excited state, with continual interaction with nearby matter. The EV is in an unstable state and must generate electrons from its surroundings to absorb to retain that state. The EV may exist in an equilibrium state, even as electrons are absorbed.

The emission of electrons by an EV may contribute to its propagation or propulsion. The EV may be propelled by its repulsion by electrons which the EV itself has caused to be produced from the surroundings as well as electrons the EV emits. Streamers are an indication of an optical mode of propulsion of EV's. An EV which is not interacting with its surroundings, nor emitting electrons that may be detected, yields no visible light and, therefore, its behavior cannot be observed optically. An EV in such a condition is referred to as a black EV.

Formation of an EV is a containment process in which the time average of alternating forces acting on the electrons drives them toward the region of weaker high frequency fields at the center of the container. Distortion of the container in optical frequencies, due perhaps to the interaction of the EV with surrounding material, causes the EV to be propelled forward in the direction of the emitted optical radiation, which ionizes matter in that direction, thus attracting the EV. Another mode of propulsion mentioned above involves the emission of electrons from the EV, with the consequent repulsion of the EV from the emitted electrons resulting in separation of the EV from the electrons and therefore propulsion of the EV.

As an EV moves along a guide, or a traveling wave device, the EV may be continually absorbing electrons and, at the same time, emitting electrons. Energy conversion may be occurring in either of these two processes. Energy converted and output by means of an RF source, or a traveling wave tube, for example, in conjunction with the emission of electrons from an EV, is a fission reaction. Energy conversion occurring in conjunction with the introduction of electrons into an EV, or the formation of an EV, is a fusion process. An EV passing along a traveling wave device, for example, may be both absorbing and emitting electrons. In this way, the EV may be considered as being continually formed as it propagates. In any event, energy is provided to the traveling wave output conductor, and the ultimate source of this energy appears to be the zero-point radiation of the vacuum continuum.

Energy output realized from a traveling wave device may be treated in a variety of ways. For example, the energy output from such a device may be utilized in a given application as soon as the energy is obtained. By contrast, the energy may be stored for later use, even after accumulation of a relatively large amount of energy over a period of time. Additionally, two or more traveling wave devices may be operated in some tandem fashion whereby their outputs may be combined, either for storage or for relatively direct use. Further, it will be appreciated that each traveling wave device provides two outputs, one in the form of an ac pulse signal obtained from the helical or serpentine conductor, and the other a dc output obtained from the collection of the EV and/or electrons freed within the traveling wave device. While both energy outputs may be utilized, the ac output is larger.

Although any type of traveling wave device may be constructed in very small form to convert energy by way of EV's, microlithographic thin film techniques may be used to advantage to construct multiple planar traveling wave circuits in integrated form.

A planar traveling wave circuit complete with a driving source operated by a triggering source is shown generally at 1120 in FIG. 86. The driver, shown generally at 1122, provides EV's for passage along the standing wave unit, shown generally at 1124. The triggering source, shown generally at 1126, provides EV's for operating the driver 1122, as discussed hereinafter.

The three elements 1122–1126 may be constructed utilizing an integrated dielectric base 1128. A single guide channel 1130 extends the length of the driver section 1122 and the length of the traveling wave serpentine section 1128. The guide channel 1130 contains a cathode 1132 at the driver end of the mechanism, and a collector electrode, or anode, 1134, at the opposite end of the groove. A serpentine conductor 1136 lies within the dielectric base 1128 along the groove 1130 in the traveling wave portion of the apparatus, and periodically crosses the groove. A counterelectrode 1138 is positioned on the bottom of the dielectric base 1128 for the full extent of the length of the serpentine conductor 1136 and beyond. The positioning of the serpentine conductor 1136 and the counterelectrode 1138 relative to the channel 1130 may be more fully appreciated by reference to FIG. 87, which also shows use of an optional dielectric cover 1140 which may be positioned against the top of the dielectric base 1128 to enclose the groove 1130. The cover 1140 may extend over the entire energy converting apparatus 1120 to cover the EV paths as further described hereinafter. In general, the traveling wave element 1124 of the energy conversion apparatus 1120 may be constructed like the planar traveling wave circuit 580 illustrated in FIG. 51.

While a variety of sources may be utilized to generate EV's to send along the channel 1130 for interaction with the serpentine of conductor 1136, a field emission source 1122 is included herein. The generator 1122 is a multi-electrode source, featuring the cathode 1132, which may be pointed, and the counterelectrode, or anode, 1138 extending under the serpentine conductor 1136, as well as a control electrode 1142. The control electrode 1142 may be positioned on the underside of the dielectric base 1128, or embedded within the base. A leg of the control electrode 1142 extends around and under the guide groove 1130 in a position between the end of the cathode 1132 and the beginning edge of the counterelectrode 1138. It will be appreciated that the construction of the generator 1122 is generally along the lines of the multielectrode source illustrated in FIG. 45 and, with the exception of lacking a feedback electrode, is also generally constructed like the field emission source illustrated in FIG. 55. For pure field emission generation of an EV, the entire device 1120 is operated in vacuum, and none of the cathodes is wetted.

A power source 1144 is provided between the grounded counterelectrode 1138 and the cathode 1132 as well as the control electrode 1142 to maintain a constant positive bias on the counterelectrode relative to the other two electrodes. The field emission generator 1122 is operated by pulsing the cathode 1132 negatively with an EV from the secondary emission triggering source 1126.

An EV guide channel 1146 extends the length of the triggering generator 1126 and the width of the driver generator 1122, intersecting the EV channel 1130. A cathode 1148 is positioned in the end of the guide channel 1146 in the triggering source 1126, and a collector electrode 1150 may be positioned at the opposite end of the groove 1146. A grounded counterelectrode 1152 underlies the portion of the triggering generator 1126 away from the cathode 1148, but does not extend under the drive generator 1122. The secondary emission source 1126 is also a multielectrode source, having additionally a gate 1154, extending to one side of the EV channel 1146 just beyond the end of the cathode 1148, and a plurality of anodes, or dynodes, 1156 (three are shown), also extending to the side of the EV channel. A voltage gradient is applied across the plurality of dynodes 1156 by distributing the dynodes along a voltage divider 1158, extending from the negative side of the power source 1144 to the positive side of another constant voltage source 1160, the opposite side of which is connected to the triggering cathode 1148. The gate 1154 is connected to the power source 1160 and the cathode 1148 through a resistor 1162.

The triggering source 1126 is an electron multiplier, operating similarly to the channel source illustrated in FIG. 62 to increase electron charge density to the threshold of producing an EV. The interior surface of the EV guide channel 1146, within the extent of the triggering source 1126, may be coated with resistive material to obtain proper potential distribution and field gradient to achieve the electron density gain. The dynodes 1156 are very narrow in the direction of travel of the electrons to obtain the desired voltage gradient in their presence. Typically, the dynodes 1156 should each be no greater than the width of the guide channel 1146. The counterelectrode 1152 underlying the dynodes 1156 acts to increase their capacity and therefore their energy storage.

Application of a negative pulse to the cathode 1148, which may be pointed, from an external source (not shown) begins the process of producing an EV in the multiplier source 1126. Initial gain of electrons is effected in the high gain region preceding the leading edge of the counterelectrode 1152, wherein the gate 1154 is located. With the gate 1154 at a higher electric potential than the negatively pulsed cathode 1148, an electron charge density is formed and grows as it propagates along the channel 1146, gaining electrons from the coated, or doped, wall material. Further multiplication of the electron charge density is effected along the dynodes 1156 until the EV formation threshold is attained. Then, the EV thus formed continues to propagate along the guide channel 1146 into the driver source 1122 where the EV operates to effect a large, sharp, negative pulse on the driver cathode 1132. Such a fast pulse causes the field emission production of an EV at the cathode 1132 as discussed above. The EV from the triggering source 1126 continues on to the collector electrode 1150, from which the resulting power surge may be taken by a lead 1164. Similarly, the EV generated by the driver source 1122 may be received at the collector electrode 1134, and its resulting power surge withdrawn by means of a lead 1166. The energy received by the serpentine conductor 1136 due to the passage of the EV along the guide channel 1130 is available at a lead 1168.

FIG. 88 indicates a modified construction of the traveling wave device 1124 in which the serpentine conductor 1136' is positioned on top of the dielectric base 1128' and therefore overlies the EV guide channel 1130. The counterelectrode 1138 is still positioned on the opposite side of the dielectric base 1128', and a dielectric cover 1140', constructed to receive, or cover, the serpentine conductor 1130, is positioned over the dielectric base 1128', covering the guide channel 1130. With the serpentine conductor 1136' exposed directly to the guide channel 1130, passage of an EV along the guide channel may also result in electrons being collected directly on the serpentine conductor, and therefore adding to the energy available at the output of the serpentine conductor, 1168 as indicated in FIG. 86. The electrons thus collected may come from the EV itself, and/or secondary emission from the walls of the EV guide channel 1130.

Although the EV's from the triggering source 1126 may be collected at the electrode 1164, these EV's may alternatively be dissipated by allowing them to pass over a relatively rough surface, without guide walls. The EV from the drive source 1120 may also be disposed of in a similar fashion. Such energy dissipation is accompanied by the generation of heat in the surfaces used to thus terminate the EV's. This thermal energy may be appropriately harnessed for practical application.

Yet another alternative for disposition of the EV's from the triggering source 1126 and/or from the driver source 1122 is to use these EV's in subsequent traveling wave energy conversion devices. For example, a bank of traveling wave circuits is shown schematically generally at 1170 in FIG. 89. A single dielectric base 1172 has constructed thereon a plurality of traveling wave devices 1174 complete with driver sources. The traveling wave devices 1174 are arranged physically mutually parallel, that is, with their EV guide channels 1176 mutually parallel across the dielectric base 1172. Each traveling wave assembly 1174 includes a driver source cathode 1178 and a collector electrode 1180, positioned at the ends of the guide channel 1176 as shown in FIG. 86, for example. As illustrated in FIG. 89, the serpentine conductor 82 of each of the traveling wave devices is positioned below the corresponding guide channel 1176. At the output side of the dielectric base 1172, a single conductor 1184 connects all of the collector electrodes 1180. The output lead 1186 from each of the serpentine conductors 1182 extends through the face of the dielectric base 1172 below the collector electrode output conductor 1184.

An EV guide channel 1188 extends from a single triggering source 1190 and crosses each of the traveling wave device channels 1176 at the driver cathode 1178. The triggering source 1190 has a cathode 1192 at one end of the dielectric base 1172, and a collector electrode 1194 is positioned at the opposite end of the base, both electrodes lying within the EV channel 1188. For purposes of clarity, details of the trigger source 1190 and of the driver sources are not shown in FIG. 89, which sources may be of the types 1126 and 1122, respectively, of FIG. 86.

Appropriate circuitry, as generally indicated in FIG. 86, may be applied to connect the various electrodes, dynodes and counterelectrodes (not shown). Generally, the driver cathodes 1178 may all be connected together, and a single counterelectrode (not shown) made to underlie the plurality of serpentine conductors 1182. A single EV generated by the triggering source 1190 will move along the crossing channel 1188, pulsing each of the driver cathodes 1178 in sequence, resulting in EV's generated and moving along each of the respective traveling wave devices 1174. Thus, a surge of energy output will be available at each of the serpentine conductor output leads 1186 in sequence. The output conductors 1186 may be tapped individually, or connected together. In either event, the entire bank of traveling wave devices 1170 may produce a sequence of energy pulses for each triggering EV generated by the source 1190. Continual operation of the triggering source 1190, then, will produce a virtually continuous energy pulse output from the bank 1170.

In addition to the serpentine conductor outputs at the leads 1186, the bank 1170 provides power output at the collector electrodes 1180, available on the conductor 1184. Also, as discussed above, the triggering EV's, which are collected at the electrode 1194, also provide a power source which is available for tapping, or whose energy may be dissipated as discussed above.

Since the physical dimensions of a traveling wave device may be very small, such that microlithographic techniques may be used to construct such a device, the density of such traveling wave devices in the bank 1170 may be relatively high. For example, on the order of one thousand traveling wave devices may be arranged as shown in FIG. 89 on a dielectric base 1192 which is only approximately one inch wide, that is, from the triggering source 1190 to the collector electrode 1194. Similarly, the depth of the traveling wave circuits permits the bank 1170 to be extremely thin. Such dimensional features then permit multiple banks to be stacked one on another or, a three-dimensional stack of traveling wave devices may be constructed in an integrated block dielectric base. Such a stack of traveling wave devices is shown generally at 2000 in FIG. 90, wherein some details of the traveling wave circuits are not shown for purposes of clarity.

The stack 2000 is constructed with a single block dielectric base 2002. Generally, the stack 2000 may be considered to be a pile of banks such as 1170 in FIG. 89. However, the construction of the stack 2000 may be carried out with thin film techniques by producing the various layers in integrated fashion, as well as piling up already-constructed banks 1170.

Each layer of the stack 1200 includes an array of a plurality of traveling wave devices 1204, but with a single triggering source 1206 having a single cathode 1208 and a single collector electrode 1210. A single conductor 1212 may join all of the collector electrodes 1210 of the triggering sources of the various layers for dissipation or other disposition of the EV energy collected by the electrodes 1210. In similar fashion, the triggering cathodes 1208 may be all connected together by a single conductor. The collector electrodes of each of the traveling wave devices 1204 in a single layer are shown connected together by a conductor 1214; all of the layer conductors 1214 may also be joined together by a conductor (not shown). The serpentine conductors (not shown) have output leads 1216 in rows between the collector electrode conductors 1214. The serpentine output conductors 1216 may similarly be connected together by layer, and even all of the serpentine conductor outputs in the block 1202 may be connected together.

With further circuitry adapted generally along the lines indicated in FIG. 86, the triggering sources 1206 may be operated in unison, or separately if the triggering cathodes 1208 are not joined together. By selective operation of the triggering sources 1206, and selected arrangement of the output leads from the serpentine conductor outputs 1216, the stack 1200 may be made to operate in a variety of fashions, yielding output pulses which may be combined in parallel or otherwise, with pulses generated in various phase relationships among the layers of traveling wave devices, for example.

Again, because of the microminiature dimensions of the elements involved, a stack such as 1200 may typically contain on the order of 1000 layers, or banks, of traveling wave devices in a vertical thickness of approximately one inch. Consequently, such a stack 1200 may contain a million traveling wave devices 1204 within approximately one cubic inch of volume.

For even greater flexibility of operation of a bank or stack of traveling wave devices, individual traveling wave devices may be operated independently, even being provided with their own triggering source. FIG. 91 shows, generally at 1220, a fragment of a traveling wave device stack, including a dielectric base block 1222 in which is arrayed a plurality of traveling wave devices 1224. Details of the traveling wave circuits, discernible from FIG. 86 for example, have been left out of FIG. 91 for purposes of clarity.

Each traveling wave device 1224, at least in the top layer illustrated, has an individual triggering source 1226. As illustrated, the guide channel 1228 from the triggering source 1226 is folded so that both of its ends intersect the end face of the dielectric block 1222. Thus, the cathode 1230 of the triggering source 1226 may be contacted at the same face of the dielectric block 1222 at which the triggering source collector electrode 1232 is positioned, with these two elements arranged on opposite sides of the driver cathode 1234 for the individual traveling wave device 1224. The traveling wave device collector electrodes 1236, as well as the serpentine conductor output leads 1238, may be tapped individually, or connected with those of other traveling wave devices in some selected arrangement. Similarly, the counterelectrodes (not shown) may be connected to a common ground, or treated individually. With independent triggering as provided by the arrangement of FIG. 91, a bank, or stack, of traveling wave devices may be operated in a selected manner, producing output pulses in varying phase relationships, and even combined in selected patterns.

The assembling of multiple traveling wave devices in banks or stacks may be more compactly accomplished utilizing planar devices, which may be constructed using thin film techniques, as noted, as opposed to using traveling wave tubes. However, a bank or stack of traveling wave tubes may be constructed as well. Additionally, either type of traveling wave device may be included in various circuits. For example, FIG. 92 shows a circuit, indicated generally at 1240, including a traveling wave device 1242 in symbol form, representing any type traveling wave device, including a planar device and a traveling wave tube. The traveling wave element 1242 is illustrated in a circuit, indicated generally at 1240, featuring a feedback loop through a regulator 1244. The feedback loop taps some energy from the ac energy output lead 1246 and returns energy to the input lead 1248 to produce a subsequent EV in the traveling wave device 1242. With the circuit illustrated at 1240, a traveling wave device may be initially triggered to produce an EV and convert a larger energy output. A portion of that output, passing through the regulator 1244, is used to produce a subsequent EV for further energy conversion. In this fashion, continued energy conversion is obtained with little or no additional energy input needed to maintain the process.

FIG. 93 illustrates another circuit, shown generally at 1250, in which a plurality of traveling wave devices 1251 have their outputs combined. The output leads from the collector electrodes of the traveling wave devices are combined in parallel in a single lead 1254. The ac energy outputs 1256, from the serpentine conductors or helical coil conductors, of the traveling wave devices are joined in a separate parallel arrangement. Thus, the circuit 1250 may provide two combined energy outputs, one from the direct contact of EV's and/or electrons at the collector electrodes, and the other from the energy conversion process yielding relatively high energy pulses on the traveling wave conductors.

Yet another arrangement of output connections is shown in the circuit indicated generally as 1260 in FIG. 94. A plurality of traveling wave devices 1262 is arranged generally in series. The dc output obtained at the collector electrode of a first traveling wave device 1262 is transmitted by an appropriate conductor 1264 to initiate EV production in a second traveling wave device, whose collector electrode output is transmitted to yet another traveling wave device, etc. It will be appreciated that additional biasing energy may need to be applied to the subsequent traveling wave devices in the series to ensure that an EV producing threshold is achieved in each case. The high energy ac outputs 1266 are shown arranged in parallel in the circuit 1260 as an example. However, the ac outputs 1266 may be treated in any selected fashion independent of the arrangement of the collector electrode outputs.

Figure 95:
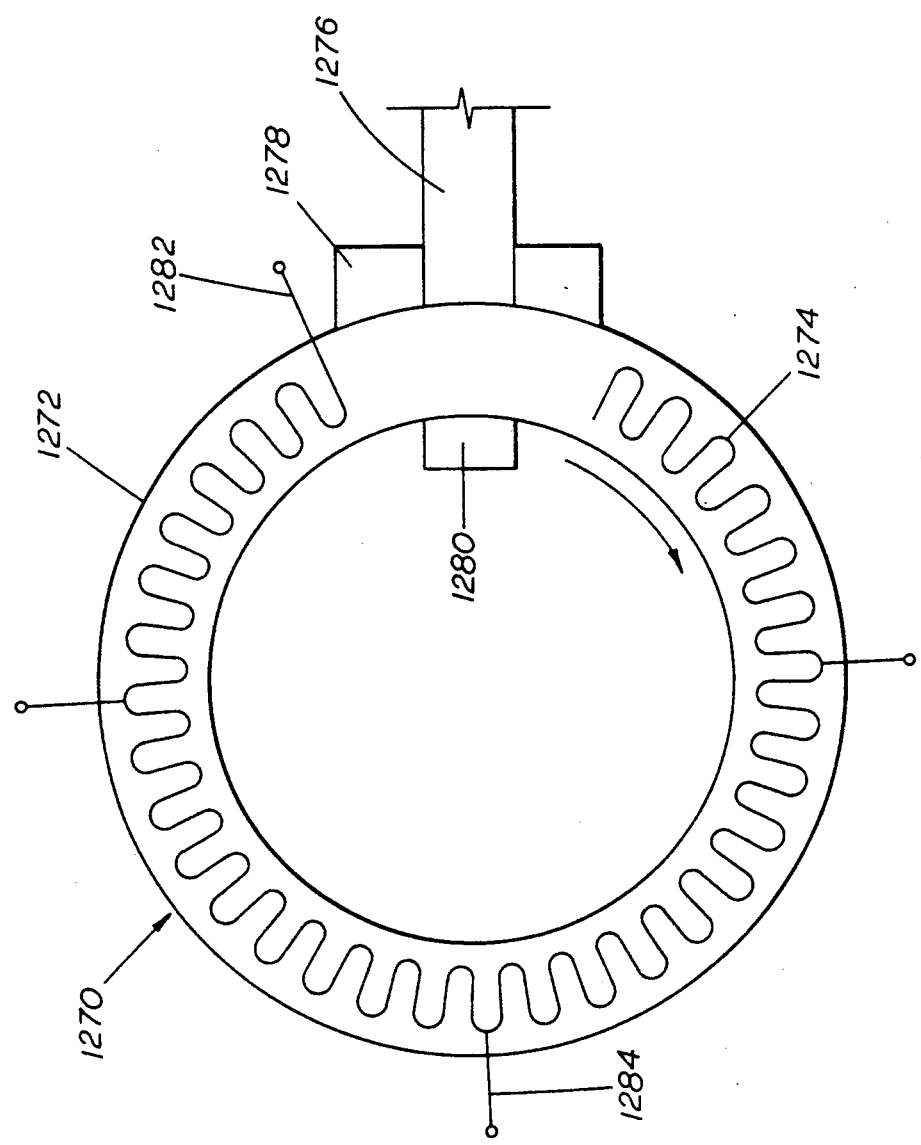
FIG. 95 is a top plan view of a schematic representation of a traveling wave circuit constructed in the form of a circulator.

The feature of repeatedly using an EV to convert energy may be embodied in a variation of the circulator discussed above. A traveling wave circulator is shown schematically generally at 1270 in FIG. 95. A dielectric base closed loop 1272 includes a traveling wave conductor 1274, such as a serpentine conductor or a helix conductor as discussed above. EV's are injected into the closed loop 1272 from a feed and exit line 1276 by selected application of deflector fields to switches 1278 and 1280 at the junction between the loop and the line. An EV thus introduced into the closed loop 1272 may continue to circulate in the loop while energy is received by the conductor 1274, and withdrawn by its end output lead 1282. In this way, the same EV may make a plurality of trips about the closed loop 1272 until it is selectively withdrawn by operation of the switches 1278 and 1280, or until the EV terminates within the closed loop. Additional leads 1284 may be applied to tap energy from the traveling wave conductor 1274 at various locations other than at the end of the conductor.

Figure 96:
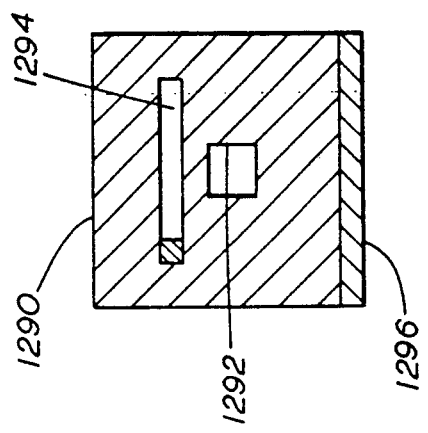
FIG. 96 is a vertical cross section through the closed loop of the traveling wave circulator of FIG. 95, showing a planar configuration.

The actual construction of the circulator loop 1272 may take several forms. FIG. 96 illustrates one form utilizing a flat, film type serpentine conductor. The dielectric closed loop base 1290 may be constructed using lithographic techniques as discussed above, and includes an EV guide path 1292 over which is positioned a serpentine conductor 1294. The serpentine conductor is separated from the guide channel 1292 by dielectric material. However, it will be appreciated that the serpentine conductor 1294 may be exposed to the interior of the channel 1292 and, therefore, the EV's circulating therewithin. A counterelectrode 1296 is positioned on the bottom of the dielectric base 1290, opposite the side of the channel 1292 on which is positioned the conductor 1294. The serpentine conductor 1294 may be positioned between the counterelectrode 1296 and the EV channel 1292.

Figure 97:
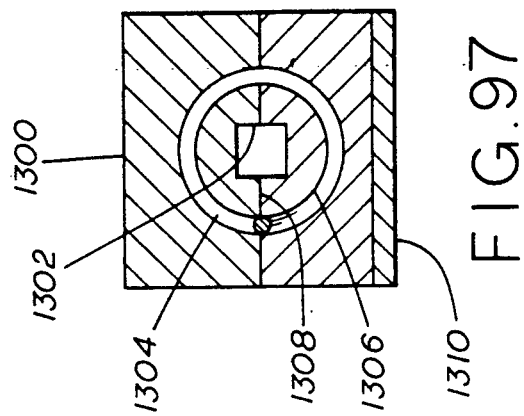
FIG. 97 is a view similar to FIG. 96, but illustrating use of a helical conductor in the traveling wave circulator.

A helical traveling wave conductor may also be utilized in a traveling wave circulator. FIG. 97 shows a circular closed loop dielectric base 1300 enclosing an EV guide channel 1302 surrounded by a helical conductor 1304. The helical conductor 1304, wrapped in the form of a toroid, resides in an appropriate recess 1306 also encircling the EV guide channel 1302. Formulation of the recess 1306, and construction and/or placement of the helical conductor 1304 may be facilitated by forming the dielectric base 1300 in two halves, as indicated by the closed seam 1308. The recess 1306 may be a continuous cylindrical form, or may completely encompass the helical conductor 1304, being a helix itself. The latter construction may be achieved by forming the dielectric base 1300 by thin film techniques, for example. A counterelectrode 1310 is positioned on the bottom surface of the dielectric base 1300.

It will be appreciated from the foregoing discussion that a traveling wave device may be constructed in a variety of forms for the purpose of converting energy through the mechanism of an EV passing in the vicinity of a traveling wave conductor. The EV itself, used to effect the energy conversion and collected on a collector electrode, such as 1134, 1150, 1180, 1194, etc., provides another source of energy. As discussed in Section 7, propagation of an EV in an energy-absorbing gas may produce streamers in the gas; energy from an EV used to trigger an EV source, or to drive a traveling wave device, may be so consumed in a gas environment. As noted above in this section, dissipation of an EV over a relatively rough surface, for example, is accompanied by heat generation. A collected, or propagating, EV may thus yield energy to a heat exchanger used to heat a fluid flow for example, or to a heat absorbing member which also serves as a heat source. The thermal energy obtained from an EV may then be directed to practical applications. Furthermore, an EV used to obtain energy on a traveling wave conductor may be used, directly or by way of its dc pulse output, to generate a subsequent EV either in the same or another traveling wave device, for example. An appropriate switching technique may be employed in the generation of the subsequent EV.

For greater energy efficiency, just as a single EV may be used to trigger multiple EV generators, an EV may be utilized for multiple energy conversions, such as by passing through two or more traveling wave devices, or also by passing through a closed loop circulator device multiple times. Additionally, output energy of a traveling wave device may be tapped to provide the energy necessary to reach an EV producing threshold in the same traveling wave device through an appropriate feedback loop. Multiple traveling wave devices may be formulated in integrated fashion, and operated individually or in selected patterns. In general, the energy outputs of multiple traveling wave devices utilizing EV propagation may be combined in selected patterns.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. An energy converter comprising a source of charged particles; a solid dielectric body having a channel positioned to be responsive to the charged particles; means for accelerating the charged particles in the channel; a slow wave electrical conductor capacitively coupled to the channel and the changed particles; a counter-electrode capacitively coupled to the slow wave electrical conductor, the channel and the electron bundle; means for biasing the slow wave conductor and counter-electrode so that the charged particles propagate along and are guided by the channel and coupled to (a) the solid dielectric body, (b) the slow wave electrical conductor and (c) the counter electrode so the charged particles charge the dielectric and cause a transfer of energy via the dielectric to the slow wave structure; the slow wave structure coupling energy transferred to it via the dielectric to a load.

2. The energy converter of claim 1 wherein the source and channel are in a vacuum.

3. The energy converter of claim 2 wherein the source comprises a field emission source.

4. The energy converter of claim 3 wherein the field emission source includes a first charged particle emitting electrode positioned to supply the charged particles to the channel, and means for supplying a field to the first electrode to cause the first electrode to emit the charged particles.

5. The energy converter of claim 4 wherein the field supplying means includes a second charged particle emitting electrode, means for guiding particles emitted by the second electrode into proximity with the first electrode so that the particles emitted by the second electrode establish said field.

6. The energy converter of claim 5 wherein the guiding means includes another channel in a solid dielectric body, the another channel being superposed with the first electrode; and means for accelerating the charged particles from the second electrode in the another channel into proximity with the first electrode.

7. The energy converter of claim 6 wherein a counter-electrode is superimposed with the another electrode, further including a plurality of dynodes at different potentials along the length of the another channel.

8. The energy converter of claim 7 further including a pulse source connected to the second electrode for activating the second charged particles.

9. The energy converter of claim 4 further including a control electrode for the charged particles of the first electrode, the control electrode being between the first electrode and the slow wave structure.

10. The energy converter of claim 1 further including N of the sources, N of the channels, and N of the slow wave conductors, where N is an integer greater than one; each of the sources, channels and slow wave conductors being respectively associated with each other on a one-on-one basis and arranged with the solid dielectric body, the accelerating means and the counter-electrode so that the charged particles propagating along channel k cause a transfer of energy via the dielectric to slow wave conductor, k, where k is selectively every integer from 1 to N, and means for combining the energy in the N slow wave conductors.

11. The energy converter of claim 10 wherein the combining means combines residual energy, not transferred to the slow wave conductor, in the N channels.

12. The energy converter of claim 10 wherein the combining means combines residual energy, not transferred to the slow wave conductor, in the N channels with the energy in the N slow wave conductors.

13. The energy converter of claim 1 further including means for coupling energy derived from the slow wave conductor back to the channel to provide a field for controlling the charged particles propagating from the source to the slow wave conductor.

14. The energy converter of claim 1 wherein the channel is surrounded by a solid dielectric.

15. The energy converter of claim 1 wherein the channel is substantially straight.

16. The energy converter of claim 1 wherein the channel is curved.

17. The energy converter of claim 1 wherein the channel is configured to have a re-entrant path and includes a common port for the charged particles entering and leaving the re-entrant path, the common port being coupled to another channel having a junction with the common port so that the charged particles coupled between the another channel and the common port via the junction are not tangent with respect to the propagation direction of the particles in the re-entrant path, and means for selectively deflecting the charged particles entering and leaving the common port from between the another channel and the re-entrant path.

18. The energy converter of claim 1 wherein the slow wave conductor is planar with respect to the channel.

19. The energy converter of claim 1 wherein the slow wave conductor is formed as a helix surrounding the channel.

20. The energy converter of claim 1 wherein the source and channel are in an atmosphere of a low pressure inert gas.

21. The energy converter of claim 20 wherein the source is an electrode wetted by a conductive substance.

22. The energy converter of claim 21 wherein the electrode has a sharp point in proximity to the channel.

23. The energy converter of claim 22 wherein the electrode of the source is at a voltage lower than the counter electrode.

24. The energy converter of claim 1 wherein the source is an electrode wetted by a conductive substance.

25. The energy converter of claim 24 wherein the electrode has a sharp point in proximity to the channel.

26. The energy converter of claim 25 wherein the electrode of the source is at a voltage lower than the counter electrode.

27. An energy converter comprising a source of discrete contained electrons in a bundle, a slow wave electrical conductor, means positioned to be responsive to the electron bundle for guiding the electron bundle relative to the slow wave conductor so energy is transferred from the electron bundle to the slow wave structure, the electron bundle interacting with the means for guiding so that plural discrete pulses of optical energy are derived along the means for guiding in response to a single pulse of electrical energy being applied to the sources, each of the optical energy pulses being associated with an electron bundle, the slow wave structure coupling energy transferred to it from the electron bundle to a load.

28. The energy converter of claim 27 wherein the source and guiding means are in a vacuum.

29. The energy converter of claim 28 wherein the source comprises a field emission source.

30. The energy converter of claim 27 further including N of the sources, N of the means for guiding, and N of the slow wave conductors, where N is an integer greater than one; each of the sources, means for guiding and slow wave conductors being respectively associated with each other on a one-on-one basis and arranged so that the bundles propagating in guiding means k cause a transfer of energy to slow wave conductor k, where k is selectively every integer from 1 to N, and means for combining the energy in the N slow wave conductors.

31. The energy converter of claim 30 wherein the combining means combines residual energy, not transferred to the slow wave conductors, in the N guiding means.

32. The energy converter of claim 30 wherein the combining means combines the energy in the N slow wave conductors with residual energy, not transferred to the slow wave conductors, in the N guiding means.

33. The energy converter of claim 27 further including means for coupling energy derived from the slow wave conductor back to the guiding means to provide a field for controlling the derivation of a bundle of discrete self-contained electrons from the source.

34. An energy converter method comprising launching a bundle of discrete contained electrons, guiding the bundle along a predetermined path, transferring energy from the bundle while it is guided along the path to a slow wave electrical conductor, and coupling energy transferred to the slow wave conductor from the bundle to a load.

35. The method of claim 34 further comprising coupling residual energy in the bundle, not transferred to the slow wave electrical conductor, to the load.

36. The method of claim 33 further including controlling the flow of the bundles into the path prior to the bundles being guided to the slow wave conductor in response to energy transferred to the slow wave conductor from the bundles in the path.

37. The method of claim 36 wherein the bundle flow is controlled by applying a field to a source of the bundles, the applied field causing a bundle to be launched from the source along the path.

38. An energy converter comprising a source of charged particles in plural discrete contained bundles; a solid dielectric body having a channel positioned to be responsive to the charged particle bundles; means for accelerating the charged particle bundles in the channel; a slow wave electrical conductor capacitively coupled to the channel and the charged particle bundles; a counter-electrode capacitively coupled to the slow wave electrical conductor, the channel and the bundles; means for biasing the slow wave conductor and counter-electrode so that the charged particle bundles propagate along and are guided by the channel and coupled to (a) the solid dielectric body, (b) the slow wave electrical conductor and (c) the counter electrode so the charged particle bundles charge the dielectric and cause a transfer of energy via the dielectric to the slow wave structure; the bundles interacting with the means for guiding so that plural discrete pulses of optical energy are derived along the channel in response to a single pulse of electrical energy being applied to the sources, each of the optical energy pulses being associated with an electron bundle; the slow wave structure coupling energy transferred to it via the dielectric to a load.

39. An energy converter comprising a source of charged particles in a discrete contained bundle; a solid dielectric body having a channel positioned to be responsive to the charged particles; means for accelerating the charged particles in the channel; a slow wave electrical conductor capacitively coupled to the channel and the charged particles; a counter-electrode capacitively coupled to the slow wave electrical conductor, the channel and the electron bundle; means for biasing the slow wave conductor and counter-electrode so that the charged particles propagate along and are guided by the channel and coupled to (a) the solid dielectric body, (b) the slow wave electrical conductor and (c) the counter electrode so the charged particles charge the dielectric and cause a transfer of energy via the dielectric to the slow wave structure; the slow wave structure coupling energy transferred to it via the dielectric to a load.

40. The energy converter of claim 39 wherein the charged particle source includes an electron source.

41. The energy converter of claim 39 wherein the charged particle source is a source of predominantly electrons.

42. An energy converter comprising a source of charged particles including electrons in plural discrete contained bundles; a solid dielectric body having a channel positioned to be responsive to the charged particle bundles; means for accelerating the charged particle bundles in the channel; a slow wave electrical conductor capacitively coupled to the channel and the charged particle bundles; a counter-electrode capacitively coupled to the slow wave electrical conductor, the channel and the bundles; means for biasing the slow wave conductor and counter-electrode so that and the charged particles bundles propagate along and are guided by the channel and coupled to (a) the solid dielectric body, (b) the slow wave electrical conductor and (c) the counter electrode so the charged particle bundles charge the dielectric and cause a transfer of energy via the dielectric to the slow wave structure; the bundles interacting with the means for guiding so that plural discrete pulses of optical energy are derived along the channel in response to a single pulse of electrical energy being applied to the sources, each of the optical energy pulses being associated with an electron bundle; the slow wave structure coupling energy transferred to it via the dielectric to a load.

* * * * *